(12) United States Patent
Oh

(10) Patent No.: US 11,730,306 B2
(45) Date of Patent: Aug. 22, 2023

(54) CONTROLLING BREWING PARAMETERS OF SINGLE-SERVE BEVERAGE SYSTEM

(71) Applicant: Sung Oh, West Covina, CA (US)

(72) Inventor: Sung Oh, West Covina, CA (US)

(*) Notice: Subject to any disclaimer, the term of this patent is extended or adjusted under 35 U.S.C. 154(b) by 769 days.

(21) Appl. No.: 16/656,510

(22) Filed: Oct. 17, 2019

(65) Prior Publication Data

US 2020/0121115 A1 Apr. 23, 2020

Related U.S. Application Data

(60) Provisional application No. 62/855,696, filed on May 31, 2019, provisional application No. 62/809,117, filed on Feb. 22, 2019, provisional application No. 62/809,502, filed on Feb. 22, 2019, provisional application No. 62/746,929, filed on Oct. 17, 2018, provisional application No. 62/746,949, filed on Oct. 17, 2018.

(51) Int. Cl.
| | | |
|---|---|---|
| *B65D 85/804* | (2006.01) | |
| *A47J 31/06* | (2006.01) | |
| *A47J 31/40* | (2006.01) | |
| *A47J 31/46* | (2006.01) | |

(52) U.S. Cl.
CPC ......... *A47J 31/0652* (2013.01); *A47J 31/407* (2013.01); *A47J 31/46* (2013.01); *B65D 85/8043* (2013.01); *B65D 85/8049* (2020.05); *B65D 85/8061* (2020.05); *B65D 85/804* (2013.01)

(58) Field of Classification Search
CPC .............. B65D 85/804; B65D 85/8043; B65D 85/8049; B65D 85/8052; B65D 85/816; A47J 31/0668; A47J 31/0673; A47J 31/3628; A47J 31/368; A47J 31/3695; A47J 31/401
USPC .......................................................... 99/295
See application file for complete search history.

(56) References Cited

U.S. PATENT DOCUMENTS

| | | | |
|---|---|---|---|
| 7,926,415 B2 | 4/2011 | Yoakim | |
| 8,163,318 B2 * | 4/2012 | Ozanne | B65D 85/8052 426/77 |
| 8,443,717 B2 * | 5/2013 | Venturi | B65D 85/8061 426/77 |
| 9,428,328 B2 * | 8/2016 | Trombetta | B65B 29/022 |
| 9,963,290 B2 * | 5/2018 | Accursi | B65D 85/8043 |
| 10,258,186 B2 * | 4/2019 | Rivera | A47J 31/02 |
| 10,336,531 B2 * | 7/2019 | Trombetta | B65D 85/8046 |
| 2014/0318378 A1 * | 10/2014 | Ertur | A47J 31/407 426/106 |
| 2020/0253413 A1 * | 8/2020 | Orler | A47J 31/407 |

* cited by examiner

*Primary Examiner* — Reginald Alexander
(74) *Attorney, Agent, or Firm* — Scott R. Hansen; Viking IP Law

(57) ABSTRACT

A beverage brewing system works with a pod to brew low, medium and high pressure beverages in hot and/or cold format such as coffee and espresso served hot or over ice. The beverage ingredient may be packed within a filter which is enclosed by a container to hermetically seal the filter. The filter has a predetermined number and sized holes to control the pressure within the filter to brew low, medium, and high pressure beverages. The filter is releasably sealed to the container where separating the filter from the container forms a gap to allow the beverage formed within the pod to drain via the gap and directly pour into a mug.

28 Claims, 40 Drawing Sheets

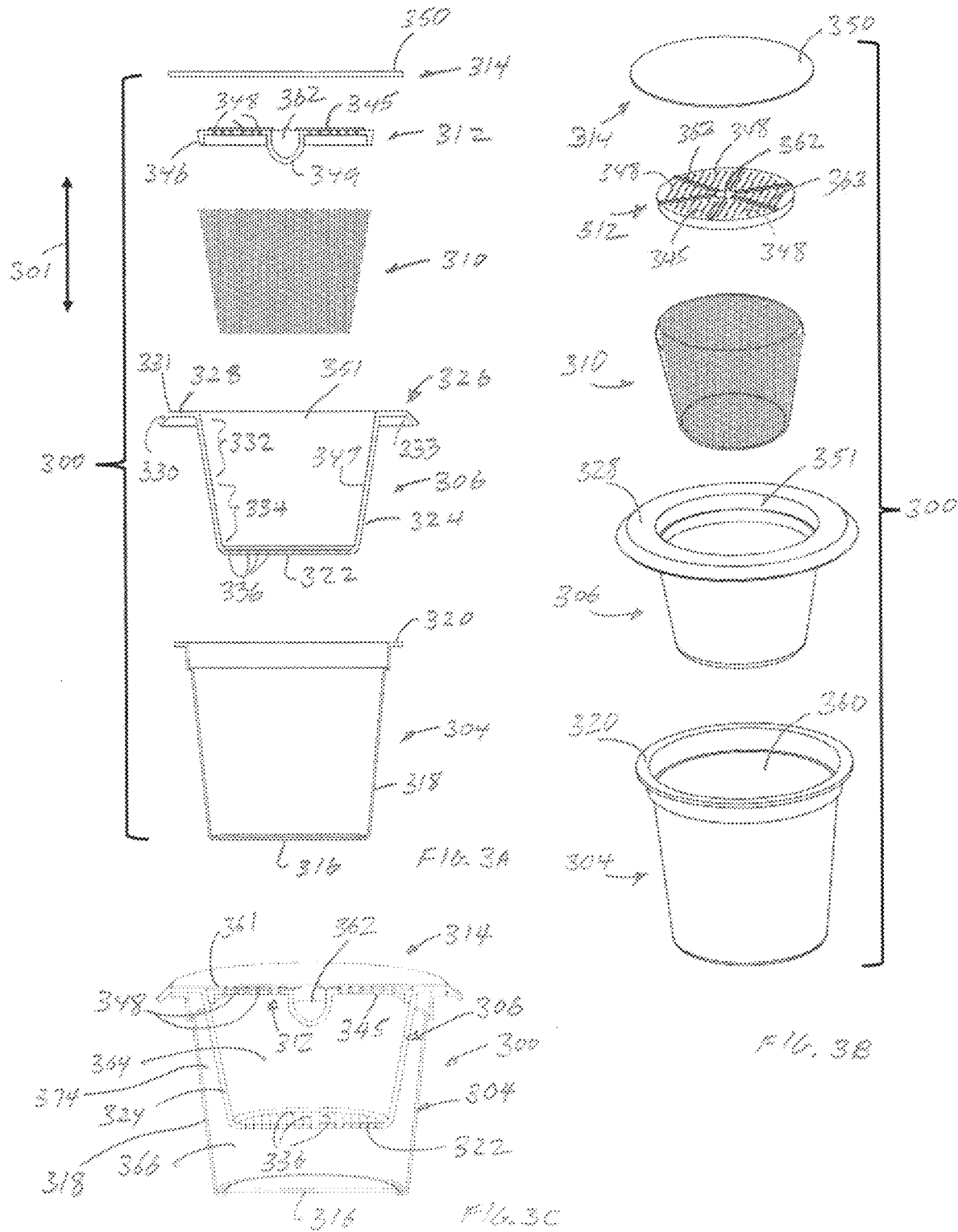

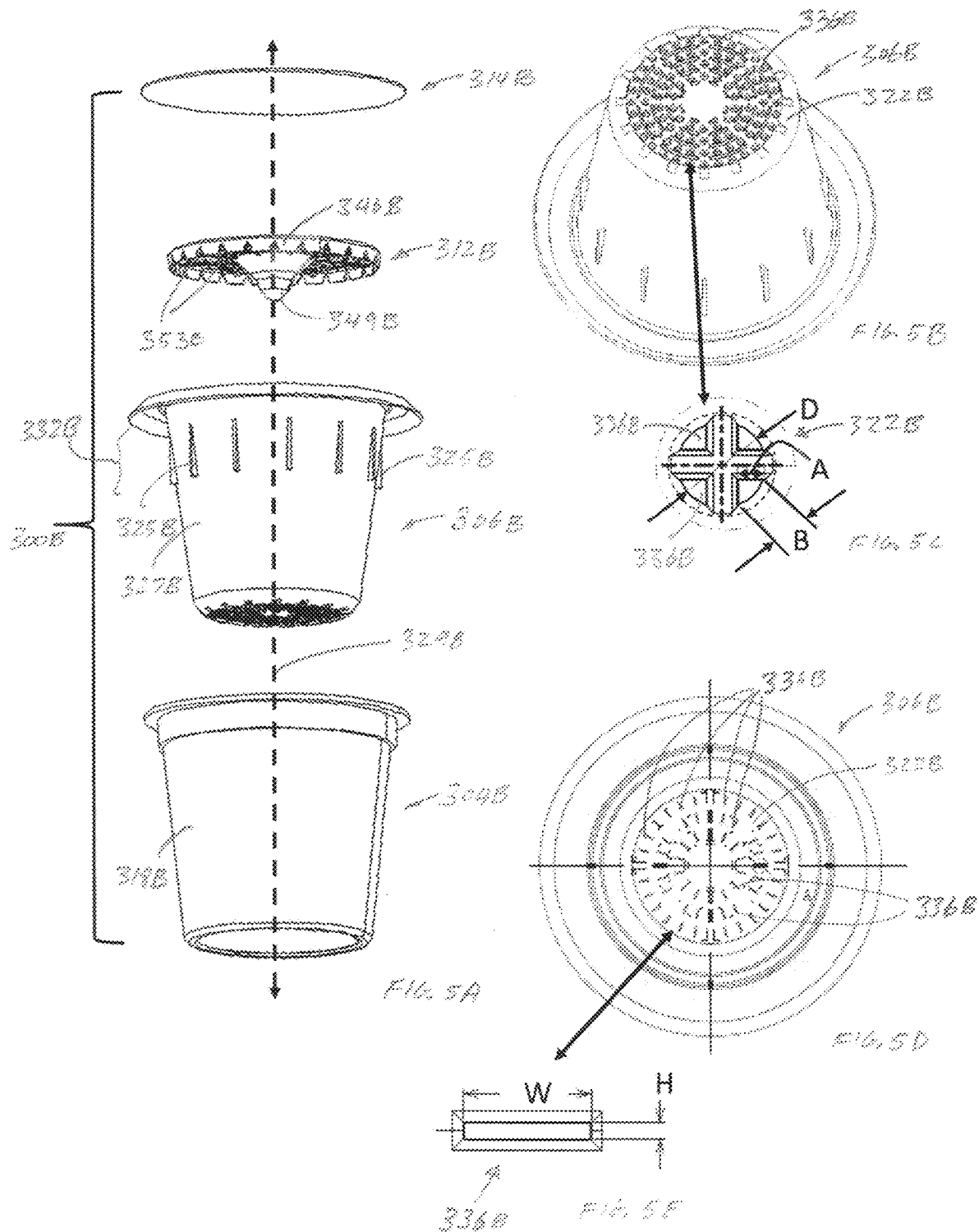

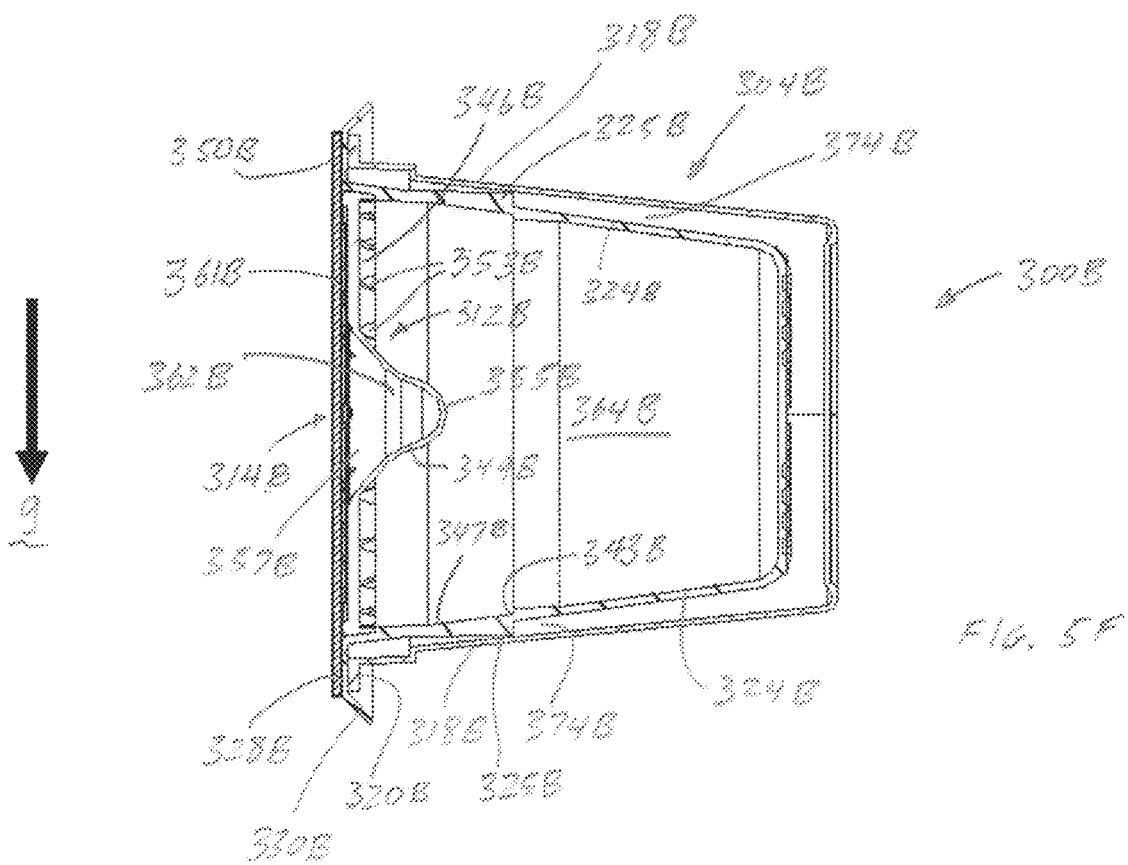
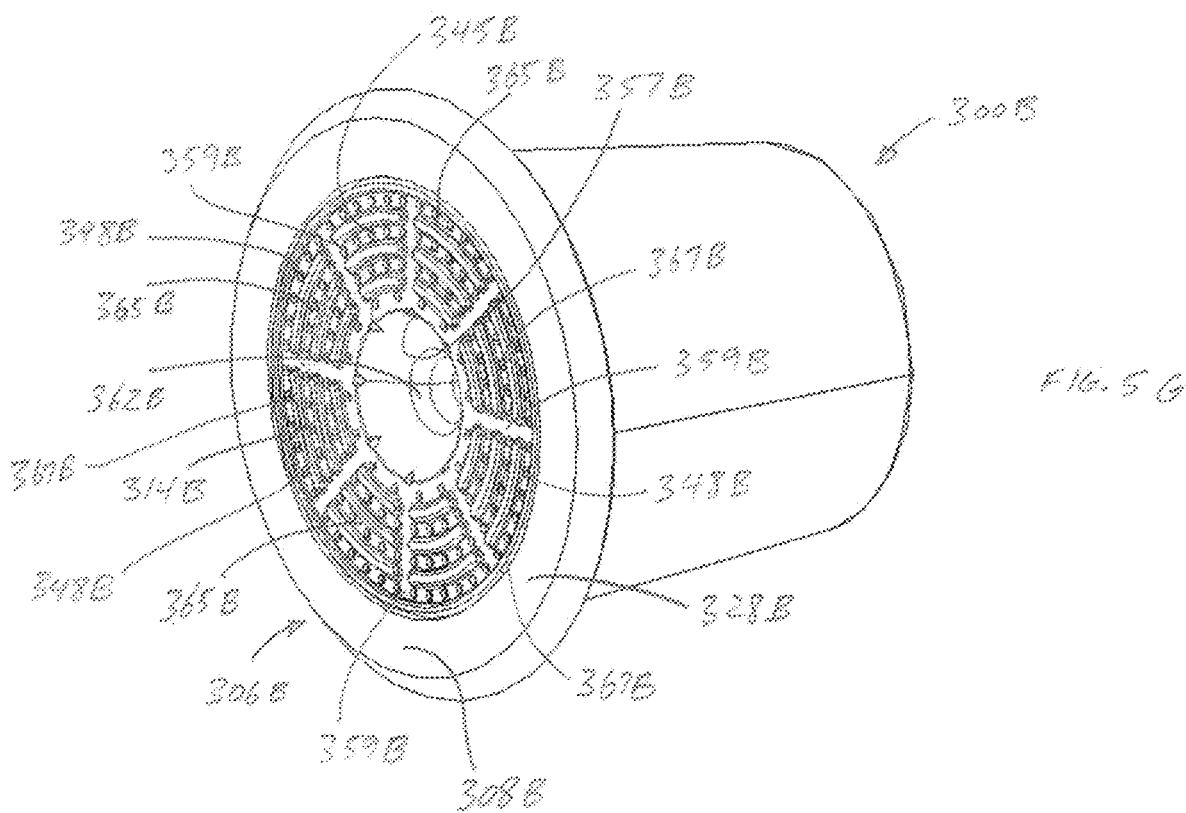

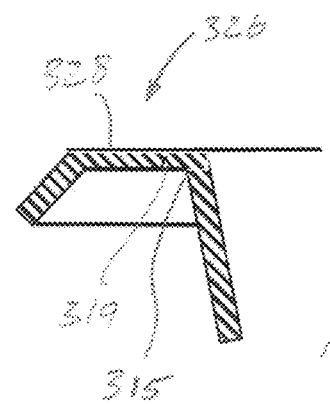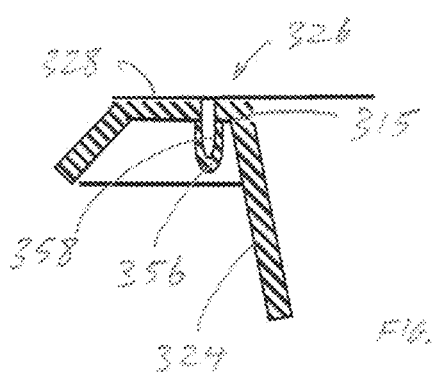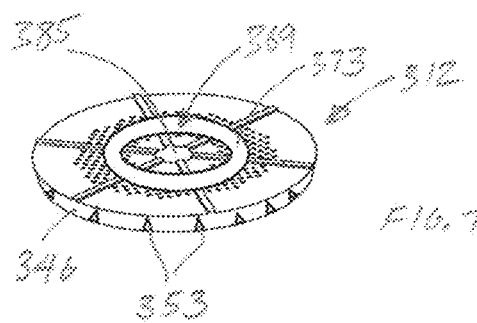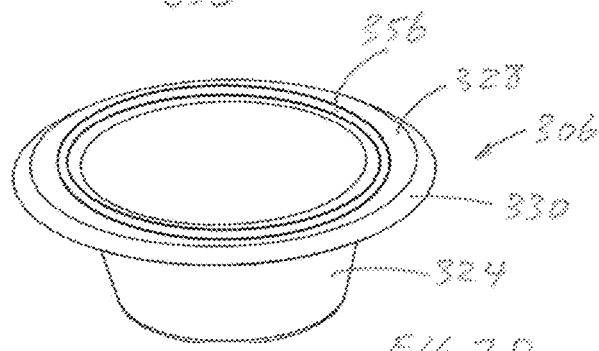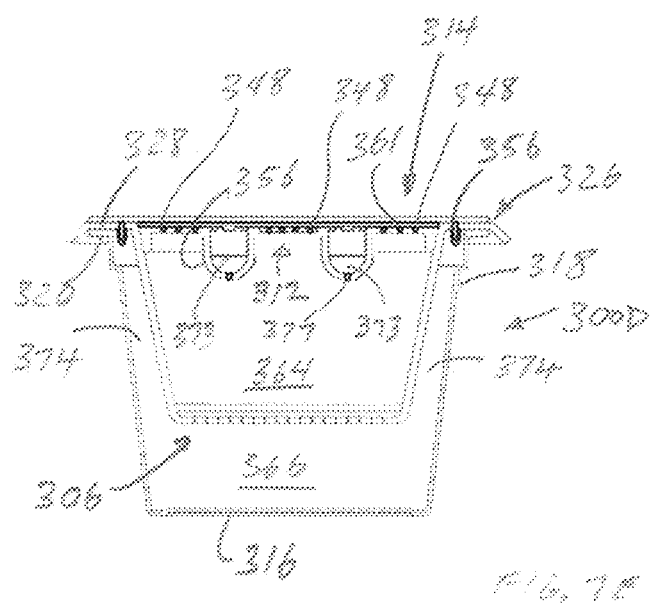

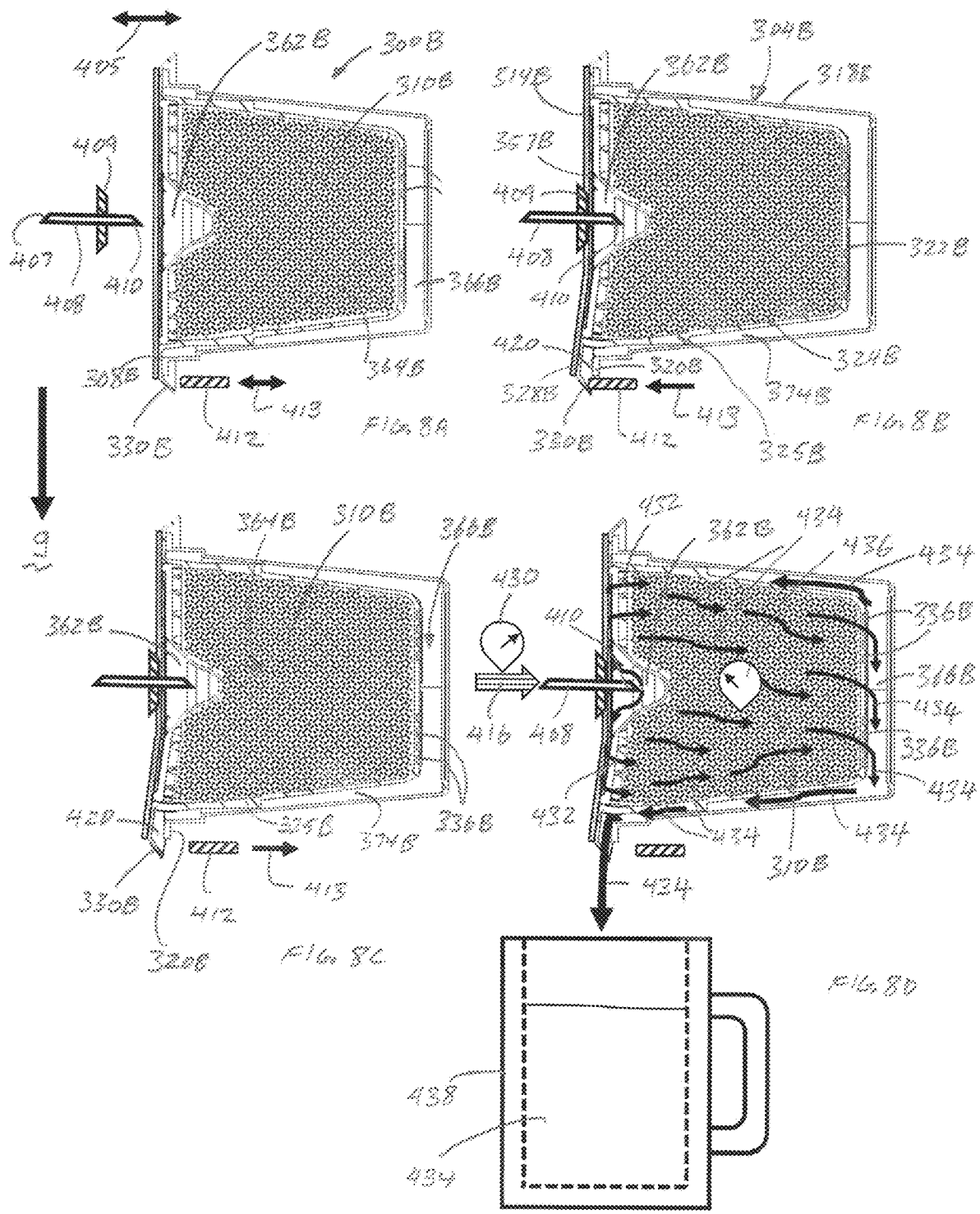

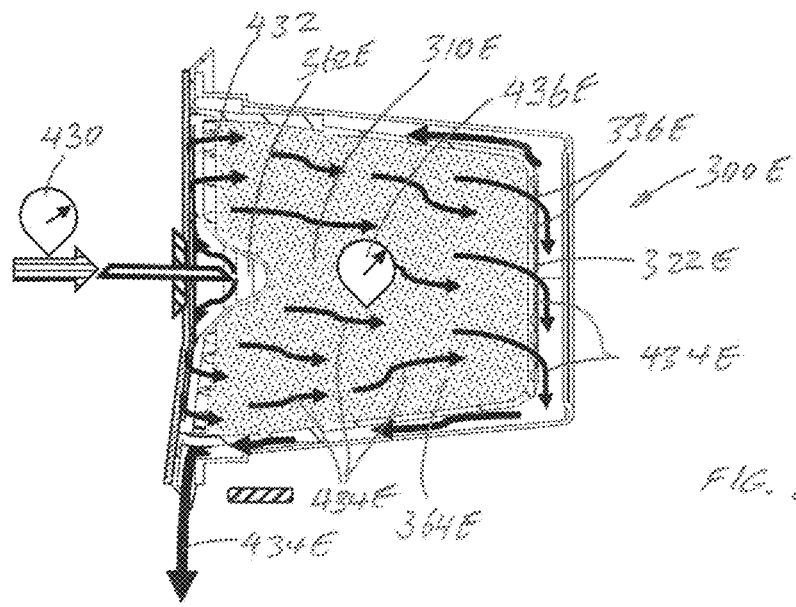
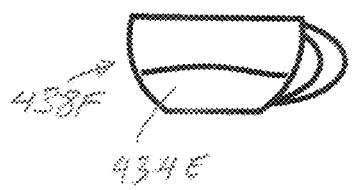
FIG. 8E
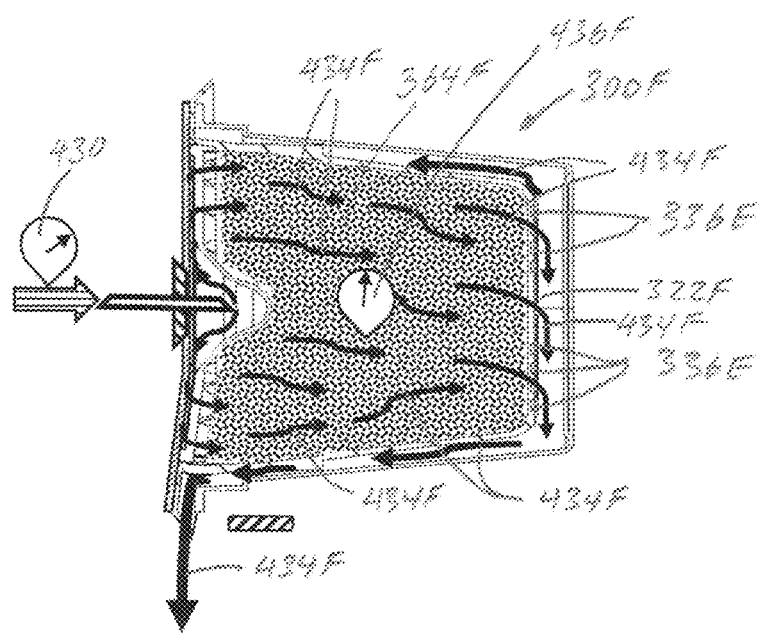
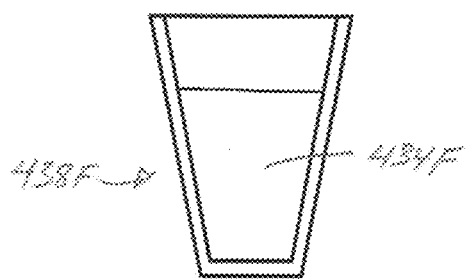
FIG. 8F

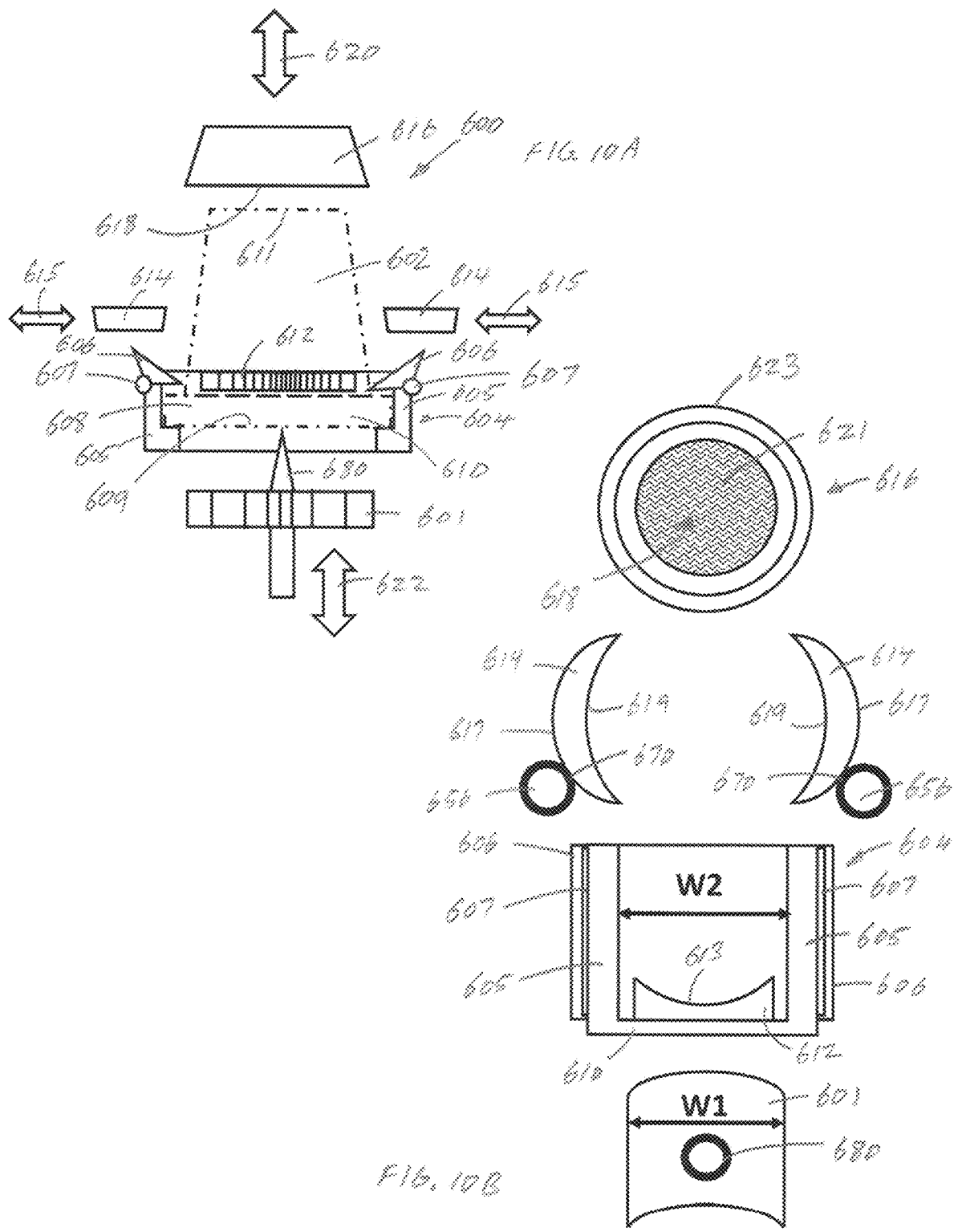

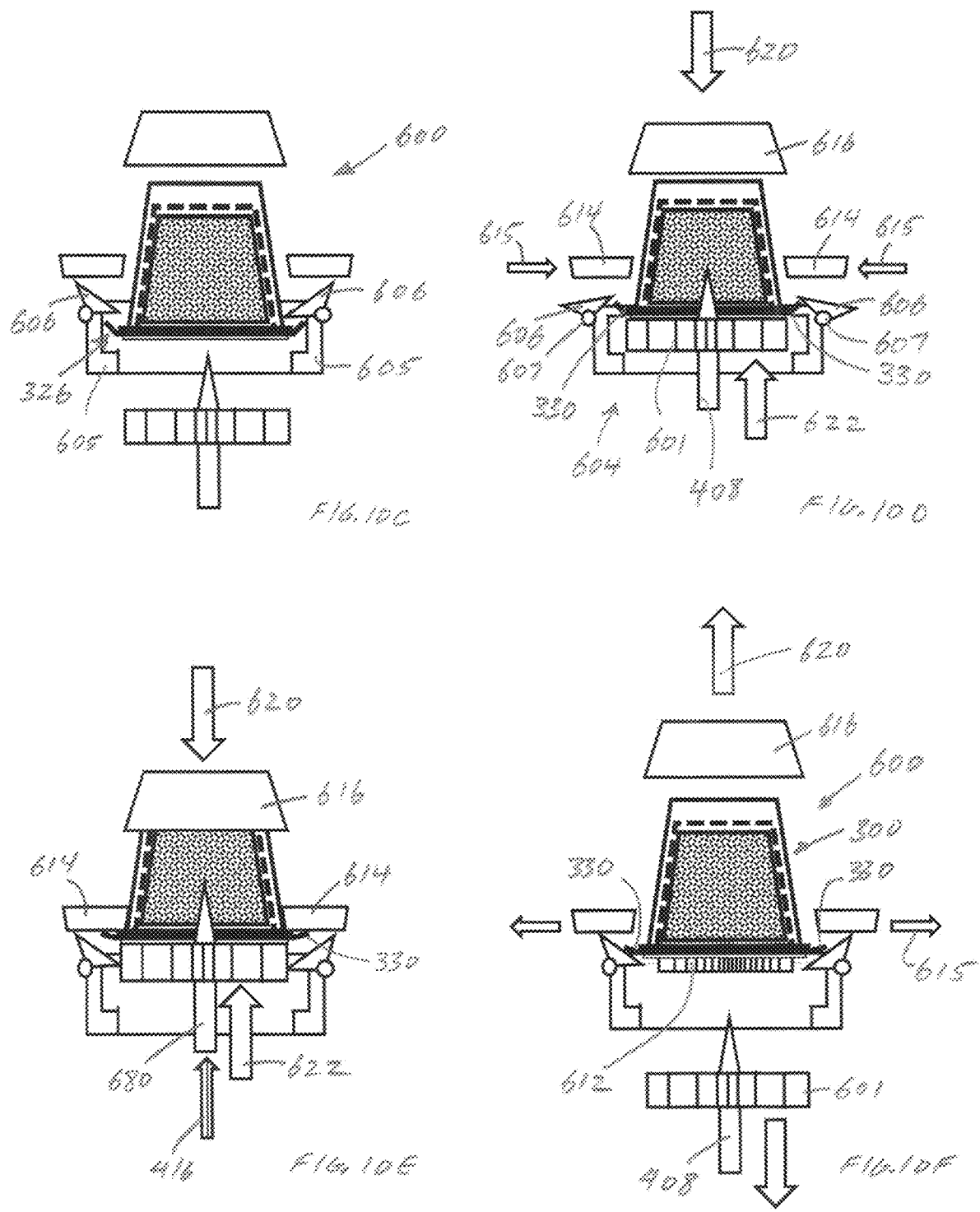

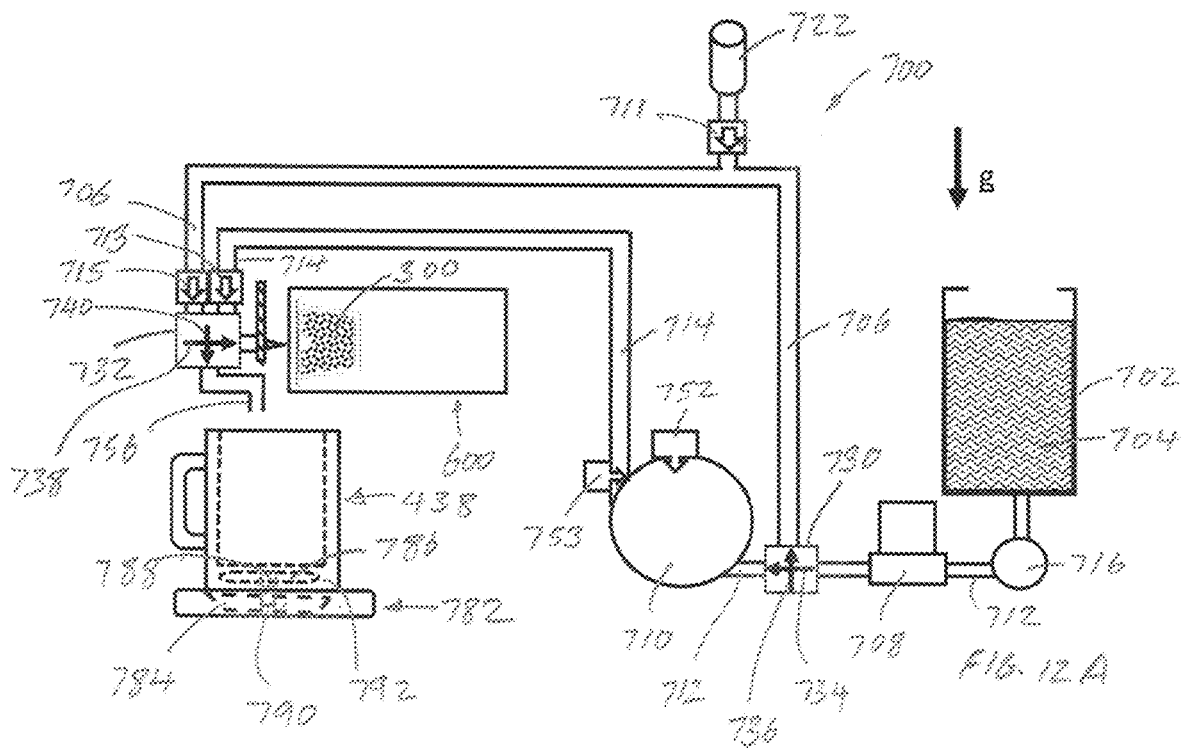
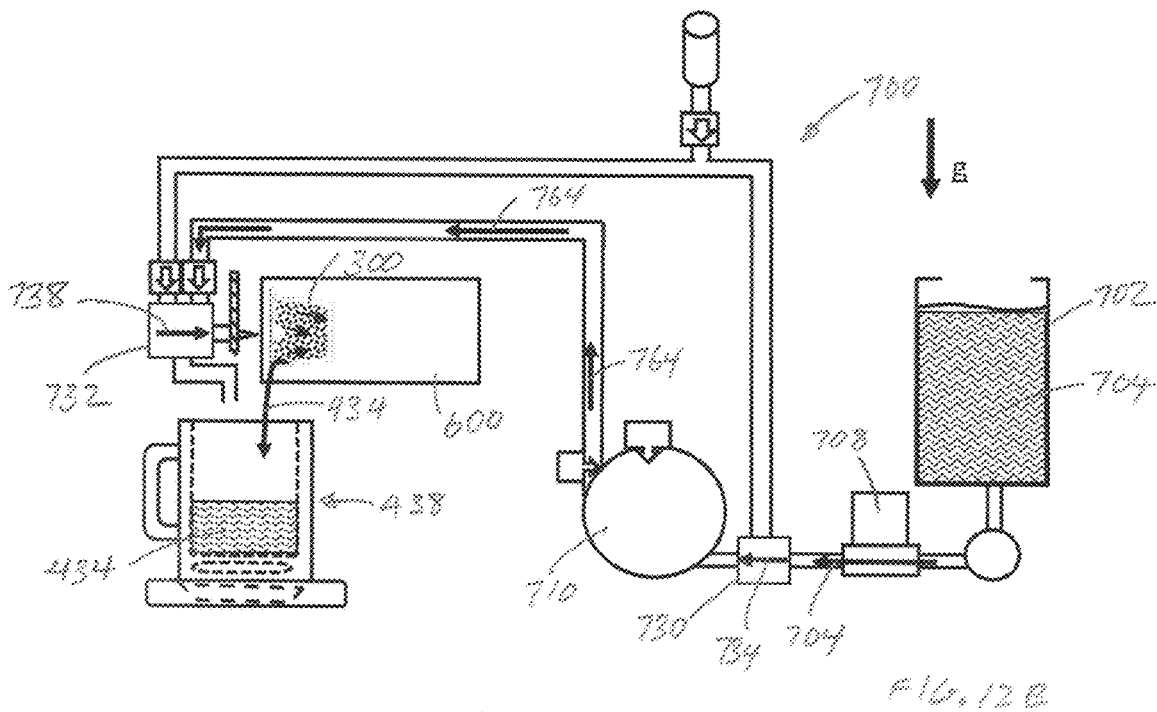

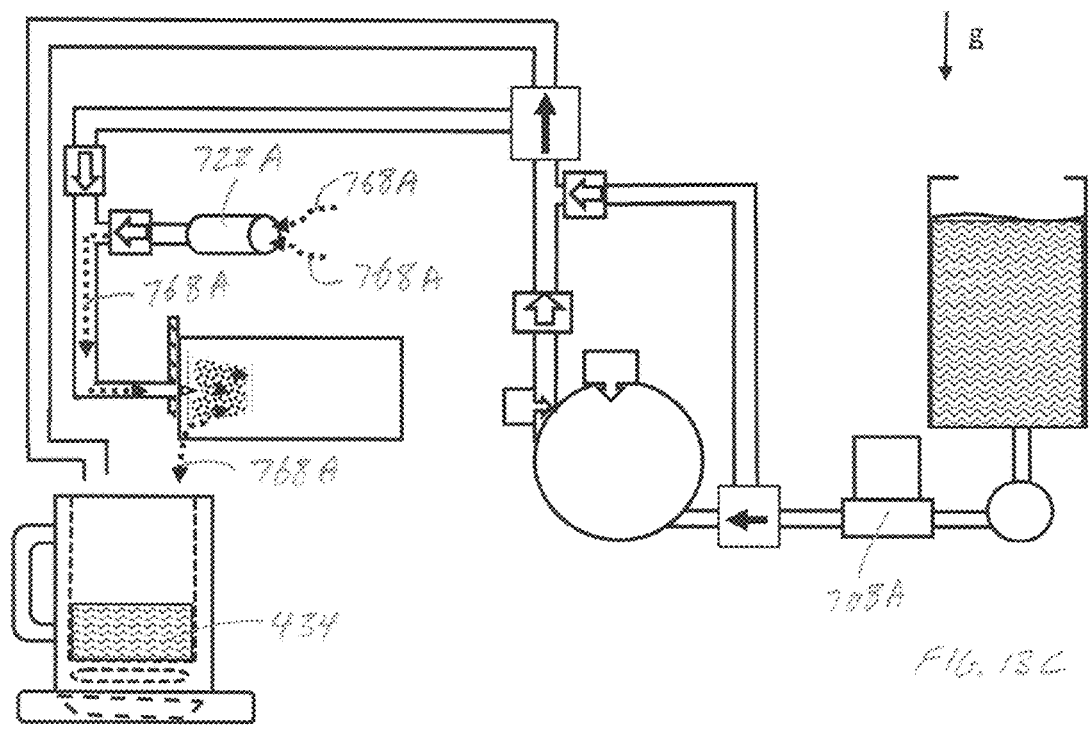
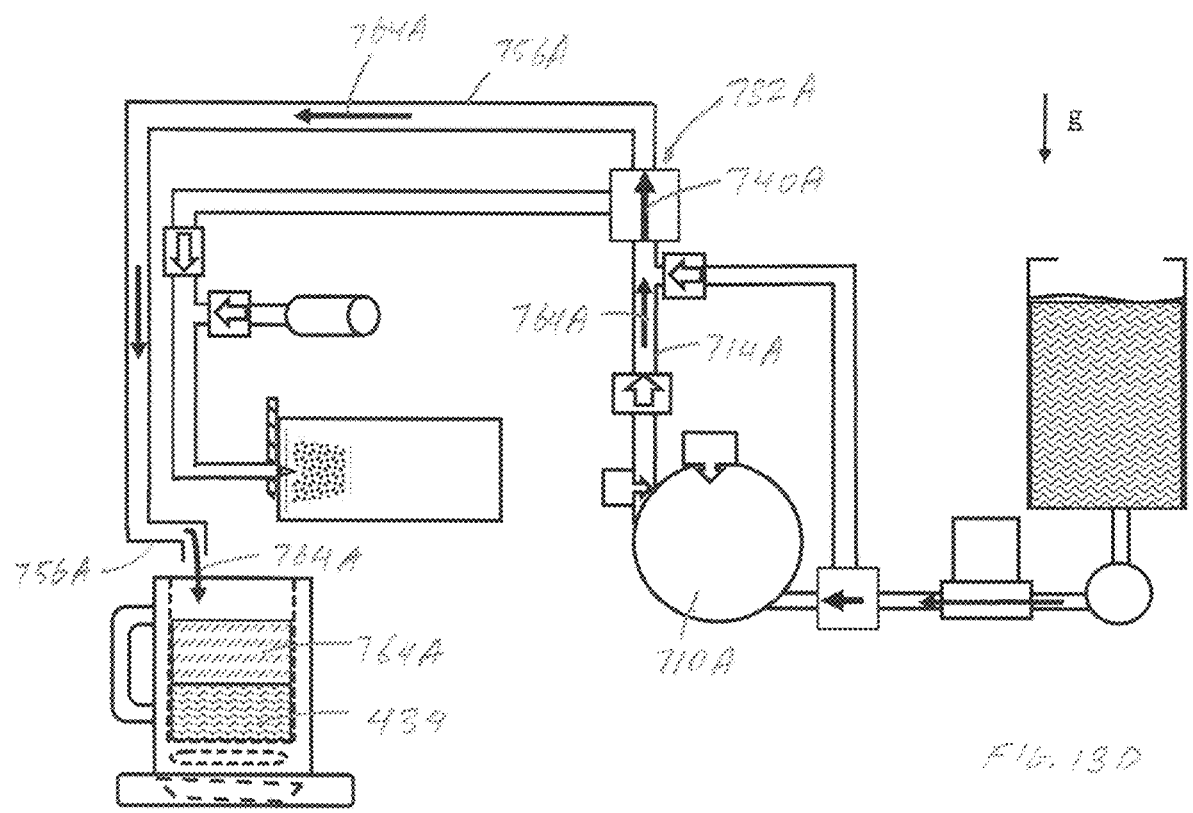

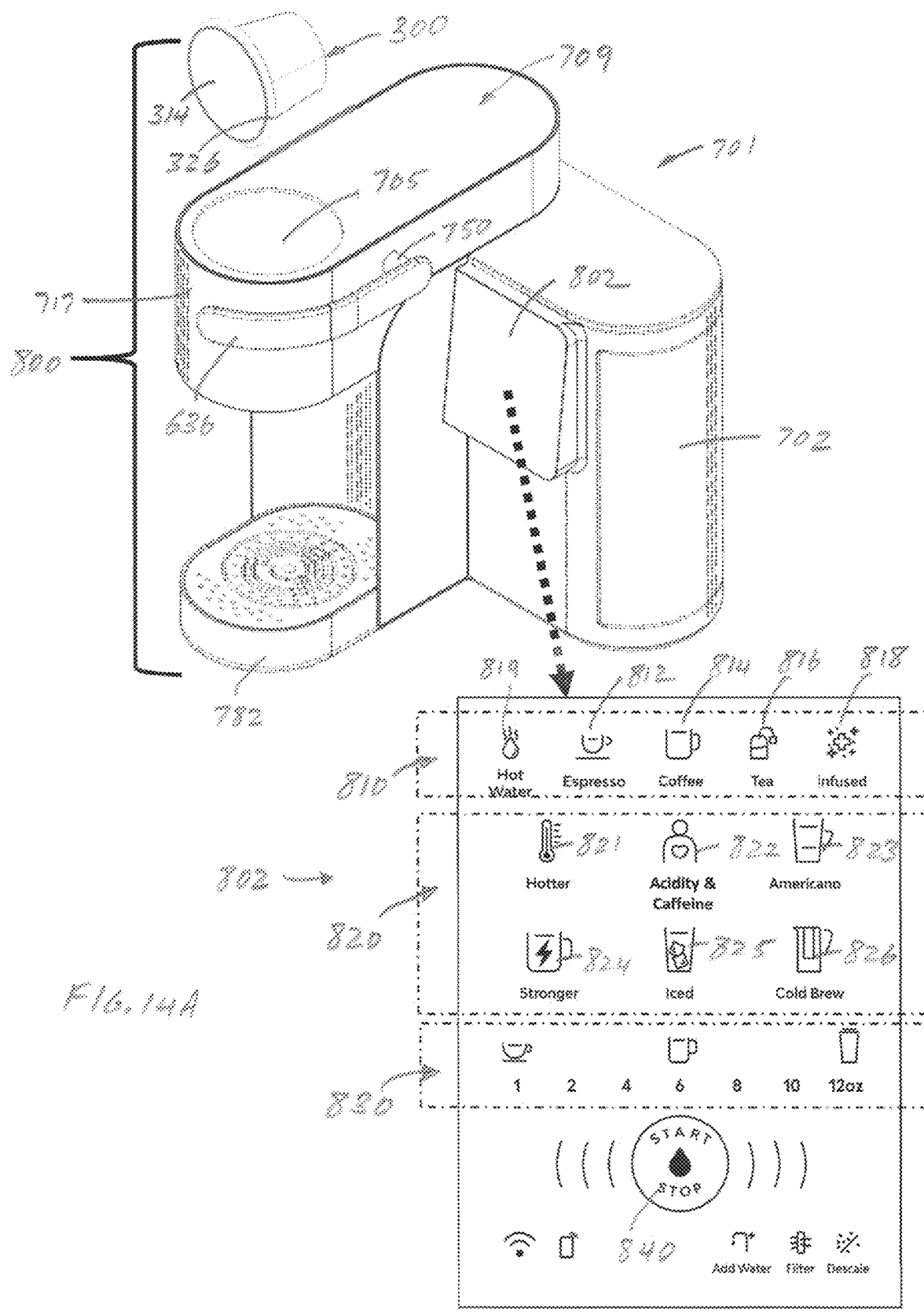

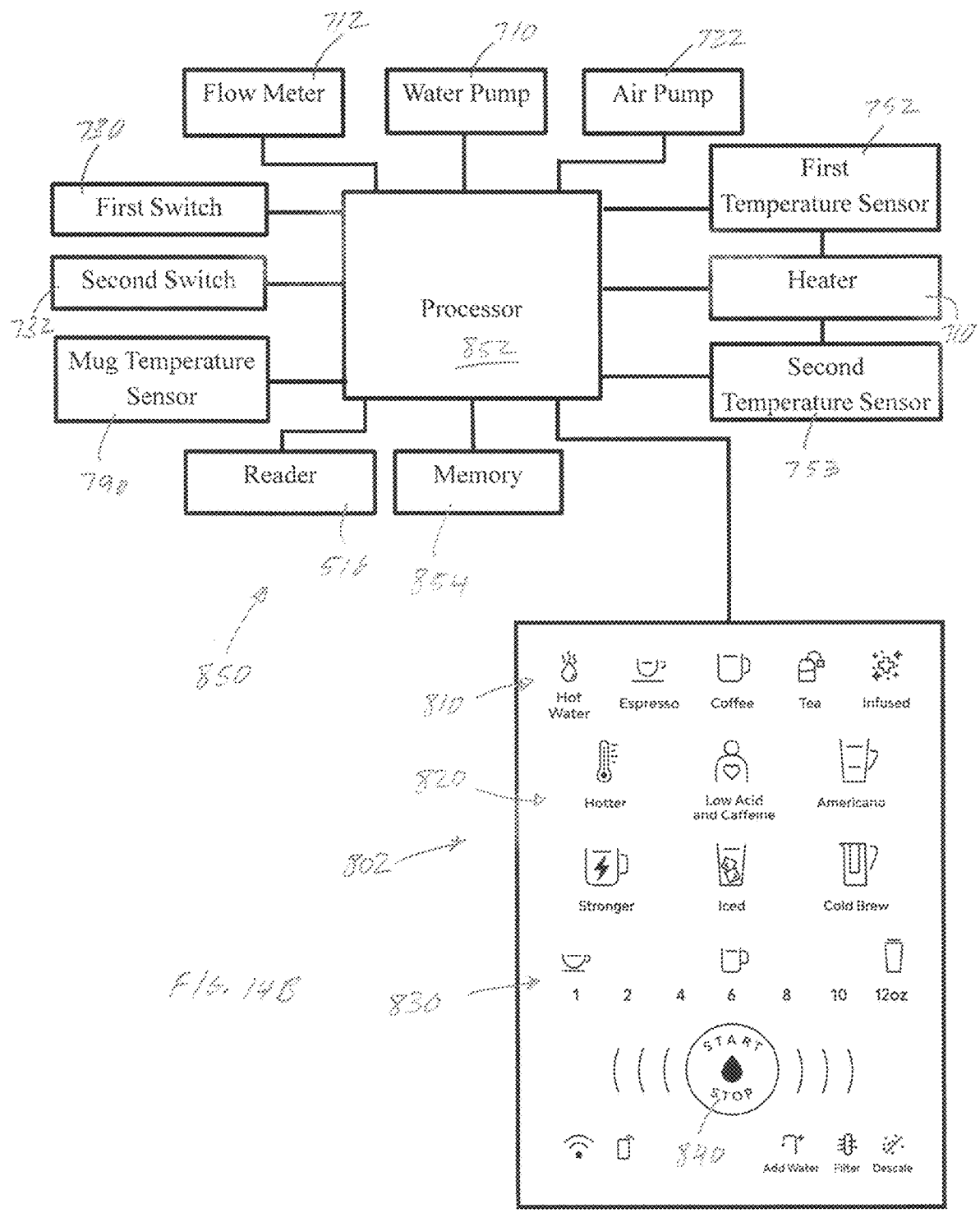

Table 3A - Espresso

| Beverage | Water Temp | Flow Rate | Infusion | Espresso | Brew Time of Espresso | Hot Water |
|---|---|---|---|---|---|---|
| Espresso 1oz* | 90.5C/195F | 1oz/20s | No | 1oz | 20s | No |
| Espresso 2oz | 90.5C/195F | 2oz/30s | No | 2oz | 30s | No |

Table 3B - Americano

| Beverage | Water Temp | Flow Rate | Infusion | Espresso | Brew Time of Espresso | Hot Water |
|---|---|---|---|---|---|---|
| Americano 8oz | 90.5C/195F | 1oz/10s | No | 3oz | 30s | 5oz |
| Americano 10oz* | 90.5C/195F | 1oz/10s | No | 3oz | 30s | 7oz |
| Americano 12oz | 90.5C/195F | 1oz/10s | No | 3oz | 30s | 9oz |

Table 3C - Espresso Over Ice

| Beverage | Water Temp | Flow Rate | Infusion | Espresso | Brew Time of Espresso | Room Temp Water |
|---|---|---|---|---|---|---|
| Espresso 4oz | 90.5C/195F | 1oz/10s | No | 3oz | 30s | 1oz |
| Espresso 6oz* | 90.5C/195F | 1oz/10s | No | 4oz | 40s | 2oz |

FIG. 14C

Table 4A - Coffee

| Beverage | Water Temp | Flow Rate | Infusion | Coffee | Brew Time of Coffee | Hot Water |
|---|---|---|---|---|---|---|
| Coffee 6oz | 90.5C/195F | 1oz/5s | No | 4oz | 20s | 2oz |
| Coffee 8oz | 90.5C/195F | 1oz/5s | No | 4oz | 20s | 4oz |
| Coffee 10oz* | 90.5C/195F | 1oz/5s | No | 5oz | 25s | 5oz |
| Coffee 12oz | 90.5C/195F | 1oz/5s | No | 5oz | 25s | 7oz |
| Coffee 6oz Strong | 90.5C/195F | 1oz/5s | Yes | 3oz | 25s | 2oz |
| Coffee 8oz Strong | 90.5C/195F | 1oz/5s | Yes | 3oz | 25s | 4oz |
| Coffee 10oz Strong | 90.5C/195F | 1oz/5s | Yes | 4oz | 30s | 5oz |
| Coffee 12oz Strong | 90.5C/195F | 1oz/5s | Yes | 4oz | 30s | 6oz |

Table 4B - Acidity & Caffeine

| Beverage | Water Temp | Flow Rate | Pulsation | Coffee | Brew Time of Coffee | Hot Water |
|---|---|---|---|---|---|---|
| Coffee 6oz | 54C/130F | 1oz/60s | Yes | 6oz | 360s | 0 |
| Coffee 8oz* | 54C/130F | 1oz/60s | Yes | 6oz | 360s | 2oz |
| Coffee 10oz | 54C/130F | 1oz/60s | Yes | 6oz | 360s | 4oz |
| Coffee 12oz | 54C/130F | 1oz/60s | Yes | 6oz | 360s | 6oz |

Table 4C - Coffee Over Ice

| Beverage | Water Temp | Flow Rate | Infusion | Coffee | Brew Time of Coffee | Room Temp Water |
|---|---|---|---|---|---|---|
| Coffee 4oz | 90.5C/195F | 1oz/8s | No | 4oz | 32s | 0 |
| Coffee 6oz* | 90.5C/195F | 1oz/8s | No | 4oz | 32s | 2oz |
| Coffee 4oz Strong | 90.5C/195F | 1oz/10s | No | 4oz | 40s | 0 |
| Coffee 6oz Strong | 90.5C/195F | 1oz/10s | No | 4oz | 40s | 2oz |

Table 4D - Cold Brew Coffee

| Beverage | Water Temp | Flow Rate | Pulsation | Coffee | Brew Time of Coffee | Room Temp Water |
|---|---|---|---|---|---|---|
| Coffee 6oz | 49C/120F | .8oz/60s | Yes | 6oz | 480s | 0 |
| Coffee 8oz* | 49C/120F | .8oz/60s | Yes | 6oz | 480s | 2oz |
| Coffee 10oz | 49C/120F | .8oz/60s | Yes | 6oz | 480s | 4oz |
| Coffee 12oz | 49C/120F | .8oz/60s | Yes | 6oz | 480s | 6oz |
| Coffee 6oz Strong | 49C/120F | .8oz/60s | Yes | 6oz | 480s | 0 |
| Coffee 8oz Strong | 49C/120F | .8oz/60s | Yes | 6oz | 480s | 2oz |
| Coffee 10oz Strong | 49C/120F | .8oz/60s | Yes | 6oz | 480s | 4oz |
| Coffee 12oz Strong | 49C/120F | .8oz/60s | Yes | 6oz | 480s | 6oz |

FIG. 14D

Table 5A - Tea & Infused Drinks

| Beverage | Water Temp | Flow Rate | Infusion | Tea | Brew Time of Tea | Hot Water |
|---|---|---|---|---|---|---|
| Tea 2oz | 82C/180F | 1oz/10s | No | 2oz | 20s | 0 |
| Tea 4oz | 82C/180F | 1oz/10s | No | 4oz | 40s | 0 |
| Tea 6oz* | 82C/180F | 1oz/10s | No | 6oz | 60s | 0 |
| Tea 8oz | 82C/180F | 1oz/10s | No | 8oz | 80s | 0 |
| | | | | | | |
| Tea 2oz Strong | 82C/185F | 1oz/10s | Yes | 2oz | 25s | 0 |
| Tea 4oz Strong | 82C/185F | 1oz/10s | Yes | 4oz | 45s | 0 |
| Tea 6oz Strong | 82C/185F | 1oz/10s | Yes | 6oz | 65s | 0 |
| Tea 8oz Strong | 82C/185F | 1oz/10s | Yes | 8oz | 85s | 0 |

Table 5B - Tea Over Ice

| Beverage | Water Temp | Flow Rate | Infusion | Tea | Brew Time of Tea | Room Temp Water |
|---|---|---|---|---|---|---|
| Tea 4oz | 82C/180F | 1oz/10s | No | 4oz | 40s | 0 |

FIG. 14E

Table 6A

| Sample | Temp (F) | Time (Sec) | Size (oz) | Press | Coffee (oz) | Water (oz) | TDS | pH | Caffeine (mg) | Sourness | Bitterness | Astringent | Comments |
|---|---|---|---|---|---|---|---|---|---|---|---|---|---|
| 1 | 190 | 40 | 8 | LP | 8 | 0 | 0.96 | 5.34 | 118.57 | -29.95 | 11.62 | 5.69 | Est baseline KK |
| 2 | 130 | 360 | 8 | LP | 6 | 2 | 1.01 | 5.50 | 127.37 | -31.81 | 10.17 | 3.56 | caffeine KK |
| 3 | 120 | 600 | 8 | LP | 6 | 2 | 1.03 | 5.51 | 126.88 | -31.72 | 9.70 | 3.33 | cold brew KK |
| 4 | 190 | 30 | 8 | LP | 4 | 4 | 0.80 | 5.37 | 93.15 | -29.55 | 9.91 | 4.32 | smooth KK |
| 5 | 200 | 30 | 8 | LP | 4 | 4 | 0.86 | 5.38 | 102.98 | -31.24 | 10.02 | 3.57 | Hotter KK |
| 6 | 190 | 40 | 8 | LP | 8 | 0 | 1.11 | 5.17 | 141.62 | -28.30 | 10.04 | 5.49 | Est baseline SB |
| 7 | 130 | 360 | 8 | LP | 6 | 2 | 1.13 | 5.35 | 154.81 | -31.24 | 10.02 | 3.57 | caffeine SB |
| 8 | 120 | 600 | 8 | LP | 6 | 2 | 1.15 | 5.33 | 150.53 | -30.26 | 8.25 | 3.12 | cold brew SB |
| 9 | 190 | 30 | 8 | LP | 4 | 4 | 0.83 | 5.21 | 107.75 | -27.90 | 8.60 | 4.52 | smooth SB |
| 10 | 200 | 30 | 8 | LP | 4 | 4 | 0.98 | 5.18 | 115.52 | -29.52 | 8.69 | 3.70 | Hotter SB |
| 11 | 180 | 30 | 8 | HP | 8 | 0 | 0.96 | 5.42 | 113.05 | -30.73 | 11.29 | 5.37 | Est baseline for HP KK |
| 12 | 180 | 30 | 8 | HP | 4 | 4 | 0.82 | 5.42 | 95.22 | -30.24 | 10.08 | 4.51 | smooth KK |
| 13 | 180 | 30 | 8 | HP | 8 | 0 | 1.05 | 5.25 | N/A | -29.13 | 9.90 | 5.32 | Est baseline for HP SB |
| 14 | 180 | 30 | 8 | HP | 4 | 4 | 0.93 | 5.25 | N/A | -28.89 | 8.98 | 4.74 | smooth SB |
| 15 | N/A | | N/A | LP | N/A | N/A | 1.60 | 6.37 | N/A | -28.68 | 7.20 | 2.24 | SBUX Cold Brew Draft |
| 16 | N/A | | N/A | LP | N/A | N/A | 1.36 | 5.91 | | -32.45 | 5.60 | -0.01 | SBUX RTD |

Samples Specs:
KK = Kirkland, dark roast, 11.5g
SB = Starbucks, medium roast, 12.7g
LP = Low Pressure
HP = High Pressure

FIG. 15A

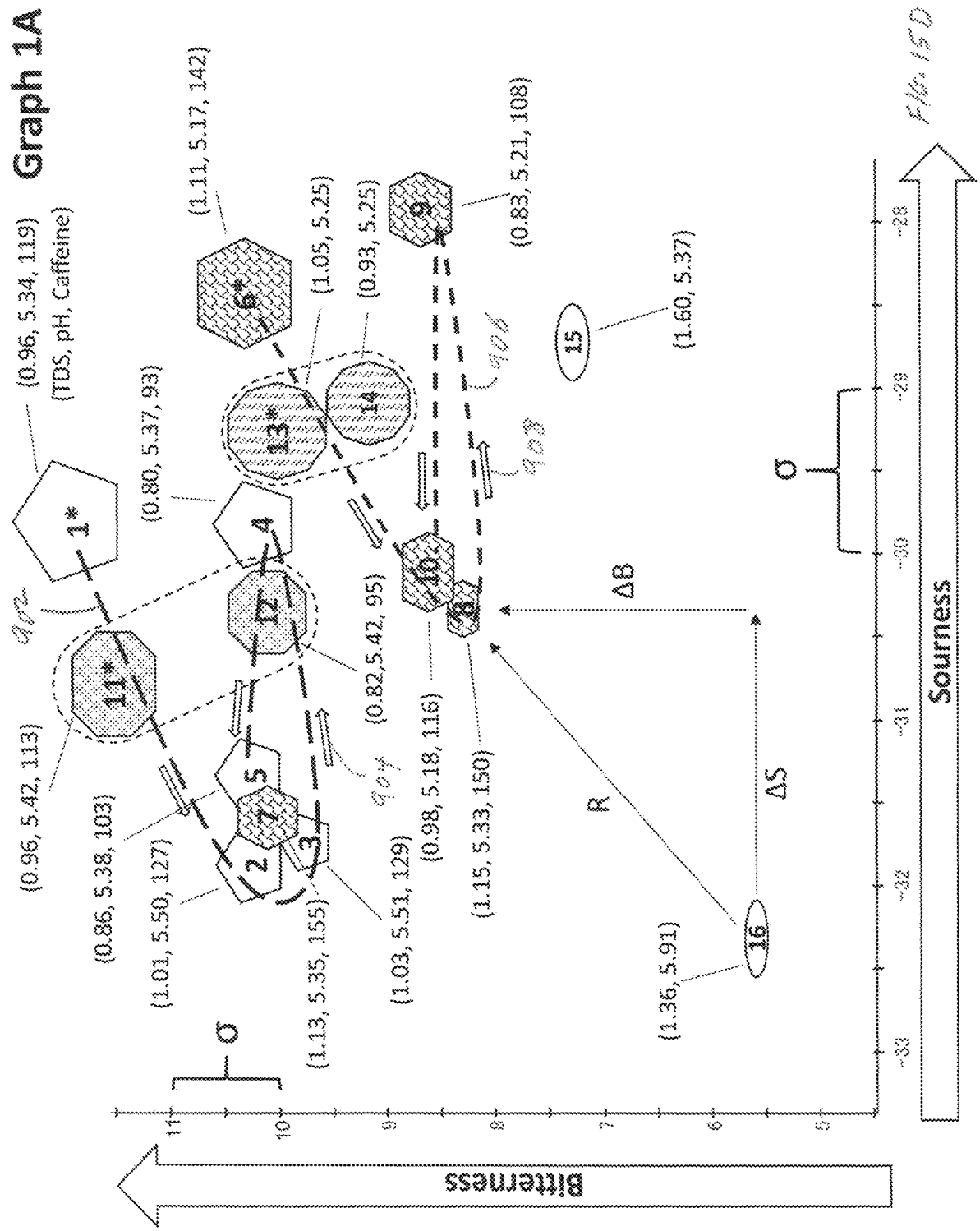

Table 6B

| Sample | Sourness Scale | Sourness Concentration | ΔSourness % | Bitterness Scale | Bitterness Concentration | ΔBitterness % | Astringent Scale | Astringent Concentration | ΔAstringent % |
|---|---|---|---|---|---|---|---|---|---|
| 1 | -29.95 | -235.22 | Baseline | 11.62 | 8.32 | Baseline | 5.69 | 2.82 | Baseline |
| 2 | -31.81 | -330.18 | 40% | 10.17 | 6.39 | 23% | 3.56 | 1.91 | 32% |
| 3 | -31.72 | -324.81 | 36% | 9.70 | 5.86 | 30% | 3.33 | 1.84 | 35% |
| 4 | -29.55 | -218.68 | -7% | 9.91 | 6.09 | 27% | 4.32 | 2.20 | 22% |
| 5 | -31.24 | -297.59 | 27% | 10.02 | 6.21 | 25% | 3.57 | 1.92 | 32% |
| 6 | -28.30 | -174.11 | Baseline | 10.04 | 6.24 | Baseline | 5.49 | 2.72 | Baseline |
| 7 | -31.24 | -297.59 | 71% | 10.02 | 6.21 | 0% | 3.57 | 1.92 | 30% |
| 8 | -30.26 | -248.90 | 43% | 8.25 | 4.50 | 28% | 3.12 | 1.77 | 35% |
| 9 | -27.90 | -161.87 | -7% | 8.60 | 4.80 | 23% | 4.52 | 2.28 | 16% |
| 10 | -29.52 | -217.49 | 25% | 8.69 | 4.88 | 22% | 3.70 | 1.96 | 28% |
| 11 | -30.73 | -271.17 | Baseline | 11.29 | 7.83 | Baseline | 5.37 | 2.66 | Baseline |
| 12 | -30.24 | -247.99 | -9% | 10.08 | 6.28 | 20% | 4.51 | 2.28 | 15% |
| 13 | -29.13 | -202.56 | Baseline | 9.90 | 6.08 | Baseline | 5.32 | 2.64 | Baseline |
| 14 | -28.89 | -193.89 | -4% | 8.98 | 5.14 | 15% | 4.74 | 2.37 | 10% |
| 15 | -28.68 | -166.60 | | 7.20 | 3.72 | | 2.24 | 1.50 | |
| 16 | -32.45 | -371.05 | | 5.60 | 2.78 | | -0.01 | 1.00 | |

FIG. 15G

Table 6C

| Sample | Sourness Scale | Bitterness Scale | Radius vs Baseline Scale | Radius vs Sample 16 Scale | Comments |
|---|---|---|---|---|---|
| 1 | -29.95 | 11.62 | Baseline | 6.52 | Est baseline KK |
| 2 | -31.81 | 10.17 | 2.36 | 4.61 | caffeine KK |
| 3 | -31.72 | 9.70 | 2.61 | 4.16 | cold brew KK |
| 4 | -29.55 | 9.91 | 1.76 | 5.19 | smooth KK |
| 5 | -31.24 | 10.02 | 2.06 | 4.58 | Hotter KK |
| 6 | -28.30 | 10.04 | Baseline | 6.08 | Est baseline SB |
| 7 | -31.24 | 10.02 | 2.94 | 4.58 | caffeine SB |
| 8 | -30.26 | 8.25 | 2.65 | 3.44 | cold brew SB |
| 9 | -27.90 | 8.60 | 1.49 | 5.45 | smooth SB |
| 10 | -29.52 | 8.69 | 1.82 | 4.26 | Hotter SB |
| 11 | -30.73 | 11.29 | Baseline | 5.94 | Est baseline for HP KK |
| 12 | -30.24 | 10.08 | 1.31 | 5.00 | smooth KK |
| 13 | -29.13 | 9.90 | Baseline | 5.43 | Est baseline for HP SB |
| 14 | -28.89 | 8.98 | 0.95 | 4.91 | smooth SB |
| 15 | -28.68 | 7.20 |  | 4.10 | SBUX Cold Brew Draft |
| 16 | -32.45 | 5.60 |  |  | SBUX RTD |

FIG. 15F

Table 6D

| Sample | Sourness Scale | Bitterness Scale | Radius vs Baseline Scale | Radius vs Sample 16 Scale | Comments |
|---|---|---|---|---|---|
| 8 | -30.26 | 8.25 | 2.65 | 3.44 | cold brew SB |
| 15 | -28.68 | 7.20 |  | 4.10 | SBUX Cold Brew Draft |
| 3 | -31.72 | 9.70 | 2.61 | 4.16 | cold brew KK |
| 10 | -29.52 | 8.69 | 1.82 | 4.26 | Hotter SB |
| 5 | -31.24 | 10.02 | 2.06 | 4.58 | Hotter KK |
| 7 | -31.24 | 10.02 | 2.94 | 4.58 | caffeine SB |
| 2 | -31.81 | 10.17 | 2.36 | 4.61 | caffeine KK |
| 14 | -28.89 | 8.98 | 0.95 | 4.91 | smooth SB |
| 12 | -30.24 | 10.08 | 1.31 | 5.00 | smooth KK |
| 4 | -29.55 | 9.91 | 1.76 | 5.19 | smooth KK |
| 13 | -29.13 | 9.90 | Baseline | 5.43 | Est baseline for HP SB |
| 9 | -27.90 | 8.60 | 1.49 | 5.45 | smooth SB |
| 11 | -30.73 | 11.29 | Baseline | 5.94 | Est baseline for HP KK |
| 6 | -28.30 | 10.04 | Baseline | 6.08 | Est baseline SB |
| 1 | -29.95 | 11.62 | Baseline | 6.52 | Est baseline KK |
| 16 | -32.45 | 5.60 |  | Baseline | SBUX RTD |

FIG. 15G

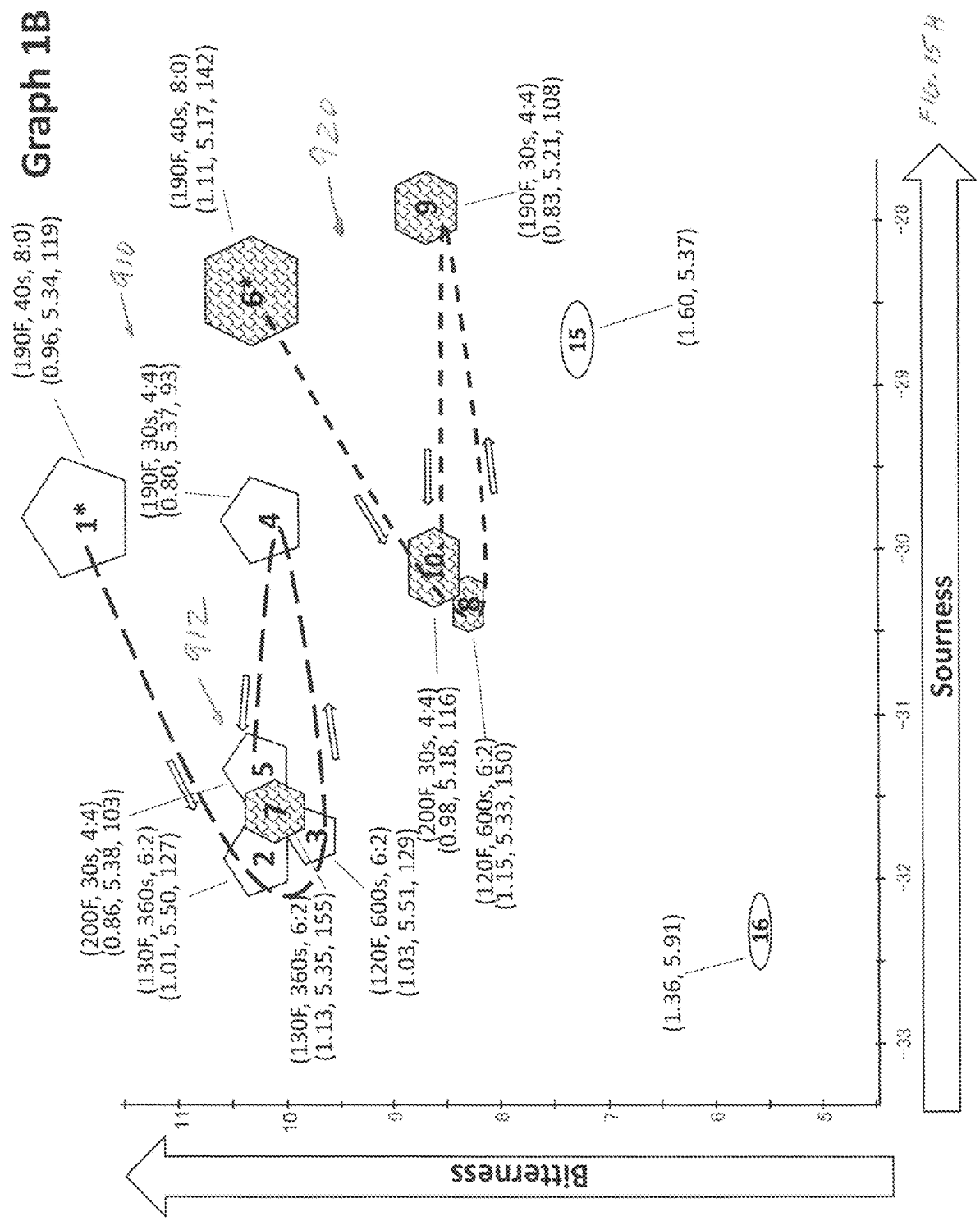

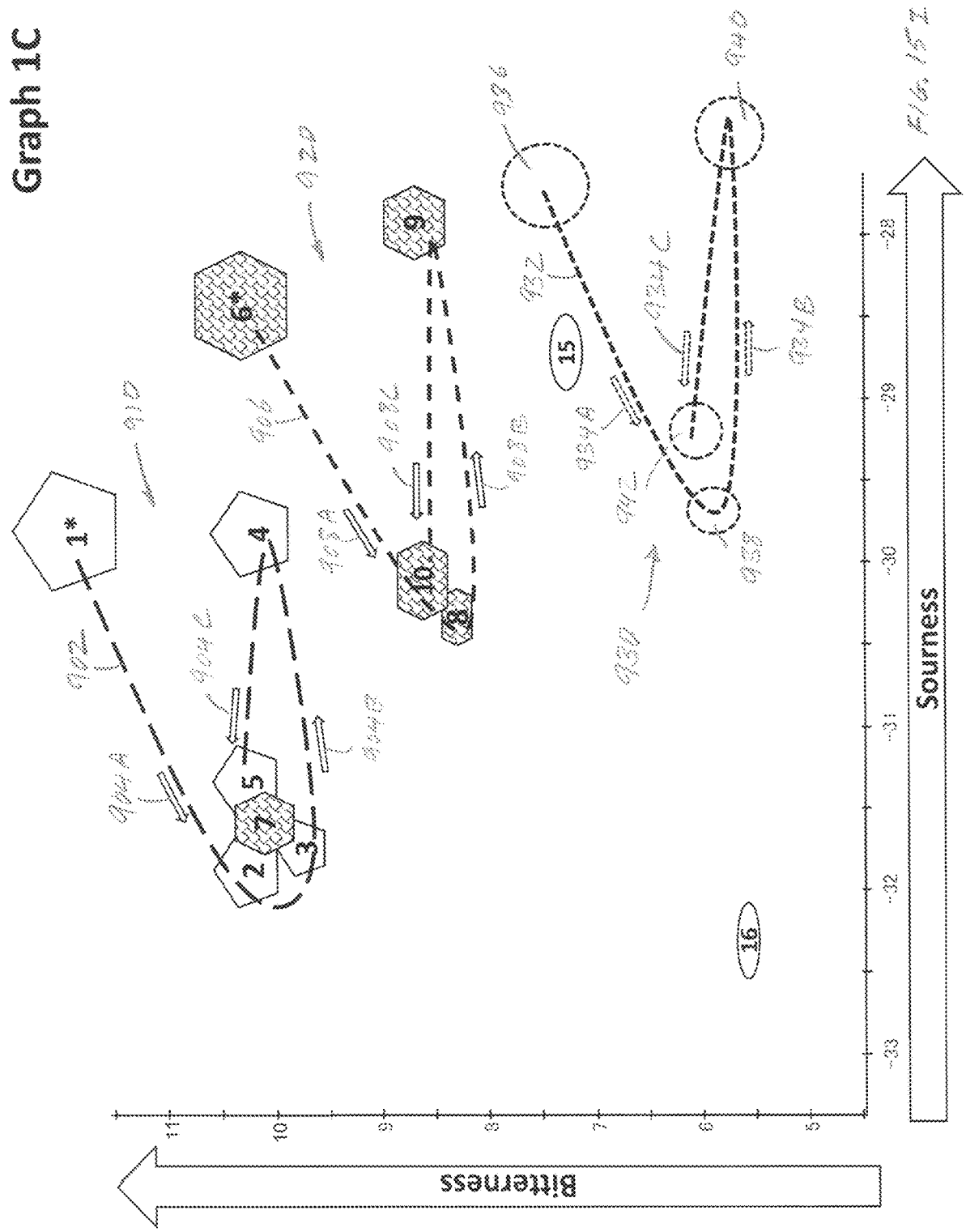

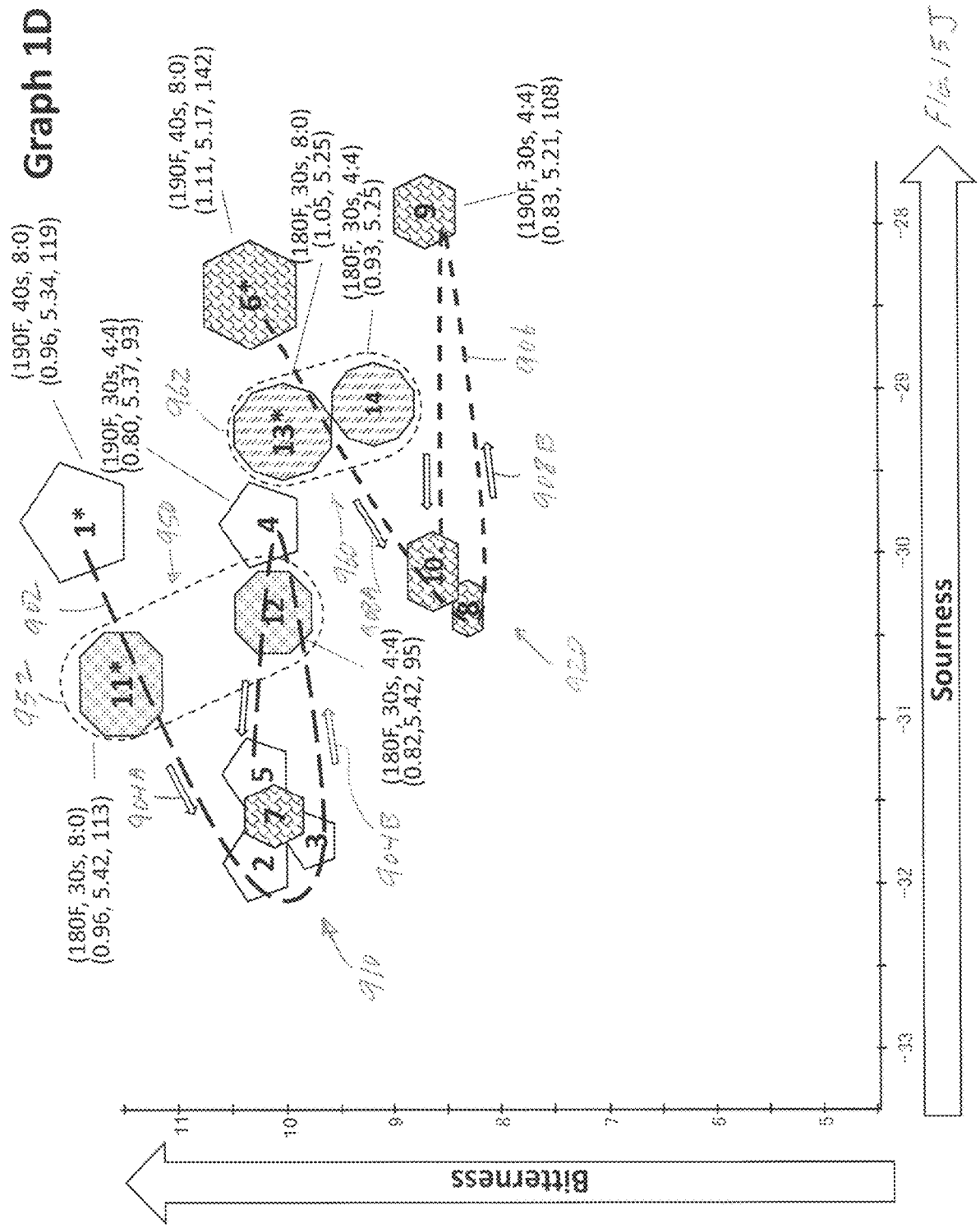

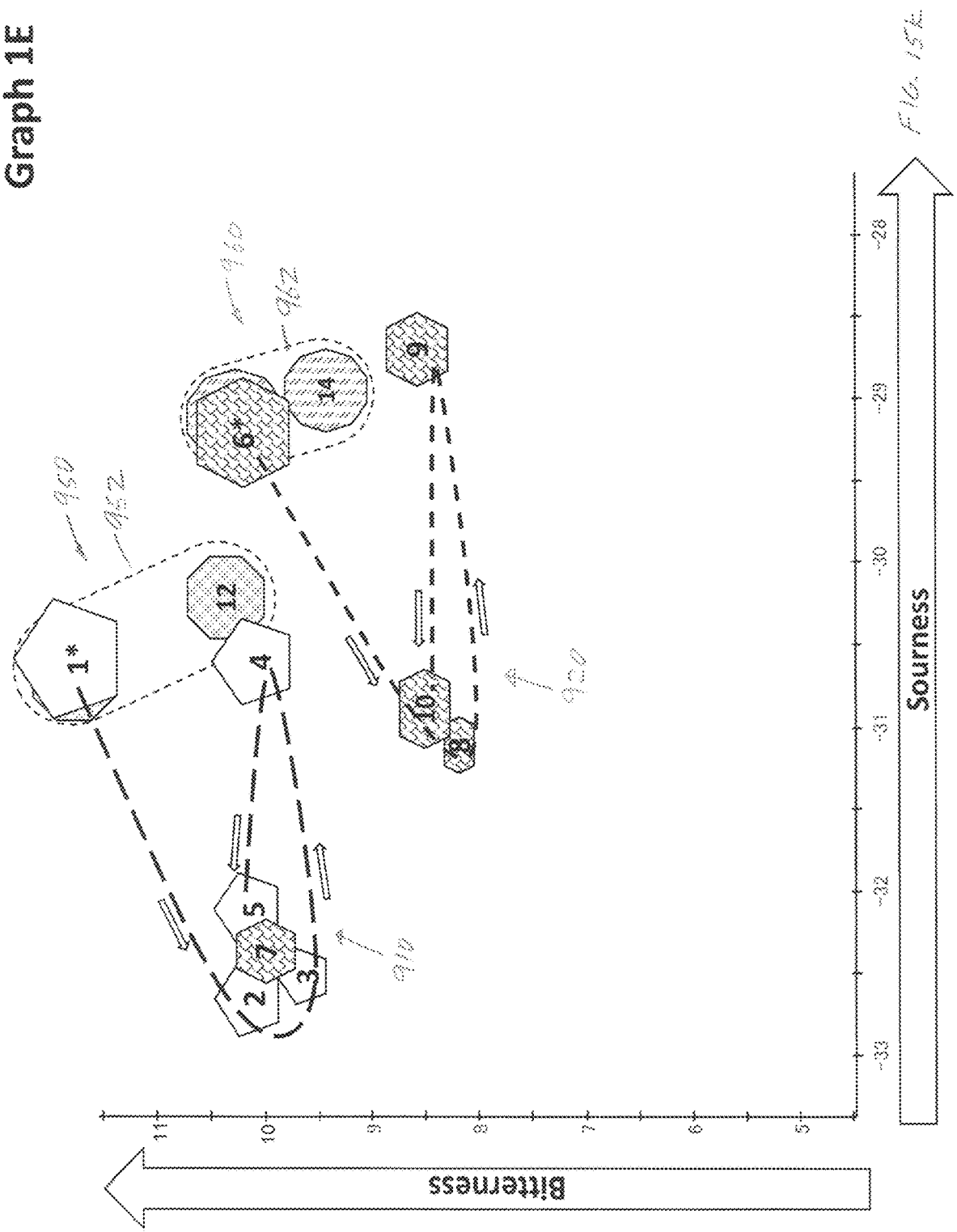

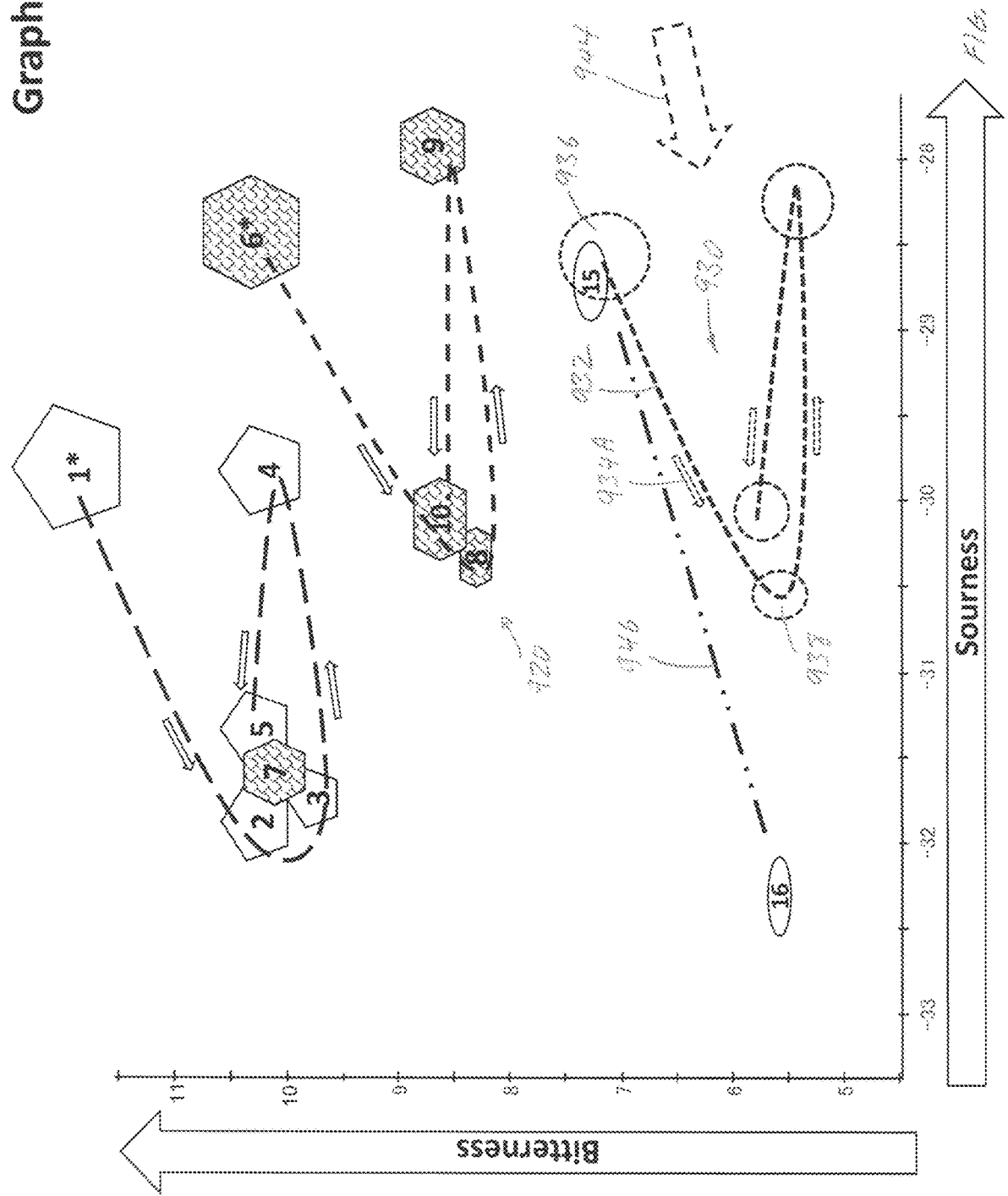

CONTROLLING BREWING PARAMETERS OF SINGLE-SERVE BEVERAGE SYSTEM

RELATED APPLICATION

This application claims priority to U.S. Provisional Application Ser. Nos.: (1) 62/746,929, filed Oct. 17, 2018, entitled LOW AND HIGH PRESSURE SINGLE-SERVE BEVERAGE SYSTEM FOR BREWING DIFFERENT BEVERAGES; (2) 62/746,949, filed Oct. 17, 2018, entitled SINGLE-SERVE BEVERAGE SYSTEM FOR BREWING DIFFERENT BEVERAGES; (3) 62/809,502, filed Feb. 22, 2019, entitled SINGLE-SERVE BEVERAGE SYSTEM FOR CONTROLLING BREWING PARAMETERS; (4) 62/809,117, filed Feb. 22, 2019, entitled SINGLE-SERVE BEVERAGE POD INCORPORATING PRIMARY AND SECONDARY BEVERAGE INGREDIENTS; and (5) 62/855,696, filed May 31, 2019, entitled SINGLE-SERVE BEVERAGE SYSTEM FOR CONTROLLING BREWING PARAMETERS, which are all hereby incorporated by references.

BACKGROUND OF THE INVENTION

Field of the Invention

Beverage brewing system controls the brewing parameters to brew a beverage with a desired taste profile such as strength, caffeine level, acidity, sourness, bitterness, astringency and etc.; and in particular, the brewing system may control the taste profile of a beverage brewed through a single-serve pod by adjusting the brewing parameters such as the water temperature, brewing time, brewing pressure, and amount of beverage to water ratio to brew wide range of beverages from hot to near room temperature beverages.

Background of the Invention

The following background discussion is not an admission that the matters discussed below are citable as prior art or common general knowledge. Rather, the general background information disclosed herein is directed to describing the problem(s) associated with the current state of the art, and a need for a better solution.

Single-serve pod systems are popular for their convenience and a variety of different flavor beverages which are offered. As of 2019, the market leader of single-serve pods in North America is Keurig Dr Pepper, Inc.®, which sells its single-serve platform under the Keurig® brand name, collectively hereafter may be referred to as Keurig®. While Keurig® offers over 400 different variety of single-serve pods, also known as K-Cup® pods (hereinafter referred to as "K-Cup(s)" or "K-Cup pod(s)") to brew coffee, tea, and hot cocoa; a vast majority of K-pods are directed to brewing hot coffee. Keurig also sells brewers specially designed to work with K-Cup pods to brew hot beverages (collectively referred to as "Keurig Brewing System"). Despite the convenience of single-serve pods, many coffee drinkers have not adapted to the single-serve pod system, such as the Keurig Brewing System, due to the dissatisfied taste from the coffee brewed through such single-serve brewing platforms.

While coffee taste preference may be subjective, some coffee industry leaders have tried to establish objective criteria to define what constitute good and bad tasting coffee. In this regard, the Coffee Brewing Center ("CBC") during the 1960's, led by Dr. Earl Lockhart, has done substantial research in understanding the physics and science behind what may and may not constitutes a good tasting coffee. The CBC has come up with what is called the "*Coffee Brewing Control Chart*" like the one shown in FIG. 1, which provides a chart 100 with graphical representation of strength, extraction and brew formula to provide some objective standards for brewing balanced tasting coffee. According to the chart 100, an ideal tasting coffee spectrum 102 may be obtained when there is a good combination of strength 104 along the vertical axis and extraction 106 along the horizontal axis. Strength is also referred to as total dissolved solids ("TDS"), and according to CBC the ideal TDS level is 1.15%-1.35%. For example, TDS level of 1.00% means there is 1.00% of coffee concentration and the remaining 99.00% is heated water in the cup. According to the chart, coffee having a TDS level below 1.15% may taste weak; while coffee having a TDS level above 1.35% may taste too strong. As a reference, coffee from a traditional coffee house, such as Starbucks®, may have a TDS level from about 1.20% to about 1.35%. In practice, a consumer's taste preference is subjective and some coffee drinkers may find that coffee with a TDS level of 0.80% to 1.00% to be mild and acceptable in terms of taste; while a TDS level of 1.00% to 1.15% to be medium strength; and a TDS level from about 1.15% to about 1.35% to taste too strong. Again, taste is subjective so that consumers may have different TDS levels which they prefer in their coffee.

The chart in FIG. 1 also indicates that the ideal extraction level for coffee is 18%-22%. Extraction means amount of coffee that has dissolved from the coffee grind into the coffee drink. For example, if 10 grams of coffee grind is brewed, and after the brewing there is 8.0 grams of coffee grind left, then the extraction level is 20% because 2.0 grams or 20% of the coffee grind have dissolved into coffee. The extraction level below 18% may indicate a coffee taste that is underdeveloped such that it may have a weak peanut-like flavor, while extractions over 22% may indicate a coffee taste that is over-extracted, which increases the strength of the coffee or TDS level, but the coffee may taste overly bitter and astringent. It should be noted that some bitterness flavor may be needed to enhance the taste of the coffee when combined other fruity, sweet, nutty flavors extracted from the same coffee grounds such that overall taste of the coffee is well balanced. However, the fruity and sweet flavors generally extract early during the brewing process while bitter flavors may require higher temperature and longer brewing time to extract from the same coffee grounds. As such, overheating the water and overextending the brewing time may over extract the bitter flavors from the same coffee grounds such that the coffee may taste unbalanced and overly bitter which may be undesirable for many coffee drinkers.

One of the reasons why many consumers have not adapted to a single-serve pod system such as Keurig Brewing System is that it brews coffee in a fairly consistent manner so that coffee generally taste similar from one pod to the next without much variation other than the serving-size of the coffee. While some may enjoy a consistent tasting coffee, many do not because consumers have a wide spectrum of taste preferences for their coffee. For instance, some may like strong tasting coffee while others may like it mild, some may like it with a bit of bitterness while others like it smooth, and some may want a lot of caffeine while others do not. Moreover, the same coffee drinker may desire a strong cup of coffee in the morning and mild tasting coffee in the afternoon and evening, and a hot coffee during the winter months while cold coffee in the summer months. Accordingly, there is a need for a single-serve brewing system that can brew coffee based on the wide taste preference of the coffee drinker.

INVENTION SUMMARY

One of the aspects of the invention is to provide a beverage brewing system including a brewer that works with a pod that may adjust the taste profile of the beverage and the format in which the beverage is served. The pod includes a filter within a container. The filter may have a base that extends upwardly to form a side wall, and then extends outwardly to form an extension. The container may have a base that extends upwardly to form a side wall, and then extends outwardly to form a rim where the extension of the filter may extend out further than the rim. The container may receive the filter and the extension of the filter may be peelably coupled to the rim of the container where application of force upon the underside of the extension may cause the extension to separate from the rim to form a gap. The opposite sides of the extension where the gap may be formed may be squeezed to keep the gap open. The base of the filter may have predetermined number of holes where depending on the size of the holes, the brewing pressure of the beverage ingredient may be adjusted to brew low, medium, and high pressure beverages in hot and/or cold format. The pod may receive heated water from the brewer where the heated water mixes with the beverage ingredient within the filter to extract the beverage from the beverage ingredient and exit through the holes in the base of the filter, and drain through the gap formed between the extension and the rim. The brewing mechanism may be adapted to receive the pod and inject heated water into the pod and allow the pod to drain the beverage through the gap without coming into contact with the brewing mechanism such that the beverage does not substantially contaminate the brewing chamber. Moreover, the grind size of the beverage ingredient packed within the filter may be varied and the number and size of the holes formed in the base of the filter may be varied where the depending on the combination of the grind size and the number and size of the holes, low, medium, and high pressure beverages may be brewed within the pod.

Another aspect of the invention is to have a beverage brewing system that includes a brewing chamber adapted to receive a pod, and as an actuation mechanism is closed, the brewing chamber may orient the pod into a brewing position where a detaching mechanism moves relative to the pod such that the detaching mechanism engages with the extension of the filter and separates the extension from the rim of the container to form a gap therebetween, and moves past the extension such that the detaching mechanism avoids coming into contact with the beverage being poured from the gap.

Yet another aspect of the invention is to have a brewer including a heater and a brewing chamber with switching mechanisms to direct the water from the water tank towards or bypass the heater and/or brewing chamber. The switching mechanisms may direct the water towards the heater and the brewing chamber to brew a beverage; or direct the water towards heater but bypass the brewing chamber to pour the heated water towards a mug, for example, to brew a beverage with a predetermined amount of beverage to water ratio; or direct the water to bypass the heater and the chamber, for example, to minimize melting the ice within the mug.

Another aspect of the invention is to have a brewing system use a pod to noticeably lessen the sourness, bitterness, and astringency in the beverage relative to using a substantially similar pod brewed at a baseline brewing parameters such as the brewing temperature of about 190±5° F. with a brewing time of 40±5 sec to brew 8±0.5 oz of coffee by: (1) adjusting the brewing temperature to about 130±10° F. with a brewing time of 360±120 sec to brew a beverage to water ratio from 4:4 to about 8:0; (2) adjusting the brewing temperature to about 120±10° F. with a brewing time of 600±120 sec to brew a beverage to water ratio from 4:4 to about 8:0; and (3) adjusting the brewing temperature to about 200±10° F. with a brewing time of 30±5 sec to brew a beverage to water ratio from 3:5 to about 6:2. The brewing system may also use a similar pod to noticeably lessen the bitterness relative to the baseline brewing parameters by adjusting the brewing temperature from about 195±5° F. with a brewing time of 30±5 sec to brew a beverage to water ratio from 3:5 to about 6:2.

Still another aspect of the invention is a brewing system that may use a pod packed with a lighter roast compared to a darker roasted coffee to noticeably lessen the bitterness but noticeably increasing the sourness taste in the coffee. And the brewing system may use a pod packed with a lighter roast and brewed under a higher pressure condition compared to a darker roasted coffee brewed under a low pressure condition to noticeably lessen the bitterness and sourness taste in the coffee, where the brewing temperature may be lowered to about 120±20° F. and the brewing time may be extended to about 600±120 sec to simulate cold brew coffee.

Considering another aspect of the invention, a beverage pod has a container having a rim on a proximal end and a container distal end that is closed and free of holes. A lid is sealed on the rim of the container. The lid may be pierced to inject water into the pod. A filter is disposed within the container. The filter includes holes at a distal end and/or a sidewall of the filter. The filter also has a radially extending extension peelably coupled to the rim of the container. A beverage ingredient (e.g. ground coffee, tea, chocolate, or the like) is disposed within the filter. There is a gap between a distal end of the filter and a distal end of the container. A fluid flow path is established when the lid is pierced. The path extends through the lid, through the beverage ingredient, out holes of the filter, along a space between a side wall of the filter and a side wall of the container, and out of the pod at an opening formed between the extension of the filter and rim of the container in a proximal portion of the container.

The foregoing may be combined with a number of features, either alone or in combinations of the one or more of the following features. The pod may include a distributor with apertures on a distributor surface disposed in between the lid and the beverage ingredient. The distributor serves to distribute water over the surface of beverage ingredient in the filter. The fluid flow path then extends through the lid, through apertures on the distributor surface, and through the beverage ingredient. The filter has a base at a distal end of the filter, the filter extending from the base toward the proximal end of the pod to form a sidewall, the filter having a filter extension at a proximal end that and then extends outwardly from the sidewall.

The filter extension may have a first section and a second section, the first section extending outwardly a predetermined distance and the second section extending farther thereof relative to the first section, with the extension having a line of weakness between the first and second extensions, the second extension being adapted to weaken or separate from the first section along the line of weakness. The second section may extend in any of a number of directions and have different shapes. In one embodiment, the second section extends at least partially in the direction of the distal end of the filter.

Considering the filter, it may have holes in its base. Alternatively, there may be holes in the sidewall of the filter. In one embodiment, there are holes in both the base of the filter and in the sidewall of the filter. The number, size, and location of the holes may be chosen to regulate pressure within the filter as water flows through, to prevent coffee grounds or the like from escaping the filter through the holes, and/or more generally to allow water to flow through the beverage ingredient and out of the filter. It is noted in some embodiments heated water is injected into the pod at high pressure—at least 4 bars and often 10 bars or more. The filter should be designed so as to preserve the filter even under high water pressure conditions.

In some embodiments, the container includes a rim on a proximal end, and at least a portion of the extension on the proximal end of the filter is releasably sealed or adhered to the rim of the container. The distributor may have a base and an outer distributor flap, the distributor flap in engagement with an inner side of a sidewall of the filter. The distributor base may optionally include a protrusion extending toward the distal end of the filter, the protrusion forming a cavity sized to receive an inlet liquid injection member for injecting water into the filter. The apertures in the distributor may be smaller than average size of pieces of the beverage ingredient (e.g. coffee grounds) and are adapted to prevent the beverage ingredient from exiting the filter through the distributor apertures. In one embodiment, the apertures are funnel-shaped, with a wider opening of the funnels at the proximal surface of the distributor and a narrow opening at the distal surface of the distributor.

In one embodiment, the filter has at least one stiffener to stiffen the sidewall. The stiffener may be, as one example, an outwardly-extending rib. The rib may serve to position the filter relative to the container with, for example, the rib (or ribs) extending to the inner sidewall of the container. In still another embodiment, the filter may have a divider dividing the filter into first and second chambers. The interior of the filter may include a step and the divider rests on the step. The divider may have holes to allow fluid to exit one chamber and flow into another.

Again, the optional features of Paragraphs 17-21, for example, may be incorporated individually or in combination with selected other optional features. Consequently, a great many combinations of features are included in the present invention.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3A shows an expanded cross-sectional view of a pod.
FIG. 3B shows a perspective view of a disassembled pod.
FIG. 3C shows a cross-sectional view of the assembled pod.
FIG. 5A shows a dissembled view of another pod.
FIG. 5B shows a filter in an inverted position.
FIG. 5C shows an enlarge view of the holes on the base.
FIG. 5D shows a top view of a filter.
FIG. 5E shows an enlarge view of a hole in the base.
FIG. 5F shows a cross-sectional view of an assembled pod.
FIG. 5G shows a perspective view of a pod with a distributor assembled to the filter.
FIG. 7A shows an enlarge view the extension area of the filter.
FIG. 7B shows another alternative embodiment of the extension area.
FIG. 7C shows an alternative embodiment of a distributor.
FIG. 7D shows a perspective view of a filter with a baffle around the circumference of the extension.
FIG. 7E shows a cross-sectional view of alternative embodiment of assembled pod.
FIG. 8A shows a pod in a brewing orientation in reference to the gravitational direction.
FIG. 8B shows a portion of the filter at about the six O'clock position separating from the container as the piercing member penetrates the lid of a pod.
FIG. 8C illustrates maintaining the gap open between the extension of the filter and the rim of the container, and providing a path for the beverage formed within the pod to drain through the gap.
FIG. 8D shows heated water being injected into the pod and substantially releasing the water pressure to be low pressure beverages.
FIG. 8E illustrates a pod substantially maintaining the water pressure provided into the filter to brew high pressure beverages.
FIG. 8F illustrates a pod that releases a portion of the water pressure provided into the filter to brew medium pressure beverages.
FIG. 10A illustrates a top view of alternative brewing chamber in an open position.
FIG. 10B shows front views of the various elements of the brewing chamber of FIG. 10A.
FIG. 10C shows a top view of the brewing chamber in an open position with a pod therewithin.
FIG. 10D shows a top view of the brewing chamber moving from the open position to a partially closed position.
FIG. 10E shows a top view of the brewing chamber in a closed position.
FIG. 10F shows a top view of the brewing chamber returning to the open position.

FIG. 12A illustrates a brewing system with one or more switches to bypass a heater and/or brewing chamber together or independently to brew heated and/or unheated beverages.

FIG. 12B shows switches in the first direction to direct heated water to the brewing chamber to brew a beverage within the pod therein.

FIG. 13C illustrates a purging step.

FIG. 13D illustrates directing heated water to bypass the brewing chamber and pour into a mug.

FIG. 14A shows a perspective exemplary exterior view of a pod designed to work with a brewing system.

FIG. 14B illustrates an electrical block diagram of the brewing system.

FIG. 14C show Tables 3A, 3B, and 3 with possible brewing parameters which may be stored in the memory to brew high pressure base beverages.

FIG. 14D show Tables 4A through 4D with possible brewing parameters to brew low pressure beverages.

FIG. 14E shows Tables 5A and 5B with possible brewing parameters to brew infused beverages.

FIG. 15A shows Table 6A with test results of variety of samples brewed under different brewing parameters.

FIG. 15D shows Graph 1A representing the test results along the sourness and bitterness axes.

FIG. 15E shows Table 6B tabulating the flavor profile differences of the samples with respect to the sourness, bitterness, and astringency relative to their respective baseline samples.

FIG. 15F shows Table 6C approximating the taste profile relative to a baseline cold brew coffee.

FIG. 15G shows Table 6D ranking the samples relative to the close approximation to the baseline cold brew coffee.

FIG. 15H shows Graph 1B illustrating beverages brewed under low pressure with their respective brewing parameters and beverage characteristics such as the TDS, acidity, and caffeine amount in the beverage.

FIG. 15I shows Graph 1C illustrating predictability of flavor profile of a beverage based on flavor profiles of several measured beverages.

FIG. 15J shows Graph 1D illustrates shift in flavor profile along the sourness and bitterness axes between the low and high pressure beverages.

FIG. 15K shows Graph 1E illustrating predictability of flavor profile of a beverage brewed under a low pressure compared with high pressure.

FIG. 15L shows Graph 1F illustrating another predictability of flavor profile of a beverage based on flavor profiles of several measured beverages.

DETAILED DESCRIPTION OF THE INVENTION

Figure 1:
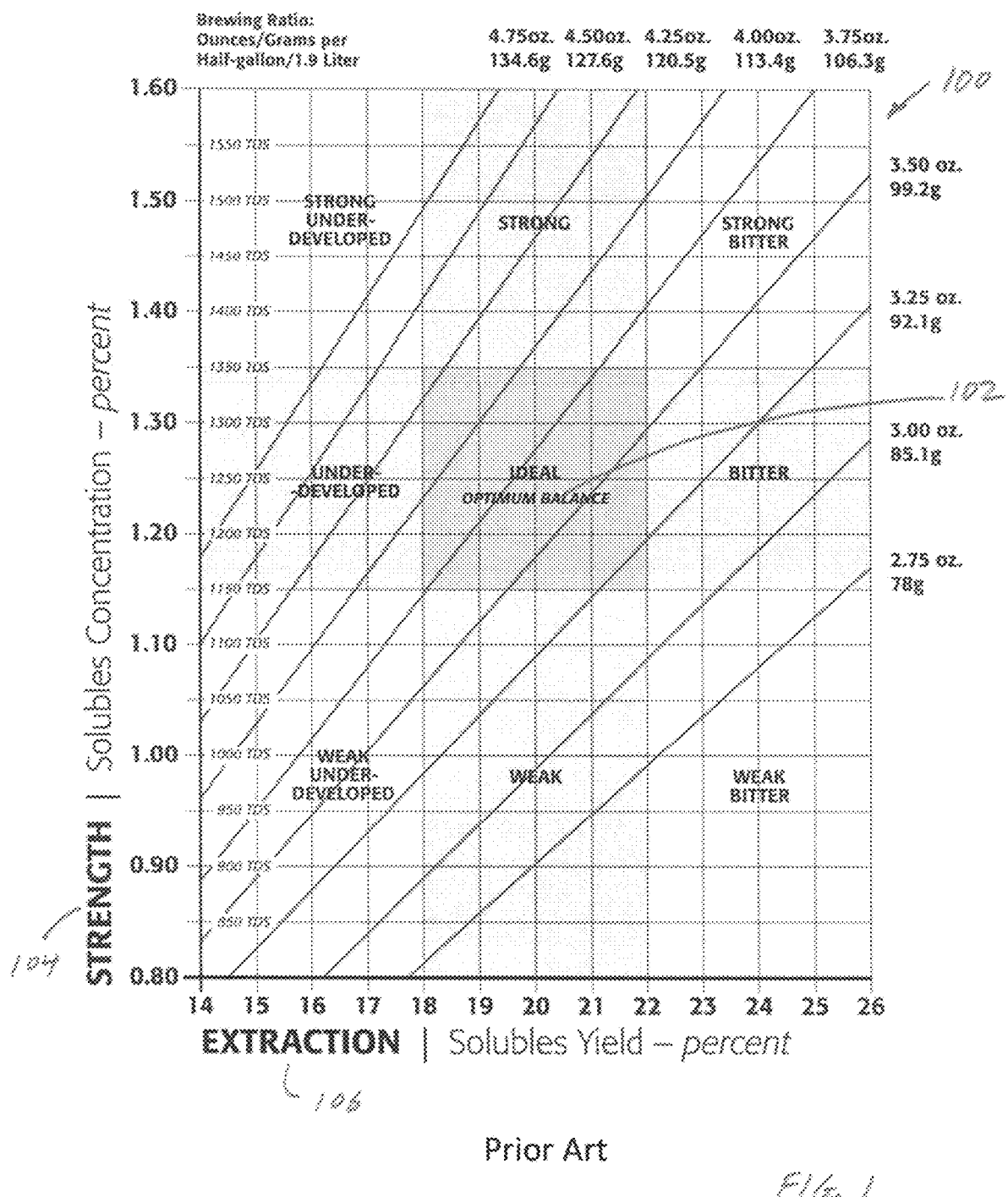
FIG. 1 shows a coffee brewing control chart.

The various aspects of the invention can be better understood with reference to the drawings and descriptions described below. The components in the figures, however, are not necessarily to scale, emphasis is instead placed upon illustrating the principles of the various aspects of the invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. In general, when the terms "may", "is", and "are" are used as a verb in the description corresponding to a particular subject matter, these terms are generally used in this disclosure as an expression of a possibility of such subject matter rather than as a limiting sense such as when the terms "shall" and "must" are used. For example, when the description states that the subject matter "may be" or "is" circular, this is one of many possibilities, such that the subject matter can also include an oval, square, regular, irregular, and any other shapes known to a person of ordinarily skilled in the art rather than being limited to the "circular" shape as described and/or illustrated in the corresponding referenced figure. In addition, when the term "may", "is", and "are" are used to describe a relationship and/or an action, these terms are generally used in this disclosure as an expression of a possibility. For example, when the description states that a subject matter A "may be" or "is" adjacent to a subject matter B, this can be one of many possibilities including the possibility that the subject matter A is not adjacent to the subject matter B as it would be understood by a person ordinarily skilled in the art.

Moreover, it is within the scope of the invention to combine the various embodiments disclosed relating to one or more particular drawing and their corresponding descriptions with one or more of the other drawings and their corresponding descriptions disclosed herein and/or other references incorporated herein by reference where such a combination may be combined and practiced by one of ordinary skilled in the art. The phrase "single-serve beverage pod" in this disclosure generally refers to a single brewing process where a desired volume of beverage is brewed to serve one cup of beverage, however, it is within the scope of the invention to have a pod that packs sufficient beverage substance to brew multiple cups of beverage from a single brewing process or from multiple brewing processes. Also, the term "beverage substance" generally refers to the underline article when mixed with liquid such as water formulates a beverage such as coffee, tea, fruit drinks, punch, lemonade, soda, cocoa, milk, soup, energy drink, liquid medicine, cannabis, and the like. For instance, for coffee, the beverage substance may be coffee ground, instant powder coffee, and/or concentrated coffee in liquid form that can be diluted with water for consumption. For tea, the beverage substance may be tea ground, instant powder tea, and/or concentrated tea in liquid form that can be diluted with water for consumption. For baby milk, the beverage substance may be milk powder or concentrated milk liquid. For medicine such as for flu or cold, the beverage substance may be in the powder or liquid form which can be dissolved with predetermined portion of the heated water to brew a proper portion of the liquid medicine. Cannabis may be also provided in dried ground or powder form. In addition, the beverage substance may be provided in the form of pellets that are infused with desired flavors; and once the pellets are exposed to liquid such as water, the trapped flavors may be released by the pellet, which is then absorbed by the mixing liquid to formulate a beverage with the desired flavor. As such, the beverage substance may be in the form of ground, powder, liquid, pellets, and the like; and the beverage substance may be formulated from single or multiple ingredients. The same referenced numerals referred to in the drawings and descriptions generally correspond to same or similar parts throughout the disclosure.

Single-serve pod systems are generally designed to allow the user to select a desired serving size for the beverage, and the brewers inject the selected volume of heated water through the pod to brew the desired volume of the beverage. For instance, if a user selects a 12 oz cup of beverage, the brewer injects 12 oz of heated water through the pod to brew a 12 oz beverage. Hence, the brewing time for the beverage may be dependent upon the serving size where a smaller serving size means a shorter brewing time and a larger serving size means a longer brewing time since more time is needed to inject 12 oz versus 6 oz of heated water through the pod, assuming the flow rate of the heated water is about the same. With the water heated to about 190° F., prolonging the brewing time can extract more of the bitter taste from the coffee ground such that a 12 oz cup of coffee brewed from the same pod may taste more bitter and diluted than an 8 oz cup of coffee.

During the brewing process, the strength and taste profile of the beverage may also change from the first ounce to the last ounce, and therebetween such that an 8 oz cup of coffee can taste different from a 10 oz cup of coffee brewed from the same pod where the 10 oz coffee may taste more diluted and bitter than the 8 oz coffee. In this regard, FIG. 2 generally illustrates a various time sequences of beverage 200 being poured into a mug 240 from a single-serve pod 214 such as a K-Cup pod. In general, K-Cup pod 214 works by piercing the top lid 216 and the bottom container 218 of the pod 214 with an inlet and outlet needles 220 and 222, respectively, to form top and bottom holes 224 and 226, respectively, and injecting heated water 228 through the inlet needle 220 where the heated water 228 interacts with the coffee ground within the pod 214 to extract the beverage 200 that drains through the outlet needle 222, and pours into the mug 240. The brewers designed to work with pods 214 generally allow the user to select the serving size of the beverage 210 such as from 6 oz to 12 oz for coffee, and the brewers inject the entire selected volume of heated water 228 through pod 214 to brew the desired serving size. For instance, if a user selects 12 oz cup of beverage, the brewer will inject the entire 12 oz of heated water through the pod 214 to brew a 12 oz beverage.

To demonstrate the changes in the strength and taste profile of the beverage during a brewing process, Keurig's K-Elite brewer was used to brew two 12 oz cups of coffee using two Starbucks® Pike Place® K-Cup pods, each packed with about 12.5 g of medium roast coffee. The brewer injected heated water into the pods at a substantially steady rate at about 1 oz per 4 seconds or about 8 seconds for every 2 oz of beverage such that it took about 56 seconds to inject 12 oz of heater water through the pod. As the beverage began to pour from the brewer, six samples of the beverage were taken in 2 oz increments for a total of 12 oz for both samples, and the samples were cooled to room temperature and the TDS levels were measured for each of the 2 oz samples as noted in the following Table 1:

TABLE 1

| Samples | Brewing Time (sec) | TDS1 | TDS2 | Average TDS | Weighted TDS % | Combined TDS | Taste Profile |
|---|---|---|---|---|---|---|---|
| 1st 2 oz | 8 | 2.5 | 2.44 | 2.47 | 52% | 1.82 | Rich & Sour |
| 2nd 2 oz | 16 | 0.88 | 0.83 | 0.86 | 18% | Total of 4 oz: 1.32 | Strong & Smooth |
| 3rd 2 oz | 24 | 0.54 | 0.54 | 0.54 | 11% | Total of 6 oz: 1.05 | Medium & Bitter |
| 4th 2 oz | 32 | 0.37 | 0.38 | 0.38 | 8% | Total of 8 oz: 0.88 | Mild & Bitter |
| 5th 2 oz | 48 | 0.27 | 0.29 | 0.28 | 6% | Total of 10 oz: 0.75 | Weak & Astringent |
| 6th 2 oz | 56 | 0.24 | 0.26 | 0.25 | 5% | Total of 12 oz: 0.67 | Watery & Astringent |

Figure 2:
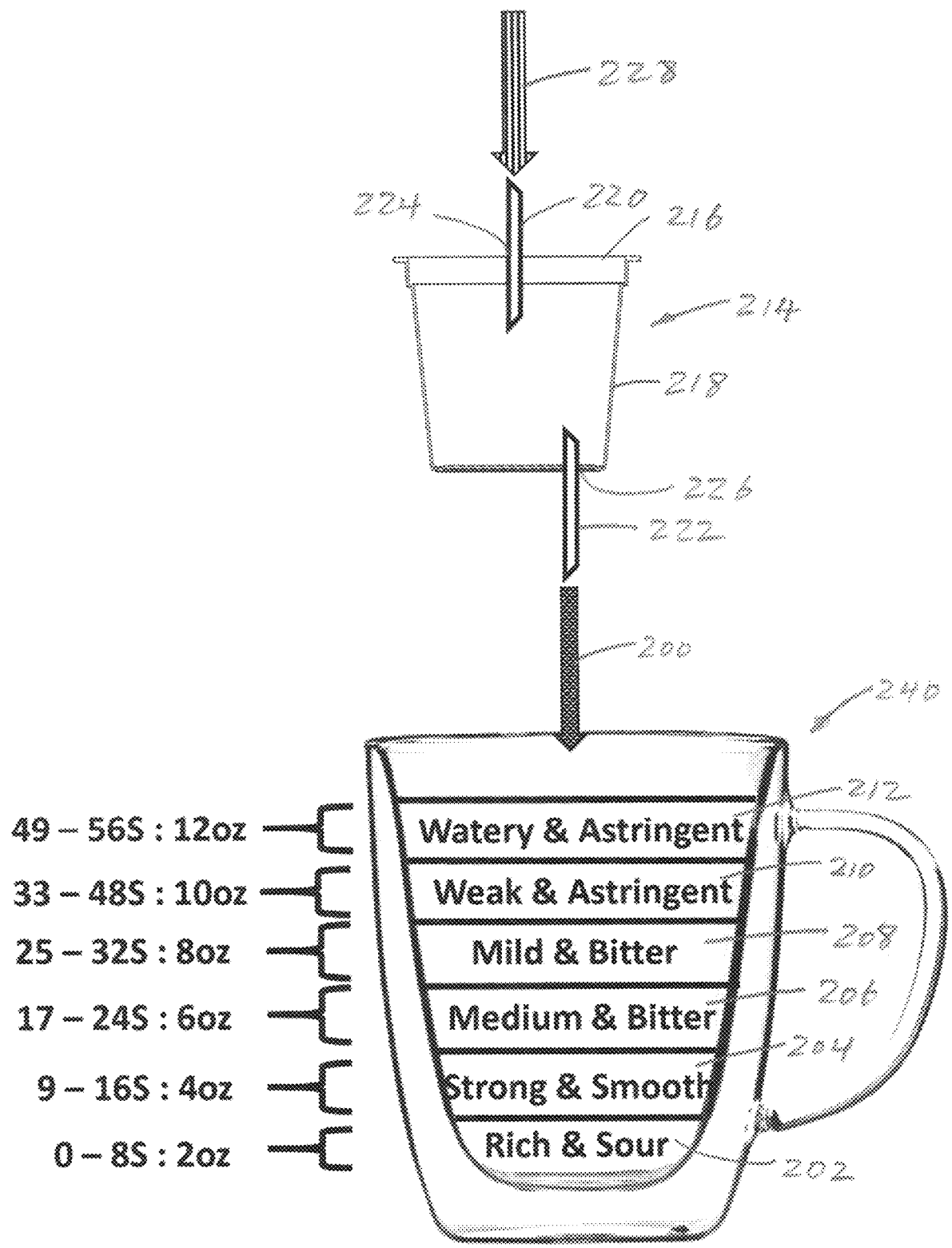
FIG. 2 shows a various time sequences of a beverage being poured into a mug.

As indicated by the Weighted TDS % in Table 1 and in reference to FIG. 2, in the first sample 202, the average TDS level measured about 2.47, which represents about 52% of the total coffee flavors extracted from the pod during the brewing process; and while taste may be subjective, the first 2 oz sample tasted rich and sour as sourness flavors may release from the coffee ground faster than the bitter flavors. In the second 2 oz sample 204, the TDS level dropped to about 0.86, which represents about 18% of the flavors extracted from the pod and this sample tasted less sour and smoother than the first 2 oz sample; and when the first two samples were combined, the combined 4 oz had a TDS level of about 1.32, which represents about 70% (52%+18%) of the overall TDS extraction, and the combined sample tasted strong and smooth without much bitterness. In the third 2 oz sample 206, the TDS level dropped significantly to about 0.54, which represents about 11% of the flavors extracted from the pod, and this sample tasted weak and bitter; and when the three samples were combined, the combined 6 oz had a TDS level of 1.05, and the mixture tasted medium strength and some bitterness was noticeable. In the fourth 2 oz sample 208, the TDS level dropped to about 0.38, which represents about 8% of the flavors extracted from the pod, and this sample tasted watery and more bitter indicating over extraction of the bitter flavors; and when the four samples were combined, the combined 8 oz had a TDS level of about 0.88, which tasted mild and bitter. In the fifth 2 oz sample 210, the TDS level dropped to about 0.29, which represents about 6% of the flavors extracted from the pod, and this sample tasted watery and astringent again indicating over extraction of the undesirable flavors from the coffee ground; and when the five samples were combined, the combined 10 oz had a TDS level of about 0.77, which tasted weak and astringent taste was noticeable. In the sixth 2 oz sample 212, the TDS level dropped to about 0.25, which represents about 5% of the flavors extracted from the pod, and this sample tasted watery and more astringent; when the six samples were combined, the combined 12 oz had a TDS level of 0.67, which tasted watery and noticeably astringent. Note that taking samples in 2 oz increments from the beverage pouring from a brewer may influence the measurements compared to the measurement taken from a 12 oz cup of beverage, however, the purpose of this test was to measure the relative strength of the coffee in 2 oz increments, as discussed above.

As indicated in Table 1, about 70% of the TDS level is extracted from the coffee ground packed within the pod after injecting 4 oz of heated water through the pod with the brewing time of about 16 seconds, and the additional heated water injected into the pod thereafter extracts more of the bitter flavors from the coffee ground. Again, taste is subjective so that consumers may have a wide range of coffee taste preference such that some may like it smooth while some may like their coffee with a bit of bitter taste. However, for those who would like to brew a big cup of coffee, such as 10 oz or more, without the bitter taste using a single-serve pod system, this may be difficult since over-extraction may occur after injecting 4 oz or more of the heated water though the pod such that the coffee may have bitter taste.

Low, Medium, and High Pressure Pods:

FIG. 3A shows an expanded cross-sectional view of a first pod 300 along a longitudinal axis 301 configured to brew elevated pressurized beverages such as espresso at a pressure above about 4 bars, where 1 bar generally equates to the average atmospheric pressure at sea level. For example, the first pod 300 may brew espresso-based beverages by brewing at a brewing pressure of about 6 to 25 bars whereas infused and/or functional beverages may be brewed at about 4 to 10 bars as discussed in more detail below. The first pod 300 may include a container 304, a filter 306 adapted to receive beverage ingredient 310, a distributor 312, and a lid 314. The container 304 may have a base 316 that extends upwardly to form a sidewall 318 and then extends outwardly to form a rim 320. The container 304 may be formed from a variety of materials and from single or multi-layered sheets sandwiched together to form a hermetically sealed barrier to protect the beverage ingredients contained therein from atmospheric oxygen entering the container. The container may be formed from a variety of materials known to one skilled in the art. In this regard, the container 304 may be formed in a manner described in U.S. Pat. No. 10,336,498 (the "'498 Patent") issued Jul. 2, 2019, entitled "CONTAINER WITH IMPROVED PUNCTUREABILITY", by Foster et al., which is hereby incorporated by reference in its entirety. In particular, the container 304 may be formed by a molding and thermoforming process from a thermoplastic material, which may be substantially impermeable and imperforate. For example, the thermoplastic materials may include polyolefins such as polypropylene and polyethylene, polystyrene, nylon, and other polymers; and in particular, thermoplastic material may be a bio-based resin, readily recyclable, and/or comprise of at least a portion of recycled material such as a recycled polypropylene base resin. Alternatively, the container 304 may be formed from multi-layered sheets or films including one or more tie layers disposed between the barrier layer and adjacent thermoplastic polymer layers and, optionally, one or more layers of regrind. Non-limiting examples of barrier layers commonly used in the art include ethylene vinyl alcohol (EVOH) and nylon, with the amount of the additive in the barrier layer being determined at least in part by the particular application for which the container may be used as known to one skilled in the art. The container 304 may be also made to biodegrade by adding microbial enzyme(s) such that biodegradation can occur under aerobic conditions, where oxygen is the electron acceptor, and under anaerobic conditions, where nitrate, sulfate, or another compound is the electron acceptor. In particular, the container 304 may be formed from a substantially polyolefins thermoplastic material layer as disclosed in the '498 Patent with enzyme to degrade to satisfy the Aerobically Composted in Municipal or Industrial Facilities standards by meeting the ASTM D6400-19 testing standards; or meeting the Anaerobic Biodegradation of Plastic Materials Under Accelerated Landfill Condition under ASTM D5526-18 testing standards.

The filter 306 may have a base 322 that extends upwardly to form a sidewall 324 and then extends outwardly to form an extension 326, which may be defined by one or more sections including a first section 328 and a second section 330. The first section may extend outwardly to a predetermined distance indicated by a reference numeral 331, and the second section 330 may extend farther therefrom outwardly in a beveled manner or downward sloping manner relative to the first section 328 towards the base 322. The extension 326 may have a line of weakness 333 between the first and second extensions 328 and 330 to allow the second extension 330 to weaken or separate from the first section 328 along the line of weakness 333, if desired. As discussed in more detail below, the line of weakness may allow the first section 328 to separate more readily from the rim 320 of the container. The first section 328 may extend outwardly at a distance, as indicated by the reference numeral 331, such that the first section 328 may extend farther out laterally than the rim 320 to allow the first section 328 to lie upon the rim 320 when the filter 306 is placed within the container 304.

The base 322 of the filter 306 may have a plurality of holes 336 where the size and number of the holes 336 may be predetermined to control the flow of the beverage through the holes 336 to provide a desired pressure within the filter 306, as discussed in more detail below. The sidewall 324 may have a first portion 332 and a second portion 334. Depending on the desired pressure within the filter 306 during the brewing process, the second portion 334 may have a plurality of holes to allow the pressure within the filter 306 to be released and allow the beverage to flow therethrough to reduce the pressure within the filter 306. The container 304 may be adapted to receive the filter 306 and the first section 328 of the extension 326 may be releaseably sealed or adhered to the rim 320 of the container 304 where upon a force applied to the underside of the second section 330, the first section 328 may peel, separate, and/or snap off from the rim 320. In this regard, the releasable bond(s) may be utilized such as the embodiments disclosed in US Published Application No. 2014/0161936, published Jun. 12, 2014, entitled CONTAINER WITH REMOVALE PORTION by Trombetta et al., which is hereby incorporated by reference in its entirety; and U.S. Pat. No. 10,370,182 issued Aug. 6, 2019, entitled Containment body for making a capsule for making beverages and method for making capsules with different quantities of powdered food substance using a single type of containment body by Accursi is hereby incorporated by reference in its entirety. Alternatively, the first section 328 of the filter 304 may be ultrasonically sealed to the rim 320 of the container 304 such as the torsional ultrasonic method where high-frequency vibrations are applied tangentially as provided by Telsonic Ultrasonics Inc., located at 14120 Industrial Center Dr., Shelby Township, Mich. 48315 U.S.A.

The distributor 312 may have a base 345 with an outer flap 346 adapted to engage with the inner side 347 of the sidewall 324 of the filter 306 such that the base 345 may be adjacent to the first section 328 of the extension 326. The flap 346 may extend upwardly or downwardly to engage with the inner side 347 of the sidewall. The base 345 may have a protrusion 349 extending towards the inner space within the filter 306. The protrusion 349 may form a cavity 362 sized to receive an inlet liquid injection member, as discussed in more detail below, such as an inlet needle to inject heated water into the filter 306. The base 345 may have plurality of holes 348 to allow the heated water to pass therethrough to substantially distribute the water over opening 351 of the filter 326. The size of the holes 348 may be less than the average size of the beverage ingredient 310. This may substantially prevent the beverage ingredient 310 from entering the protrusion area 349 thereby substantially preventing the beverage ingredient from clogging the inlet injection member, which can cause the brewing mechanism to malfunction.

The holes 348 may also have a funnel like configuration to allow the holes to act as nozzles where the heated water may pass through the holes 348 at a high speed to generate turbulence within the beverage ingredient. Moreover, the funnel like configuration may allow the holes to act substantially as one-way valves to substantially prevent the beverage from flowing in the reverse direction towards the protrusion 349 to minimize contaminating the inlet injection member. The distributor 312 may be formed from a variety of materials such as plastic and/or liner or of a variety of materials known to one skilled in the art. For instance, a flexible liner may be utilized with sufficient tensile strength to resist tearing due to the high pressure during the brewing process. The distributor 312 may be placed over the beverage ingredient packed within the filter 306 and the flaps 346 may be engaged or sealed within the interior side 347 of the sidewall 324 of the filter 306 such that the beverage ingredient 310 may be substantially compact between the distributor 312 and the base 322. The manner in which the beverage ingredient is packed within the filter 306 may be predetermined to control the density of the beverage ingredient 310 therein to substantially prevent air pockets, gaps, and channels from forming within the ingredient 310 during manufacturing, shipping, handling, and during the brewing process. As a general rule, beverage ingredient 310 with greater density may require greater pressure to push the heated liquid through the beverage ingredient 310, which can extract more intense flavor from the beverage ingredient 310 in less time. As the first section 328 of the filter 306 separates from the rim 320, as discussed in more detail below, the distributor 312 may flex to substantially contain the ingredient 310 within the filter 306 to avoid forming air pockets therein. The lid 314 may be placed over the filter 306, and the outer edge 350 of the lid 314 may be sealed and/or bonded to the first section 328 of the filter 306. In particular, the lid 314 may be formed from a flexible liner with sufficient tensile strength to resist tearing due to the high pressure during the brewing process.

The pressure developed within the beverage ingredient 310 can determine the type of beverage brewed such as coffee under lower pressure and espresso under higher pressure. In general, the beverage ingredient 310 may be sized to brew espresso where the grind sizes are finer than the coarser grind size to brew coffee. The brewing mechanism may inject heated water under high pressure to force the heated water through more densely packed beverage ingredient 310 to brew espresso where the combination of high pressure and heated water may extract about 1 to 2 oz of espresso beverage from the beverage ingredient in relatively short brewing time of about 20 to 35 seconds. The beverage ingredient 310 may be packed into the filter 306 and tampered to minimize air pockets within the beverage ingredient 310.

A number of factors can determine the pressure developed within the beverage ingredient 310 such as the pressure and temperature of the heated water injected into the beverage ingredient, the grind size and density of the beverage ingredient, the size and number of holes 336 in the base 322 of the filter 306, the depth of the beverage ingredient, and etc. In this regard, the base 322 may have a predetermined number of holes sized to allow the beverage to pass therethrough but substantially prevent the beverage ingredient packed within the filter 306 from passing through the holes due to pressure within the filter during the brewing process. For instance, the sidewall 324 may be substantially solid to direct most of the beverage, if not all, to pass through the holes 336 on the base 322. Moreover, the sidewall 324 may be formed to have stiffeners or ribs to substantially maintain its shape under the desired brewing pressure conditions. The number and/or size of the holes 336 formed in the base 322 may be predetermined to provide sufficient resistance to flow of beverage to develop the desired brewing pressure within the beverage ingredient to brew a desired beverage. For example, to brew espresso under high pressure from 6 to 15 bars, the coffee beans may be finely grounded where the average grind size may be from about 40 to about 450 microns; and to substantially prevent the grinds from passing through the holes, the size of the holes 336 in base 322 may be less than the average grind size of the espresso grounds. Depending on the application, the average size of beverage ingredient 310 to brew under high pressure may vary from 40 to 450 microns; from 60 to 300 microns; from 100 to 200 microns; and to substantially prevent the ingredients from passing through the holes, the size of the hole may be less than the average grind size of the ingredients or less than the lower end of the distribution of the grind sizes. The holes may have a variety of shapes such as circular, square, rectangular, regular and irregular configuration.

Along with the size of the holes 336, the number of holes 336 provided in the base 322 may be predetermined to develop the desired pressure within the filter 306 to brew the intended beverage such as espresso or coffee. That is, the brewing mechanism may inject heated water into the pod 300 at about 15 bars but some or a portion of the pressure may be released through the coffee ground and through the filter 306 such that the espresso flavor beverage may be extracted from the finer coffee ground at about 10 bars with the difference of 5 bars being released. On the other hand, for brewing coffee, where less pressure may be needed, the size of the holes 336 may be less than an average grind size or less than the lower end of the distribution of the grind sizes to brew coffee where the average grind size may be from about 450 to about 1,000 microns; and in particular from 500 to about 700 microns. Note that some solubles may have average grind size of about 1,000 to 2,500 microns. For instance, coffee ground may have grind size distribution from 500 to 700 microns with an average or mean grind size of about 600 microns. With such grind size distribution and average, the size of the holes 336 to brew coffee may be less than about 600 microns or less than 500 microns to substantially prevent coffee ground from passing through the holes and to release the pressure within the coffee grounds to brew coffee. Alternatively, the pod 300 may include a paper filter between the holes 336 and the coffee ground, although not necessary, to allow the beverage to pass while preventing the smaller coffee sediments from passing therethrough during the brewing process. Moreover, it is within the scope of the invention to have the size and number of holes 336 in the base 322 be independent of the grind size of the beverage ingredient 310 where the size of the holes 336 may be sized to substantially prevent the ingredient sediment from passing through the holes 336 in the base 322.

FIG. 3B shows a perspective view of the disassembled pod 300. The container 304 has an opening 360 as defined by the rim 320. The opening 360 may be sized to receive the filter 306 such that the first section 328 may rest upon the rim 320 of the container 304. The first section 328 may be sealed to the rim 320. The opening 351 of the filter 306 as defined by the first section 328 may receive the beverage ingredient 310 and may be tampered to minimize air pockets within the ingredient 310. The distributor 312 may be placed over the ingredient 310 and to substantially enclose the opening 351 of the filter 306. The distributor 312 may have a cavity 362 as defined by the protrusion 349 adapted to receive an inlet member to inject liquid therein. Note that it is within the scope of invention to have the flap 346 extending upwardly from the base 345 such that there is a sufficient distance between the lid 314 and the base 345 such that protrusion 349 and cavity 362 may not be needed. The lid 314 may be placed over the first section 328 and a circumference near the outer edge 350 of the lid 314 may be sealed to the first section 328 to hermetically seal the ingredient 310 within the pod 300. The distributor 312 may have a plurality of ribs 363 protruding toward the lid 314 to maintain a gap 361, see FIG. 3C, between the lid 314 base 345 such that the liquid injected into the cavity 362 may flow along the gap and drain through the holes 348 and mix with the beverage ingredient 310 there-underneath.

FIG. 3C shows a cross-sectional view of an assembled pod 300 without the beverage ingredient 310 where the interior of the container 304 may be divided into different chambers including a first chamber 364 and a second chamber 366 along with the cavity 362 and the gap 361 between the lid 314 and the base 345 as discussed above. The first chamber 364 may be located between the gap 361 and second chamber 366. The cavity 362 may be adapted to receive an inlet piercing member from a high or low pressure brewing mechanism and the heated water from the inlet may flow along the gap 361 and distribute the heated water in a substantially even manner along holes 348 to more evenly mix with the beverage ingredient 310 to extract the beverage such as espresso and coffee from the ingredient 310. The first chamber 364 may be adapted to pack about 6 to 12 grams of coffee ground to brew a single shot or about 1 to 1.5 oz of espresso. The base 322 shows a plurality of holes 336 size to brew desired beverage such as espresso or coffee. The circumference or diameter of the sidewall 324 of the filter 306 may be less than the circumference or diameter of the sidewall 318 of the container 304 such that a pathway 374 may be provided between the two sidewalls 324 and 318 around the circumference of the sidewall 324 of the filter 306. The lid may be also embedded with an identifier such as a bar code or optical identifier to identify different types of pods with different beverage ingredients packed within the filter 306, grind size, roast, and size of the holes 336 in the base 322 of the filter 306. The brewing system may have a reader position to read the identifier on the lid 314 to be able to set the proper brewing parameters appropriate for the pod 300 being brewed such as the desired brewing temperature, time, and pressure. Alternatively, the identifier may be located at or near the center of the base 316 or on the lid 314 such that irrespective of the rotational orientation of the lid 314 that the pod 300 is inserted into the brewing system, as discussed in more detail below, the reader may scan the identifier for identifying the type of pod 300.

The first chamber 364 may be enlarged by lowering the base 322 of the filter 306 closer to the base 316 of the container 304A to pack 12 to 18 grams of coffee ground to brew a double shot or about 2.0 oz of espresso. Note that the mass of the coffee ground within the filter 306 may depend on a number of factors such as grind size and the degree in which the coffee ground has been roasted. For instance, a darker roast, which has been roasted longer than a lighter roast, may lose more moisture so the darker roast generally has less mass relative to a lighter roast coffee. Alternatively, the space within the second chamber 366 may be reduced by shortening the height of the container 304 by moving the base 316 upwards closer to the base 322 of the filter 306. This may allow a user to distinguish between the short first pod 300 versus a K-Cup pod so that the first pod 300 may not be used with the brewers manufactured by Keurig since the outlet needle may not reach the base 316 of the shorter first pod. Note that with a greater height of the filter 306, a deeper bed of coffee ground may be packed within the first chamber 364 which may cause greater resistance to flow of heated water passing through the bed of coffee ground such that either more pressure or the brewing time may be extended. These issues with deeper bed of coffee ground may be addressed by increasing the size of the coffee grind to reduce the resistance to flow of heated water.

As discussed above, the brewing conditions such as water temperature, pressure, and brewing time can impact the type of beverage extracted from the beverage ingredient. For low pressure brewing systems such the Keurig Brewing System, as discussed above, the brewing temperature and time may be more of a factor in extracting the beverage from the beverage ingredient 310. For certain beverages where low temperature is desired yet without sacrificing on the strength of the beverage such as with iced coffee, the first chamber 364 may be enlarged to pack more beverage ingredient such as about 12 to 18 grams of coffee ground to brew espresso or coffee. Moreover, to minimize diluting the beverage with melted ice, the brewing system may inject heated water to a lower temperature of about 120 to about 160° F., which may reduce the extraction of the beverage from the ingredient; and to compensate for the lower extraction, the brewing time may be extended, which may extract more of the acidity flavors to compensate for the reduced extraction due to the lower brewing temperature. That is, extending the brewing time may compensate for lower brewing temperature such that cool beverage may be brewed without sacrificing the strength of the beverage. This may allow the low temperature beverage to be brewed over ice to minimize the melting ice from diluting the strength of the iced beverage.

Figure 4A:
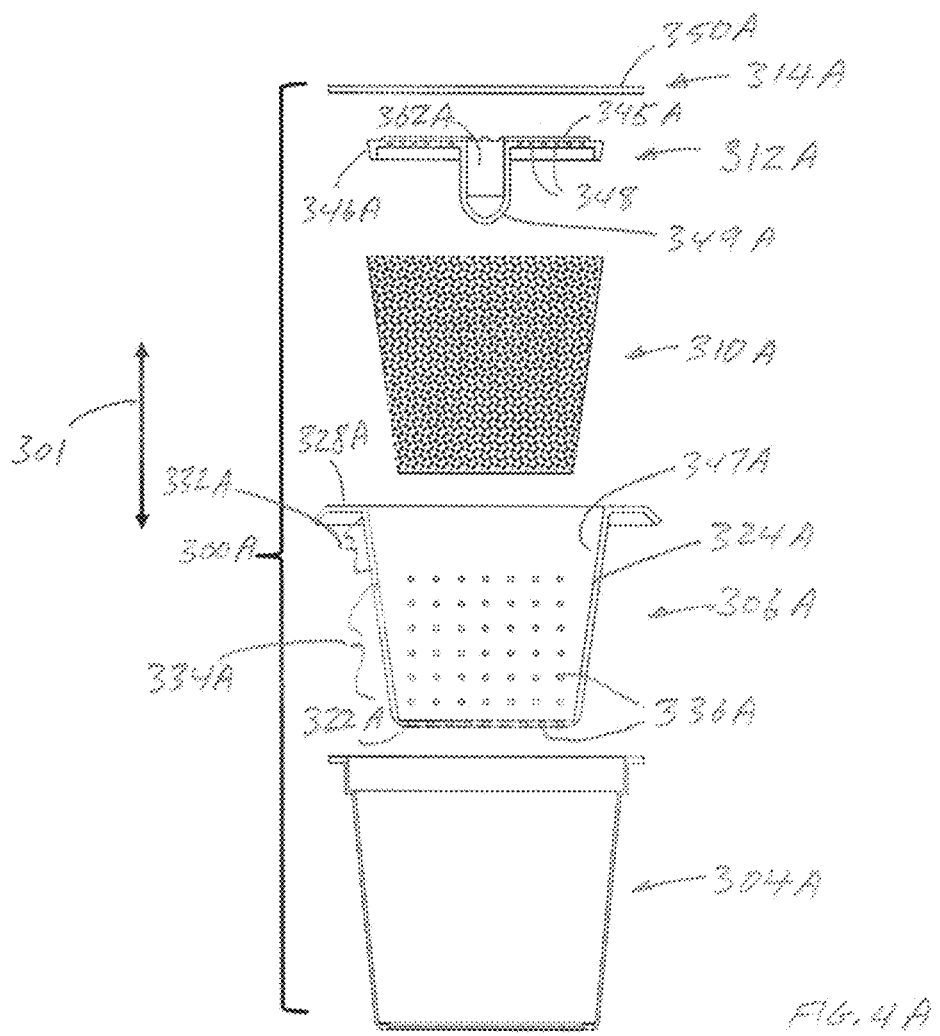
FIG. 4A shows an expanded cross-sectional view of another pod.

FIG. 4A shows an expanded cross-sectional view of a second pod 300A configured to brew a beverage under lower pressure relative to the first pod 300. Note that the same referenced numerals referred hereto in the description of the second pod 300A and its corresponding figures and beyond with different alphabetical extensions such as "A" and "B" generally correspond to the same reference numerals and the disclosure discussed above in reference to the pod 300 corresponding to FIGS. 3A through 3C; and for brevity, notable differences between the pods 300 and 300A may be disclosed herein while relying on the disclosure in reference to the pod 300 for similar descriptions. The second pod 300A may have a similar outer configuration as the first pod 300 with some notable differences in the internal structures designed to brew coffee with higher pressure provided by the brewing mechanism such as a brewing pressure from about 8 to 15 bars to brew 6 to 14 oz coffee. The second pod 300A may include an outer container 304A, a filter 306A, beverage ingredient 310A, a distributor 312A, and a lid 314A where each of these elements may be assembled together. The filter 306A may be similar to the filter 306 except that holes 336A may be formed on the base 322A and on the second section 334A of the sidewall 324A but the top section 332A may not have holes 336A. The filter 306A may also be longer along the longitudinal axis 301 relative to the filter 306 to pack more of the ingredient 310A to brew coffee, which is generally considered as a low pressure beverage, compared to the ingredient 310 to brew espresso, which is generally considered as a high pressure beverage. The height of the filter 306A may be adjusted within the container 304A based on the amount of ingredient 310A being pack for a particular beverage. Alternatively, the second pod 300A may include a mesh filter such as a paper filter to fit within the filter 306A to prevent fine coffee sediments from passing through the holes 336A.

In general, the grind size of the beverage ingredient 310A may be larger than the grind size of the beverage ingredient 310 for brewing espresso such that there may be less resistance to flow of heated water through the beverage ingredient 310A, thereby reducing the pressure within the ingredient 310A. For example, for coffee, an average grind size may be from about 400 to 700 microns such that the size of the holes 336A may be smaller than the average grind size or less than the lower end of the distribution of the grind sizes to brew coffee. For instance, coffee ground to brew a particular coffee beverage may have grind size distribution from 500 to 700 microns with an average or mean grind size of about 600 microns. With such grind size distribution and average, the size of the holes 336A to brew coffee may be less than about 600 microns or less than 500 microns to substantially prevent coffee ground from passing through the holes 336A and to release the pressure within the coffee grounds to brew coffee. As such, the size of the holes 336A to brew coffee may be greater than the size of the holes 336 to brew espresso. Moreover, the holes 336A may be formed on the base 322A and the second portion 334A of the sidewall 324A to further minimize the resistance to flow of the liquid through the ingredient 310A. In addition, the holes 336A may be formed on the first portion 332A of the sidewall 324A to increase the number of holes 336A formed in the filter 306A relative to the number of holes 336 in the filter 306, as discussed above in reference to FIG. 3A, to still further minimize the resistance to flow of the liquid through the ingredient 310. Accordingly, the size and number of the holes 336A formed on the filter 306A to brew coffee may be greater than the size and number of holes 336 formed on the filter 306 to brew espresso.

The beverage ingredient 310A may be packed into the filter 306A to minimize air pockets therein. The distributor 312A may have a base 345A with an outer flap 346A extending downwardly or upwardly, and the base 345A may have a plurality of holes 348A to allow heated water to pass therethrough. The size of the holes 348A may be larger than the holes 348A to reduce the flow rate of the heated water passing through the holes 348A. The distributor 312A may be formed from a flexible material with sufficient strength to substantially resist the water pressure during the brewing process. The base 345A may have a protrusion 349A that extends farther downwardly than the protrusion 349, discussed above in reference to FIG. 3A. The protrusion 349A may form a cavity 362A sized to receive an inlet piercing member from a low pressure brewing mechanism such as Keurig Brewing System. The distributor 312A may be placed over the beverage ingredient 310A and the flap 346A may engage with the inner side 347A of the filter 306A such that the beverage ingredient 310A may be packed between the distributor 312A and the base 322A of the filter 306A. Thereafter, the lid 314A may be placed over the filter 306A and the outer edge 350A may be sealed to the first section 328A of the filter 306A. The beverage ingredient 310A may be packed between the base 322A of the filter 306A and the distributor 312A such that the ingredient 310A may remain substantially packed therein to substantially prevent air pockets, gaps, and channels from forming within the ingredient 310A during manufacturing, shipping, handling, and during the brewing process. That is, the combination of high pressure and heated water from the brewing mechanism may extract coffee beverage from the beverage ingredient 310A without forming a channel where the pressurized water finds a path of least resistance to flow through the beverage ingredient 310A.

Figure 4B:
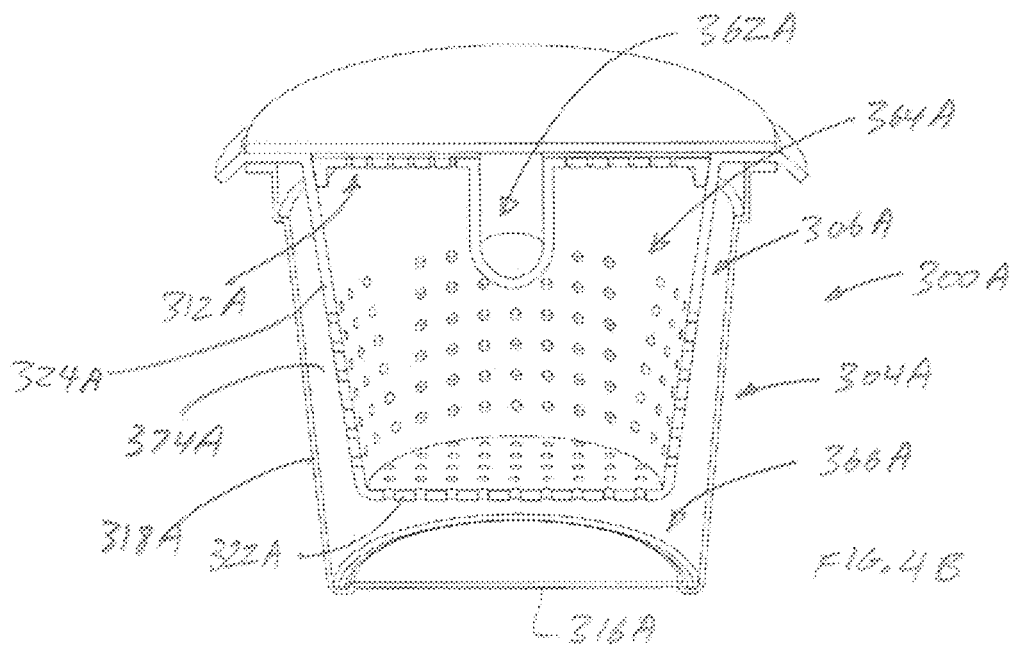
FIG. 4B shows a perspective cross-sectional view of the assembled pod of FIG. 4A.

FIG. 4B shows a perspective cross-sectional view of the assembled pod 300A. In particular, the filter 306A may be taller than the filter 306, as disclosed in FIG. 3A; and the depth of the beverage ingredient 310A (not shown) may be deeper than the ingredient 310, as disclosed in FIG. 3A. In general, a deeper bed of the ingredient 310B packed within the taller filter 306A may result in a rise of resistance to flow of heated water thereby increasing the pressure therein, which may extend the brewing time and induce overextracting some of the bitter flavors from the ingredient 310A. Coffee is generally brewed at a lower pressure than espresso, and pressure within the ingredient 310A may be reduced by increasing the grind sizes to allow the heated water to flow through the ingredient 310A with less resistance. The interior of the pod 300A may be divided into different chambers including the cavity 362A, a first chamber 364A, and a second chamber 366A where the first chamber 364A may be located between the distributor 312A and the second chamber 366A. The first chamber 364A may be adapted to pack about 12 to 16 grams of coffee ground to brew 6 to 14 oz of coffee.

In general, traditional single-serve pods such as K-Cup® pods may pack about 9 to 12.5 grams of coffee within a filter made of a paper like material designed to brew coffee at about 1 to 2 bars of pressure. Note that the paper like filter utilized within the K-Cup pod may not be able to withstand water pressure above about 3 bars since the filter may weaken once it gets wet and the weight of the wet coffee ground with the added water pressure above about 3 bars may tear open and allow the coffee ground to escape, which can damage the brewing mechanism. The filter 306A may be formed from a substantially rigid material to be able to withstand above about 6 bars of pressure without substantially reshaping the configuration of the filter 306A; and, in particular, the filter may withstand about 8 to 15 bars of pressure to work with high pressure brewing mechanisms. With the higher water pressure, the grind size of the ingredient 310A such as coffee ground may be smaller or finer since the higher water pressure can more readily push the water through the denser coffee ground. The finer coffee ground is generally denser than the traditional coarser coffee ground provide in the K-Cup pods so that more of the finer coffee ground by mass may be packed within the same volume of space. This means that for the same volume of space within the K-Cup pod filter, a greater mass of the finer coffee ground may be packed therein relative to the coarser coffee ground. Moreover, the space within the first chamber 364A may be greater than the space provided within the paper filter of K-Cup pod by about 10% to about 30% since the base 322A of the filter 306A may be lowered to be adjacent to the base 316A of the container 304A while leaving space for a pathway 374A between the sidewall 324A of the filter 306A and the sidewall 318A of the container 304A. The combination of the finer coffee ground and more space within the first chamber 364A may allow the filter 306A to pack about 20% to about 40% more grams of coffee ground within the container 304A that has a similar form factor as the outer container of K-Cup pod. The extra coffee ground in the pod 300A may allow the brewing mechanism to extract the desired flavors from the coffee ground while leaving the undesirable flavors within the coffee ground without sacrificing on the strength of the beverage or increasing the strength of the beverage, as discussed in more detail below.

FIG. 5A shows a third pod 300B including an outer container 304B, a filter 306B, a distributor 312B, and a lid 314B where each of these elements may be assembled together as discussed above in reference to the pod 300. Note that the beverage ingredient is not shown in this figure. The filter 306B may be similar to the filter 306 where in this embodiment, the sidewall 324B have one or more ribs 325B extending outwardly. The extending ribs 325B may be formed on the exterior side 327B of the sidewall 324B along the first portion 332B of the sidewall 324B. As the filter 306B is inserted into the container 304B, the extending ribs 325B may engage with the sidewall 318B of the container 304B to center the filter 306B relative to the container 304B such that the filter 306B may be substantially aligned with the filter 306B along a central axis 329B of the pod 300B. This may allow the assembled pod 300B to substantially maintain a uniform pathway 374B between the sidewall 324B of the filter 306B and the sidewall 318B of the container 304B around the circumference of the sidewall 324B. The extending ribs 325B may also engage with the sidewall 318B of the container 304B during the brewing process such that the lateral force applied to the interior 347B of the sidewall 324B may transfer to the sidewall 318B of the container 304B, as discussed in more detail below in reference to FIG. 5F. During the brewing process, the container 304B may be supported by the brewing chamber which in turn supports the sidewall 324B of the filter 306B to substantially preventing the filter 306B from deforming due to the internal high pressure within the filter 306B.

The distributor 312B may have a flange 346B with cutouts 353B around the circumference of the flange 346B to allow the outer area of the distributor 312B to flex and bend. The protrusion 349B may have an inverted bell like shape to enlarge the area of the cavity 362B adapted to receive the inlet piercing member of the brewing mechanism. The enlarged cavity 362B may also allow the outer area of the distributor 312B to flex and bend more readily.

FIG. 5B shows the filter 306B in an inverted position to generally illustrate the holes 336B formed in the base 322B to brew lower pressure beverage such as coffee with the coffee ground packed within the filter 306B. As an example, the base 322B generally illustrates the number and distribution of the holes 336B formed on the base 322B. In general, to minimize the pressure within the beverage ingredient to brew coffee, the base 322B may incorporate more holes 336B compared to the number of holes 336B provided to brew high pressure beverages such as espresso, as illustrated below in reference to FIG. 5D. FIG. 5C shows an enlarged view of the holes 336B provided in the base 322B. As discussed above in reference to the pod 300, for coffee, an average grind size may be from about 500 to 1,000 microns such that the size of the holes 336B may be smaller than the average grind size or less than the lower end of the distribution of the grind sizes to brew coffee, or sized to substantially prevent the average grind size of the beverage ingredient from passing through the hole by having at least one of the dimensions of the hole be less than the average grind size. With such distribution of average grind sizes, the size of the holes 336B to brew coffee may be less than about 500 microns to substantially prevent coffee ground from passing through the holes 336A and to release the pressure within the coffee grounds to brew coffee. With such average grind size of the coffee ground, the hole 336B may be formed from a variety of configurations such as circular, oval, square, rectangle, triangle, or any other regular or irregular shape or any other shape known to one skilled in the art where the longest distance defining the hole 336B may be smaller or equal to the average grind size. FIG. 5C, for example, shows a hole 336B having a substantially isosceles right-angle triangular configuration where the base distance A may be from about 0.20 to about 0.50 mm (200 to 500 microns) and the hypotenuse distance B may be from about 0.28 to about 0.70 mm (280 to 700 microns) where the upper dimension of the distance A of 500 microns is less than the average grind size of the beverage ingredient. As another example, the base distance A may less than about 0.35 mm (350 microns) and the hypotenuse distance B may be less than about 0.5 mm (500 microns) where at least one of the distance A of 350 microns of the hole 336B is less than the average grind size of 500 microns for the coffee beverage ingredient. And to increase the number of holes provided on the base, four holes 336B may be grouped together to form a circular configuration having a diameter D from about 1.00 to about 1.25 mm (1,000 to 1,250 microns); and in particular about 1.15 mm. Note that the shape and dimensions provided as exemplary dimensions such that the shape and dimensions of the hole may be modified and different configurations of the holes and dimension may be utilized within the same base 322B.

FIG. 5D shows the filter 306B with the top down view of the base 322B to generally illustrate an alternative embodiment of the holes 336B formed in the base 322B to brew higher pressure beverage such as espresso with the espresso ground packed within the filter 306B. As an example, the base 322B generally illustrate the number and distribution of the holes 336B formed on the base 322B to brew espresso.

In general, to increase the pressure within the beverage ingredient to brew espresso, the base 322B may incorporate fewer holes 336B compared to the number of holes 336B needed to brew lower pressure beverages such as coffee, as discussed above in reference to FIG. 5C. In this regard, FIG. 5E shows an enlarged view of an alternative embodiment of the holes 336B provided in the base 322B to brew espresso. As discussed above in reference to the pod 300, to brew espresso under high pressure from 6 to 15 bars, the coffee beans may be finely grounded where the average grind size may be from about 40 to about 450 microns; and in particular, from about 200 to about 400 microns such that the size of the holes 336B may be smaller than the average grind size or less than the lower end of the distribution of the grind sizes to brew coffee, or sized to substantially prevent the average grind size of the beverage ingredient from passing through the hole by having at least one of the dimensions of the hole be less than the average grind size. With such distribution of average grind sizes, the size of the holes 336B to brew espresso may be less than about 200 microns to substantially prevent espresso ground from passing through the holes 336A and to increase the pressure within the espresso ground to brew espresso. With such average grind size of coffee ground, the hole 336B may be formed from a variety of configurations such as circular, oval, square, rectangle, triangle, or any other regular or irregular shape where the longest distance defining the hole 336B may be smaller or equal to the average grind size. FIG. 5E, for example, shows a hole 336B having a substantially rectangular configuration where the width distance W may be from about 1.00 to 2.00 mm (1,000 to 2,000 microns) and the height H may be from about 0.10 to 0.20 mm (100 to 200 microns) where the upper dimension of the height H of 200 microns is less than the average grind size of 200 microns for the espresso beverage ingredient. In particular, the width distance W may be less than about 1.50 mm (1,500 microns) and the height distance H may be less than about 0.20 mm (200 microns).

The above disclosure generally describes the low pressure beverage ingredient packed into the filter 306B with holes 336B disclosed in reference to FIG. 5C to brew low pressure beverages such as coffee, and packing the high pressure beverage ingredient into the filter 306B with holes 336B disclosed in reference to FIG. 5E to brew high pressure beverage such as espresso. Note that it is within the scope of the invention to pack high pressure beverage ingredient into the filter 306B with holes 336B disclosed in reference to FIG. 5C to brew a beverage with the pressure that may be between the low and high pressure beverages of coffee and espresso beverages, respectively, which may be described as a medium pressure beverage. In addition, the filter 306 may be packed with the low pressure beverage ingredient into the filter 306B with holes 336B disclosed in reference to FIG. 5E to brew a beverage with the pressure that may be between the low and high pressure beverages to generate medium pressure within the beverage ingredient as well. As discussed above, there are many factors that can determine the overall taste profile of the beverage including the quality of the coffee, roast, grind size, water temperature, brewing time, brewing pressure, among others. In particular, the brewing pressure may have a material impact on the over taste profile of the beverage since relatively high pressure may be needed to produce crema which is generally produced from the extracted fat and oils from the coffee ground. Under extracting the fat and oil may make the beverage taste light while over extracting the fat and oil may make the beverage taste harsh, but pressure alone may not determine whether the beverage is under or over extracted as other factors such as the quality of the coffee and roast, along with others, to determine the proper brewing pressure to brew a desired beverage. With the filter 306 described above, a filter 306 may be utilized with the size and number of holes 336 in combination with the grind size of the beverage ingredient to adjust the brewing pressure within the beverage ingredient that is appropriate to brew a desired beverage.

FIG. 5F shows a cross-sectional view of the assembled pod 300B without the beverage ingredient 310B within the first chamber 364B in a substantially horizontal orientation relative to the gravitational force g, which may be one of the brewing orientations of the pod 300B. The protrusion 349B may have a tip 355B configured to penetrate into the beverage ingredient packed within the first chamber 364B to allow the distributor 312B to assembled with the filter 306B and have the flap 346B engage with the interior side 347B of the filter 306B. As discussed in more detail below, the cavity 362B may be configured to have an opening 357B where the diameter of the opening 357B may be greater than the diameter of the seal around the inlet piercing element such that the seal may engage with the lid 314A but may not be supported underneath by distributor 312A. This may allow the distributor 312A to flex or bend without the direct constraint by the seal of the inlet piercing element. The flap 346B may also have cutouts 353B to allow the outer surface area of the distributor 312B to flex more readily. The interior side 347B of the filter 306B may have a step 343 adapted to engage with a divider 380C, as discussed in more detail in reference to FIG. 6A, to divide the filter into two compartments.

During the assembly process, the first section 328B of the filter 306B may be sealed to the rim 320B of the container 304B such as using a torsional ultrasonic welding method, as discussed above, around a first circumference of the first section 328B. Thereafter, the lid 314B may be sealed or bonded to the first section 328B around a second circumference as generally defined by the outer edge 350B of the lid 314B. The diameters of the first and second circumferences may be similar; alternatively, the diameter of the first circumference may be different from the diameter of the second circumference. For instance, the ultrasonic welding the first section 328B to the rim 320B may alter the composition of the polymer forming the first section 328B such that sealing the lid 314B near the same location on the first section 328B that has been ultrasonically treated may provide inconsistent seal between the lid 314B and the first section 328B. As such, the diameter of the second circumference may be greater than the diameter of the first circumference such that the ultrasonic weld between the first section 328B and the rim 320B may be within the seal between the lid 314B and the first section 328B, and vice versa. Alternatively, the diameter of the lid 314B may be enlarged and the lid 314B may be sealed to the second section 330B of the filter 306B. Note that once the lid 314B is sealed to the first section 328B, a gap 361B may be formed between the lid 314B and the distributor 312B to allow the water injected into the cavity 362B to flow along the gap and exit through the holes 348B formed in the distributor 312B to interact with the beverage ingredient 310B. Moreover, the lid 314B may be sealed to the filter 306B without the use of adhesives, glue and/or bonding materials and the like since such materials do not degrade readily. However, it is within the scope of the invention to use such materials or methods known to one skilled in the art.

The assembled pod 300B illustrates that the extending ribs 325B may engage with the sidewall 318B of the container 304B such that during the brewing process, the lateral force applied to the interior 347B of the sidewall 324B may transfer to the sidewall 318B of the container 304B, which in turn may be supported by the brewing chamber. That is, the extending ribs 325B may transfer the load from the filter sidewall 324B to the container sidewall 318B, which may be supported by the brewing chamber such that the filter sidewall 324B may be supported by the exterior structures to substantially prevent the filter 306B from deforming due to the internal high pressure therein. This may allow the assembled pod 300B to substantially maintain a uniform pathway 374B between the sidewall 324B of the filter 306B and the sidewall 318B of the container 304B around the circumference of the sidewall 324B during the brewing process.

FIG. 5G shows a perspective view of the pod 300B without the lid 314B to show the distributor 312B assembled to the filter 306B. The cavity 362B may be formed within the distributor 314B as defined by the opening 357B. The base 345B may have a plurality of radial channels 359B and a plurality of semi-circular channels 365B as defined by a plurality of semi-circular ribs 367B. The semi-circular channels 365B may have the holes 348B to allow the water injected into the cavity 362B to flow backup to the opening 357B and flow along the channels 359B and 365B and exit through the holes 348B to interact with the beverage ingredient thereunder. The plurality of holes 348B formed on the outer radial portion of the base 345B and the cutouts 353B in the flap 346B may allow the distributor 314B to flex or bend relative to the protrusion 349B. As a reference point in the discussion below in reference to FIG. 8A, the first extension 328B may be viewed as a face on a clock where the bottom 308B of the first extension 328B may represent the six o'clock position in reference to the gravitational direction g.

Figure 6A:
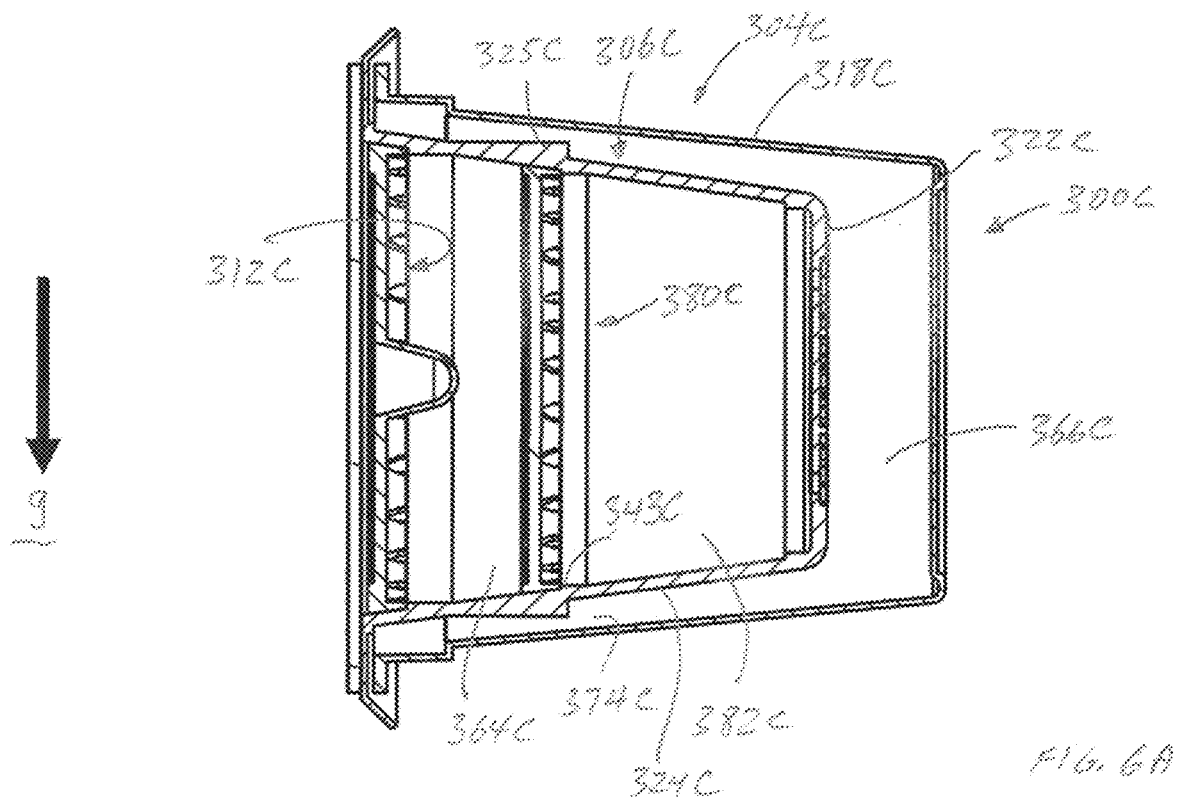
FIG. 6A shows a cross-sectional view of yet another pod.

FIG. 6A shows a cross-sectional view of a fourth pod 300C in a substantially horizontal orientation relative to the gravitational force g, which may be one of the brewing orientations of the pod 300C. The fourth pod 300C may include a divider 380C within the filter 306C to divide the filter 306C into a first chamber 364C and a third chamber 382C, and a second chamber 366C defining the space between the filter 306C and the container 304C. The divider 380C may rest upon the step 343 within the interior side 347C of the filter 306C. Note that in this embodiment, the extending ribs 325C may not engage with the sidewall 318C of the container 304C to enlarge the pathway 374C between the two sidewalls 324C and 318C. In this embodiment, the divider 380C may be closer to the distributor 312C than the base 322C of the filter 306C such that the third chamber 382C may have a bigger volume of space compared to the first chamber 364C. With more than one compartment within the filter 306C, the pod 300C may be packed with a primary beverage ingredient 310C and a secondary beverage ingredient 384C (not shown). For example, the primary beverage ingredient 310C may be the primary beverage ingredient such as coffee or tea, and the secondary beverage ingredient 384C may be an additive such as vitamin, energy supplement, functional ingredient, medicine, cannabis, and/ or etc. In this regard, the secondary beverage ingredient 384C may be packed within the smaller first chamber 364C, and the primary beverage ingredient 310C may be packed within the larger third chamber 382C, or vice versa. Separating the primary and secondary beverage ingredients may substantially prevent cross-contamination of the flavors and aroma between the two ingredients and maintain the freshness of the two ingredients for a longer period of time. The volume space of the first chamber 364C may be sized to hold the secondary beverage ingredient 384C in a substantially compact manner to avoid having air pockets such that when the heated water enters the first chamber 364C, the secondary beverage ingredient may dissolve and exit through the divider 380C and mix with the primary ingredient 310C within the third chamber 382C to infuse the beverage ingredient 310C with the secondary ingredient 384C.

Figure 6B:
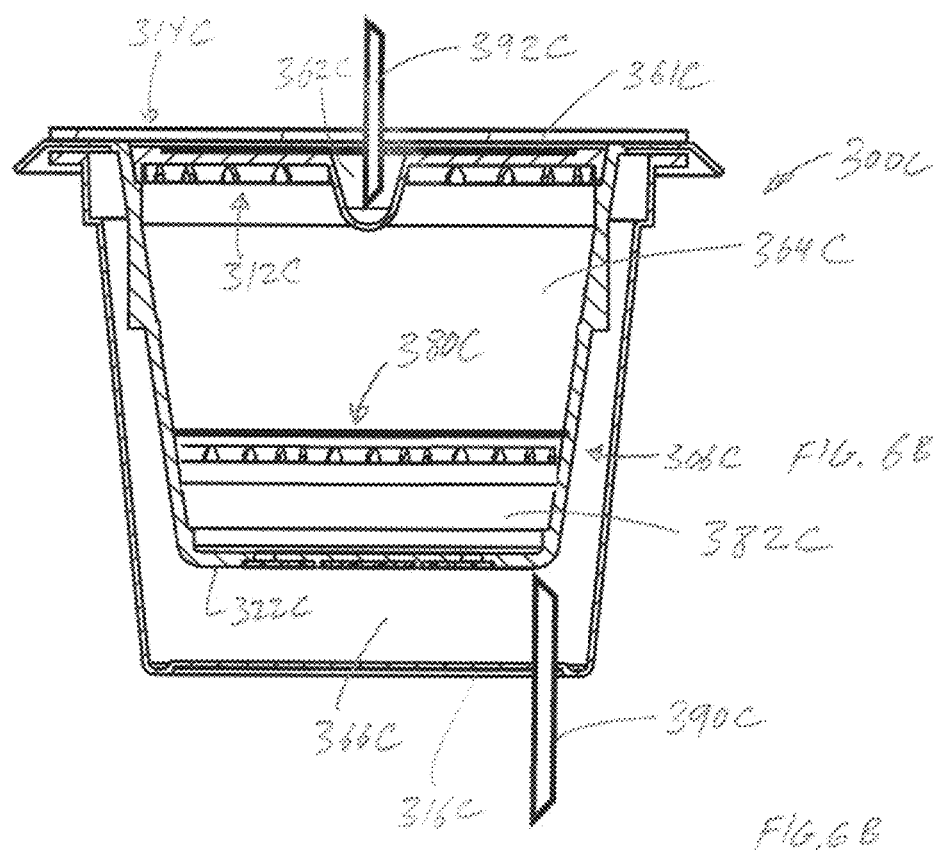
FIG. 6B shows a pod working in an upright orientation.

FIG. 6B shows the fourth pod 300C in a substantially upright orientation relative to the gravitational force g, which may be a second brewing orientation of the pod 300C. In this embodiment, the divider 380C may be closer to the base 322C of the filter 306C than the distributor 312C such that the first chamber 364C may have a bigger volume of space compared to the third chamber 382C. The secondary beverage ingredient 384C may be packed within the smaller third chamber 382C, and the primary beverage ingredient 310C may be packed within the larger first chamber 364C, or vice versa. The base 322C of the filter 306C may be offset relative to the base 316C of the container 304C such that an outlet piercing member 390C, such as from the Keurig Brewing System, may pierce through the base 316C without the outlet piercing member 390C coming into contact with the base 322C of the filter 306C. The inlet piercing member 392C, such as from the Keurig Brewing System, may pierce through the lid 314C and inject heated water into the cavity 362C where the heated water passes through the gap 361C and exits through the holes 348C and interacts with the primary ingredient 310C and then exits through the divider 380C and the primary beverage mixes with the secondary ingredient 384C to infuse the primary beverage with the secondary ingredient 384C. The infused beverage may exit through the holes 336C in the base 322C and then drains via the outlet piercing member 390C.

FIGS. 7A through 7E show various alternative embodiments to the filter 306 and distributor 312 in reference to the first pod 300. FIG. 7A shows an enlarged view of the extension 326 area of the filter 306. In this embodiment, the first section 328 may have a partial cut 319 underneath the first section 328 and adjacent to the corner 315. This may allow the extension 326 to more readily bend or flex relative to the corner 315. Note that it is within the scope of the invention to have the partial cut on the upper surface of the first section 328 and have more than one partial cut to allow the extension to be flexible.

FIG. 7B shows another alternative embodiment of the extension 326 area. In this embodiment, the first section 328 may have a baffle 356 underneath the first section 328 adjacent to the corner 315 or the sidewall 324 to allow the baffle 356 to fit within the opening 360 defined by the rim 320 of the container 304. The baffle 356 may form a cavity 358 to allow the baffle to flex and bend. This may allow the extension 326 to more readily flex and bend along the baffle 356 relative to the corner 315. FIG. 7D shows a perspective view of the filter 306 with the baffle 356 around the circumference of the first section 328 forming the cavity 358.

FIG. 7C shows an alternative embodiment of the distributor 312. In this embodiment, the distributor 312 may have a circular protrusion 369 forming a cavity 373 therein around the center 385 rather than having the protrusion 349 therein. The circular protrusion 369 may act like the baffle 356 discussed above in reference to FIG. 7B to allow the distributor 312 to flex more readily. The cavity 373 may be adapted to receive the inlet piercing mechanism and receive the injected water from the brewing mechanism, as discussed in more detail below. In addition, the sidewall 346 may have a plurality of partial cuts 353 to allow the sidewall 346 to flex more readily as well along with the distributor 312.

In the high pressure brewing applications such as for brewing espresso, the center 385 of the distributor 312 may be reinforced with additional material to substantially resist being pierced or punctured therein by the inlet piercing element, such as the element 392C discussed above in reference to FIG. 6B, to substantially prevent the pod 300 from working with low pressure brewing mechanisms such as the Keurig Brewing System. That is, the grind size for espresso may be finer than the coarser grind size for coffee such that brewing pressure of above 7 bars may be needed to drive the heated water through the finer espresso grind. As such, the pod 300 packed with espresso grind in the first chamber 364 may not work with the low pressure brewing mechanisms, such as Keurig Brewing System, because these low pressure brewers generally inject heated water well below 7 bars. Such low pressure brewing mechanisms, however, are generally design to have the inlet piercing member 392C (see FIG. 6B) pierce the center of the lid to inject heated water into the pod, including Keurig Brewing System. In order to substantially prevent the pod 300 packed with espresso grind from working with the low pressure brewing mechanisms, the pod 300 may incorporate a distributor 312 with the harden center 385 to substantially prevent the inlet piercing member from the low pressure brewing mechanisms from penetrating the harden center 385 thereby substantially preventing the pod 300 from working with the low pressure brewing mechanisms.

FIG. 7E shows a cross-sectional view of an assembled pod 300D where the filter 306 shown in FIG. 7D and the distributor 312 shown in FIG. 7C are assembled. Once the pod 300D is assembled, the baffle 356 may protrude downward from the first section 328 adjacent to the sidewall 318 such that the baffle 356 may fit within the rim 320 of the container 304. The underside of the first section 328 may be releasably sealed to the rim 320 such that application of force underneath the second section 330 may peel away the first section 328 from the rim 320 to form a gap between the extension 326 and the rim 320. Once the first section 328 is peeled or separated from the rim 320, the extension 326 may flex or bend more readily along the baffle 356 to allow the extension 326 to remain separated from the rim 320 during the brewing process. The distributor 312 shows the circular protrusion 356 adapted to receive the inlet piercing member from the brewing mechanism. The protruding member 356 may have a hole 377 at the basin to allow a portion of the heated water from the inlet piercing member to drain therethrough. The remaining water may pass through the gap 361 and drain through the holes 348 to more evenly wet or wash the primary beverage ingredient 310 underneath. With the cavity 373 formed within the circular protruding member 356, the pod 300 may be inserted into a brewing mechanism in any rotational direction and the inlet piercing member that may be offset to the center 385 of the pod 300 may pierce through the lid 314 and into the cavity 373 to inject the heated water. In addition, the baffle 356 and the holes 348 may allow the distributor 312 to flex more readily as the extension 326 is peeled from the rim 320.

The interior of the filter may be divided into different chambers including the first chamber 364 and the second chamber 366. As discussed above, the first chamber 364 may be generally defined as the space within the filter 306, and the second chamber 366 may be generally defined as the space between the container base 316 and the filter 306. In particular, a pathway 374 may be formed between the two sidewalls 324 and 318 to provide a path for beverage to flow therethrough when the pod 300 is orientated in a substantially horizontal manner as discussed above in reference to FIG. 6A. In particular, the baffle 356 formed in the first section 328 may allow the extension 326 to flex or bend more readily to allow the gap between the extension 326 and the rim 320 to remain open. Moreover, the brewing mechanism may have the inlet piercing member position such that it penetrates the cavity 373 of the distributor 312 farthest distance away from where the gap is formed between the extension 326 and the rim 320 to allow additional flexibility to the distributor 312.

FIGS. 8A through FIG. 8D show cross-sectional views of the third pod 300B in different stages to illustrate the manner and method of brewing a beverage with the third pod 300B to brew low, medium, or high pressure beverage. In this embodiment, FIG. 8A shows the pod 300B in a brewing orientation in reference to the gravitational direction g, as discussed above in reference to FIG. 5F, packed with beverage ingredient 310B within the first chamber 364B to brew low pressure coffee with coarser coffee grind size from about 500 microns to about 1,000 microns, as discussed above, and the holes 336B illustrated in FIG. 5C may be provided in the base 322B to release the pressure within the first chamber 364B. The pod 300B may be juxtaposed to an inlet piercing member 408 having an inlet end 407 and a tip 410 with a gasket 409 therebetween. The member 408 may be adapted to slide relative to the pod 300B as indicated by the double ended direction arrow 405, or the pod may be adapted to slide relative to the member 408, or both elements 300B and 408 may be adapted to slide or move relative to each other simultaneously or sequentially. The member 408 may be positioned relative to the pod 300B such that the tip 410 may be juxtaposed to the lid 314B and to penetrate the cavity 362B of the distributor 312B. The pod 300B may also be juxtaposed to a detaching member 412 position behind the second extension 330B at about the six o'clock position 308B, as discussed above in reference to FIG. 5G, in reference to the gravitational direction g. The detaching member 412 and the pod 300B may be adapted to slide relative to each other as indicated by the double ended direction arrow 413 where one or both elements 300B and 412 may move relative to each other simultaneously or sequentially.

FIG. 8B shows that to begin the brewing process, the member 408 may pierce through the lid 314B, and the tip 410 may rest within the cavity 362B, and the gasket 409 may engage with the lid 314B surrounding the member 408 to substantially prevent the water from leaking out of the gap between the member 408 the lid 314B formed by the puncture hole within the lid. The detaching mechanism 412 may move towards an extended position as indicated by the direction arrow 413 to engage with the second extension 330B to separate the first extension 328B from the rim 320B near the six o'clock position 308B thereby forming a gap 420 between the extension 326B and the rim 320B that extends from about four o'clock to about eight o'clock positions; and in particular from about five o'clock to about seven o'clock positions. The second section 330B may taper towards the base 332B such that the underside of the second section 330B facing the detaching member 412 may form a concave shape or hook to allow the detaching member 412 to engage, and not slip over, the underside of the second section 330B to separate the first extension 328B from the rim 320B more consistently.

FIG. 8B also shows that the diameter of the gasket 409 may be smaller than the diameter of the opening 357B forming the cavity 362B such that the force applied by the gasket 409 onto the lid 314B may not directly transfer to the distributor 312B to minimize the resistance upon the extension 326B to allow the detaching mechanism 412 to separate the first extension 328B from the rim 320B and keep the gap 420 open. Moreover, as discussed in more detail below, two sides of the second extension 330B and/or the rim 320B and/or the sidewall 318B near the rim 320B may be squeezed at about four o'clock and about eight o'clock positions, and in particular at about five o'clock and about seven o'clock positions where such squeezing action may bend the bottom portion of the extension 326B such that the bottom portion of the extension 326B may form a hyperbolic paraboloid-like shape resembling a Pringle's potato chip to lift the extension near the six o'clock position to keep the gap 420 open. The newly formed gap 420 may form part of the pathway 374B between the two sidewalls 318B and 324B and also between the adjacent extending ribs 325B to allow the beverage formed within the container 304B to flow along the pathway 374B and drain through the gap 420, as discussed in more detail below.

FIG. 8C illustrates that once the gap 420 has been formed, the detaching member 412 may move towards the recessed position relative to the pod 300B as indicated by the direction arrow 413. The recessed position may be generally described as positioning the detaching member 412 relative to the pod 300B such that the detaching member 412 may not interfere with the beverage draining out of the gap 420. With the detaching member 412 in the recessed position, a combination of the rim 320B and the concave shape of second extension 330B that extends downwardly may act as a spout from a kettle to allow the beverage to pour from the gap 420 in a smooth manner to minimize spattering of the beverage. This may provide a clear path for the beverage to flow along the pathway 374B and pour from the gap 420 without coming to contact with the brewing mechanism to avoid contaminating the beverage, as discussed in more detail below.

FIG. 8D shows heated water 416 being injected into the cavity 362B via the inlet piercing member 408. As indicated by a pressure meter 430, the heated water 416 may be provided at a high pressure such as from about 6 to 15 bars. As indicated by the direction arrows 432, the high pressure within the cavity 362B may force the heated water 416 to flow pass the gap 361B between the lid 314B and the distributor 312B, as discussed above in reference to FIGS. 5F and 5G, and exit through the holes 348B of the distributor 312B and the heated water 416 may interact with the ingredient 310B to extract the flavors from the ingredient 310B forming a beverage where the high pressure 430 from the inlet piercing member 408 may push the extracted beverage towards the base 322B as indicated by the direction arrows 434. The ingredient 310B may be a coarser grind size, such as from about 500 to about 1,000 microns, so that the beverage 434 may readily pass through the gaps in the ingredient 310B and exit through the holes 322B, as illustrated in FIG. 5C, where the high water pressure 430 provided into the first chamber 364B may be released to brew a beverage under a low brewing pressure as indicated by the pressure meter 436 such as from about 1 to about 3 bars. The coffee beverage extracted from the coffee ground 310B may flow towards the base 322B, as indicated by the direction arrows 434, and exit through the holes 336B and drain into the second chamber 366B. Thereafter, the beverage 434 may flow along the pathway 374B towards the gap 420 in the six o'clock position and pour out from the gap 420 and into a mug 438. And as the beverage 434 pours from the pod 300B and into the mug 438, the beverage 434 may pour directly into the mug 438 without coming into contact with the brewing chamber to avoid contaminating the beverage 432. Note that during the brewing process, beverage may readily flow through the coarser ingredient 310B such that the flow rate of the beverage 434 exiting the holes 336B may be high relative to the high pressure beverage such that the pathway 374B formed along the six o'clock position may be too small for the flow rate of the beverage 434 draining from the holes 336B, and under such circumstances, the beverage 434 may flow towards the twelve o'clock position as well as indicated by the direction arrow 434 and flow around the circumference of the sidewall 324B and towards the gap 420 to accommodate the faster flow rate of the beverage draining from the holes 336B.

Moreover, during the brewing process, a higher pressure within the cavity 362B may be substantially maintained relative to the pressure within the first chamber 364B such that the water 416 generally flows from the cavity 362B towards the first chamber 364B to substantially prevent the beverage 434 within the first chamber 364B from flowing towards the cavity 362B thereby substantially preventing the tip 410 of the inlet piercing member 408 from being contaminated by the beverage 432. This may substantially prevent the successive pods used within the brewing chamber from cross-contaminating with each other such that if a tea pod is used after a coffee pod has been used, the tea brewed from the tea pod may not be contaminated with coffee flavor extracted from the earlier coffee pod, and the tea pod may not contaminate the flavor of the next pod that is used to brew a beverage. Note that after the pod 300B has been used to brew a beverage, most of the components of the pod 300 such as the container 304, filter 306, and distributor 312 may be reused once they are separated and cleaned. In particular, unlike K-Cup pods, the base 316 of the container 304 does not need to be punctured to drain the beverage; instead with the pod 300, the extension 326 is separated from the rim 320 such that the integrity of the container 304 remains substantially the same as new after it has been used since there is no need to puncture a hole in the container to drain the beverage. Moreover, the pod 300 may be assembled without using glue and/or adhesives since the extension 326 of the filter 306 is sealed to the rim 320 via a ultrasonic weld which infuses the two materials together without the need for an adhesive; and the lid 314 may be infused to the extension 326 without using adhesives. In general, adhesives may not readily bio-degrade; and with the pod 300 not using adhesive for assembly, the container 304, filter 306, and the distributor 312 may be made from polypropylene (PP) and like material and treated with organic additive such as EcoPure® from Bio-Tec Environmental to cause the plastic to biodegrade through a series of chemical and biological processes in a anaerobic landfill disposal environment.

A number of factors may determine the pressure within the ingredient 310B such as the water pressure and temperature of the water 416, the grind size of the ingredient 310B, the density of the ingredient 310B packed into the first chamber 364B, the size and number of holes 336B, depth of the beverage ingredient 310B, and etc. The parameters of these factors may be varied to adjust the brewing pressure within the first chamber 364B to extract a desired beverage from the beverage ingredient 310B. For instance, FIG. 8E illustrates a pod 300E packed with finer beverage ingredient 310E, such as espresso coffee ground with grind size from about 200 to about 400 microns, relative to the coarser coffee ingredient 310B illustrated in reference to FIG. 8D;

and the base 322E may have fewer and smaller size holes 336E as illustrated in FIG. 5D. With the finer beverage ingredient 310E packed within the first chamber 364E, the same high water pressure may be injected into the cavity 362E, as indicated by the pressure meter 430, and as the heated water interacts with the finer beverage ingredient 310E, as indicated by the direction arrows 432, the finer beverage ingredient 310E may more readily resist the flow of the heated water therethrough relative to the coarser beverage ingredient 310B. Moreover, the fewer and smaller size holes 336E as illustrated in FIG. 5D may further resist the extracted high pressure beverage 434E from exiting through the holes 336E such that the pressure within the first chamber 364E may drop less relative to the first chamber 364B, as illustrated in FIG. 8D, where the brewing pressure within the first chamber 364E may be greater than the pressure within the first chamber 364B, as indicated by the pressure meter 436E. For instance, the pressure meter 430 may indicate that 15 bars of water pressure may be provided into the cavity 362E, and the pressure meter 436E may indicate that the brewing pressure within the first chamber 364E may be from 7 to 12 bars to brew espresso beverage 434E that pours into an espresso cup 438F.

FIG. 8F illustrates a pod 300F that is similar to the pod 300E discussed above except that coarser beverage ingredient 310F such as coffee ground with grind size from about 500 to about 1,000 microns may be packed within the first chamber 364F, but with the same fewer and smaller size holes 336E in the base 322F. With the coarser beverage ingredient 310F packed within the first chamber 364F, the same high water pressure injected into the cavity 362E, as indicated by the pressure meter 430, may readily interact with the coarser beverage ingredient 310F and flow therethrough with less resistance than the ingredient 310E; however, the fewer and smaller size holes 336E in the base 322F may resist the extracted beverage 434F from existing through the holes 336E such that the pressure within the first chamber 364F may be medium pressure, as indicated by the pressure meter 436F, to brew a medium pressure beverage 434F and pour into the mug 438F. That is, the pressure within the first chamber 364F with the coarser ingredient 310F but fewer and smaller holes 336E may release more pressure relative to the first chamber 364E with finer ingredient 310E and fewer and smaller holes 336E, but release less pressure relative to the first chamber 364B with coarser ingredient 310B and larger and more holes 336B. In general, a medium pressure may be described as from about 3 bars to about 7 bars such that a low pressure may be generally described as from about 1 to about 3 bars, and high pressure may be generally described as greater than 7 bars. Note that these numeric pressure values are provide as general references only and they should not be taken as strict meaning of what constitutes low, medium, and high pressures; rather, the numeric pressure values are provided herein to give general guidelines to one of ordinary skilled in the art as to what might constitute low, medium, and high pressures.

Figure 9A:
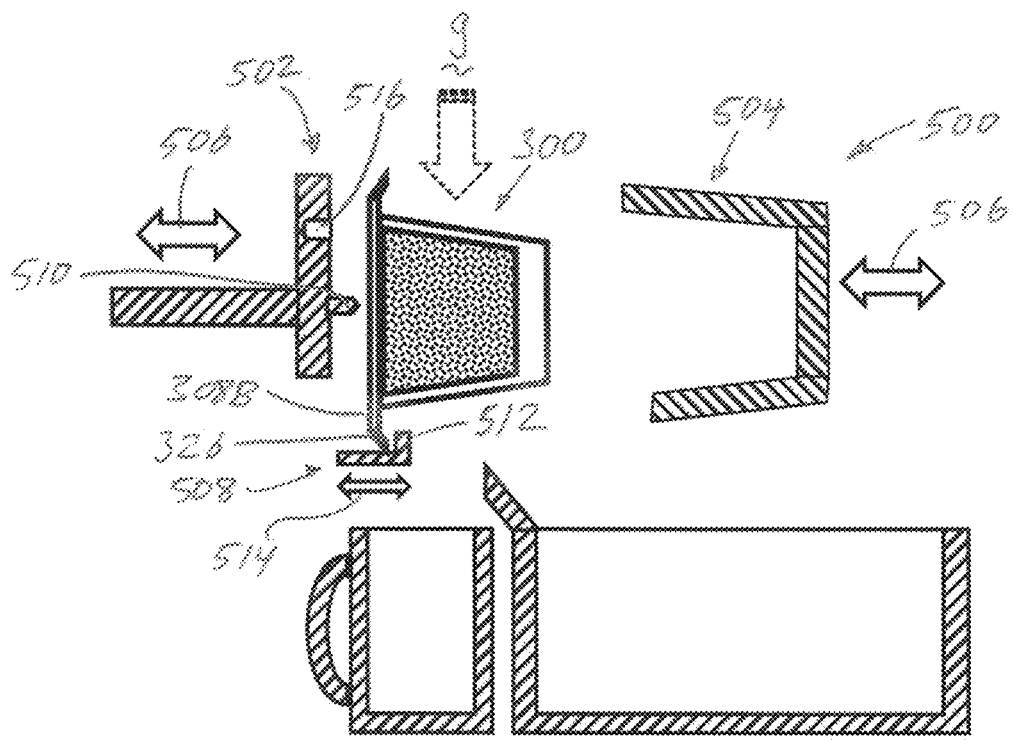
FIG. 9A illustrates the brewing chamber in an open position to receive a pod.
Figure 9B:
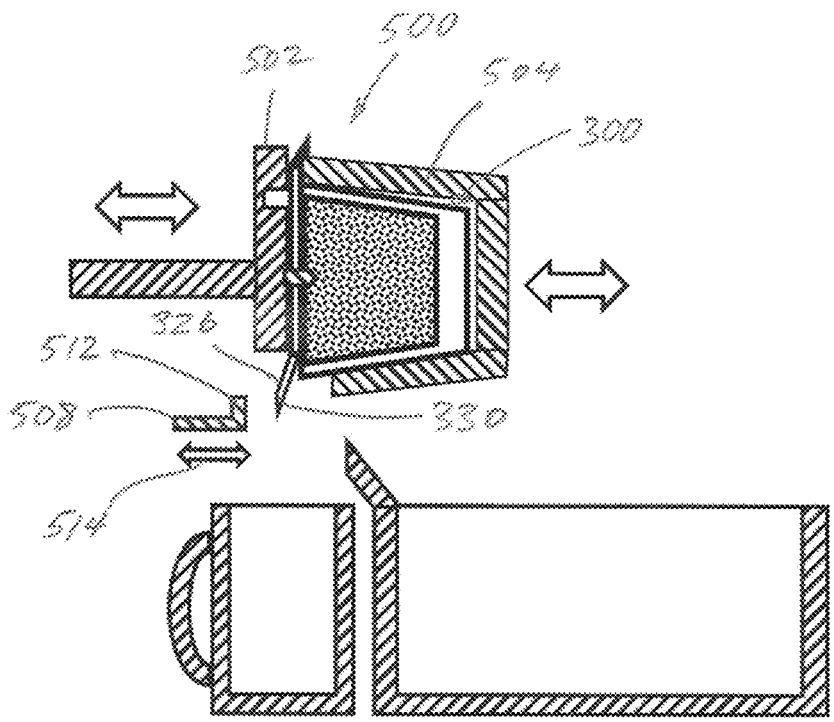
FIG. 9B illustrates the brewing chamber in a closed position with a pod therewithin.

Brewing Chamber:

FIGS. 9A through 9D generally illustrate schematic diagrams of a brewing chamber 500 adapted to brew a pod 300 in reference to the gravitational force g, as discussed above in reference to FIGS. 3A-3C. FIG. 9A illustrates that the brewing chamber 500 may include a cover 502 and a holder 504 adapted to slide relative to each other along a lateral direction as indicated by the double ended direction arrows 506. Either one or both of the cover 502 and/or the holder 504 may be mechanically coupled to an actuator (not shown here) to move between an open position, as illustrated in FIG. 9A, and a closed position, as illustrated in FIG. 9B, relative to each other as the actuator is moved between an open position and a closed position, respectively. Note that the actuation may be performed manually and/or through a motor. The brewing chamber 500 may also include a detaching member 508 adapted to separate the extension 326 at about the six o'clock position 308B from the rim 320, in reference to FIG. 5D. The detaching member 508 may have a hook 512 adapted to engage with the underside of the second extension 330 having a concave like shape. In the open position, the brewing chamber 500 may be adapted to receive the pod 300 between the cover 502 and the holder 504, and with the detaching member 508 underneath the pod 300, and the hook 512 may be juxtaposed to the underside of the second extension 330. The detaching member 508 and the pod 300 may be adapted to slide relative to each other as indicated by the double ended direction arrow 514 where one or both elements 300 and 508 may move relative to each other simultaneously or sequentially, as the actuator is moved between an open position and a closed position, respectively.

The cover 502 may have a reader 516 to detect the optical identifier (hereinafter "OID") printed on the lid 314 of the pod 300 received within the brewing chamber 500. The OID may correlate to the type of beverage ingredient 310 packed within the pod 300. The brewing chamber based on the OID on the lid 314 detected by the reader 516 may provide appropriate brewing water temperature, brewing time, and amount of water to the pod 300 to brew a desired beverage from the pod detected. Alternatively, a reader 516 may be embedded with the holder 504 configured to read an identifier such as OID or bar code provided at the center of the base 316 of the container 304. And as the holder 504 receives the pod 300 as the brewing chamber closes, the reader 516 may read the identifier to provide brewing parameters appropriate for the pod to brew a desired beverage. With the identifier provided near the center of the base 316, the reader 516 may read the identifier irrespective of the rotational orientation of the lid 314. The pod may be any one of the pods described above in reference to reference numerals 300 through 300F. The brewing chamber 500 may receive the pod 300 in a substantially brewing orientation and rest within the brewing chamber 500 such that the center of the lid 314 may be substantially aligned with the inlet piercing member 510 protruding from the cover 502. Note that it is within the scope of the invention to have the brewing chamber 500 receive the pod 300 in variety of orientation such as in vertical or angled position and the pod may reset upon the detaching member 508 in any angle as well.

FIG. 9B shows the cover 502 and the holder 504 in a closed position. As the cover 502 and/or the holder 504 move(s) relative to each other between the open and closed positions, the detaching member 508 may also slide relative to the pod 300 between the retracted position as shown in FIG. 9A, and the extended position as shown in FIG. 9B, respectively. In particular, in the extended position, the detaching member 508 may slide closer to the cover 502, as indicated by the double ended direction arrows 514. The detaching member 508 may be mechanically coupled to the actuator to move towards the extended position relative to the pod 300 as the cover 502 and/or holder 504 move(s) towards the closed position as illustrated in FIG. 9B. As the detaching member 508 moves from the retracted position towards the extended position or as the detaching member 508 slide towards the extended position relative to the pod 300, the hook 512 may engage with the second extension at about the six o'clock position and as the hook 512 moves past the pod 300, the hook 512 may apply force upon the underside of the second extension 330 thereby separating the extension 326 from the rim 320 of the container 304. As the extension 326 separates from the rim 320, the extension 326 may bend or flex such that the second extension 330 may slide over the hook 512, and the hook 512 may disengage with the second extension 330 such that the hook 512 may be on the opposite side of the second extension 330. This allows the detaching member 508 to be away from the path of the beverage draining from the pod 300 so that the detaching member 508 may be substantially prevented from coming into contact with the beverage. Once the gap 420 has been formed between the second extension 330 and the rim 320, the pathway 434 may open to allow the beverage formed within the pod 300 to flow along the pathway 434 and drain via the gap 434, and the beverage may pour into the mug, as discussed in more detail above in reference to FIG. 8D.

The detaching mechanism 508 may be interlinked to the brewing chamber in a variety of ways. For instance, the detaching member 508 may be interlinked with the holder 504 to move towards the extended position relative to the holder 504 as the holder 504 moves towards the closed position as illustrated in FIG. 9B. Note that it is within the scope of the invention to have the detaching mechanism 508 engage with the first and/or second extension anywhere along the three to nine o'clock position to separate the extension 326 from the rim 320 to form a gap anywhere along the bottom half of the rim 320. The detaching member 508 may be mechanically interlinked to the cover 502 and/or holder 504 to cause the cover 502 and/or the holder 504 to move between the open and closed positions with the detaching member 508 moving from the retracted position to the extended position. Alternatively, the detaching member 508 may be mechanically interlinked to the cover 502 to cause the detaching member 508 to move relative to the cover to cause the detaching member 508 to move from the retracted position to the extended position as the cover moves from the open and closed positions. Another alternative linking mechanism may mechanically interlink the detaching member 508 to the holder 504 to cause the detaching member 508 to move from the retracted position to the extended position as the cover moves from the open position to the closed position. Such a mechanical interlink may be actuated via a handle or through motorized action(s).

Figure 9C:
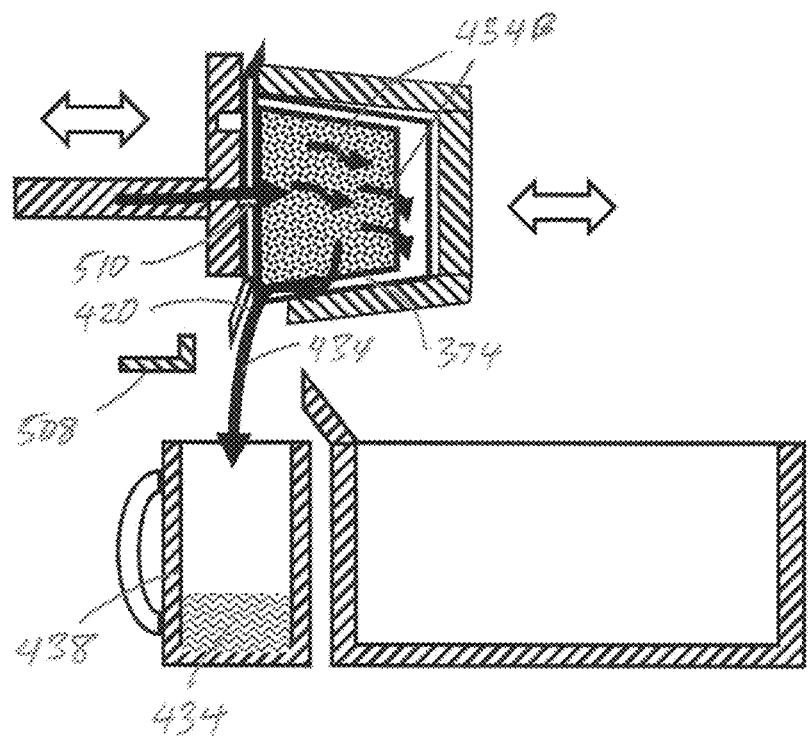
FIG. 9C illustrates brewing a beverage within the pod and draining the beverage therefrom into a mug without substantially contaminating the beverage by the brewing chamber.

FIG. 9C illustrates heated water being injected into the pod 300 via the inlet piercing member 510. As the heated water washes the beverage ingredient, beverage may be extracted from the beverage ground and pass through the filter 306 as indicated by the direction arrows 434 and pass along the pathway 374 and drain via the gap 420 and pour into a mug 438, in a manner generally described above in reference to FIG. 8D. The detaching member 508 may be in the extended position to avoid coming into contact with the beverage 434 pouring into the mug to substantially prevent cross-contamination of the beverage.

Figure 9D:
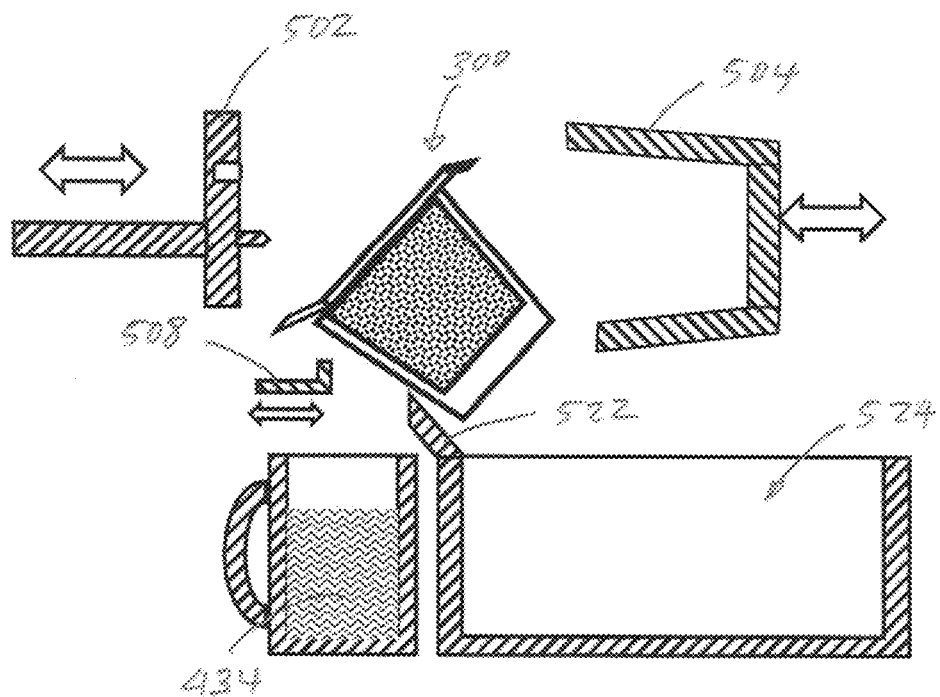
FIG. 9D illustrates the brewing chamber in an open position and dispensing the used pod.

FIG. 9D illustrates that once the brewing process is completed, the cover 502 and/or the holder 504 may return to the open position to dispense the used pod 300 and be ready to receive a new pod. As the cover 502 and/or the holder 504 returns to the open position, the detaching member 508 may also return to the retracted position as illustrated in FIG. 9A ready to receive a new pod. As the cover 502 and/or the holder 504 returns to the open position, the used pod 300 may disengage with the holder 504 and may drop onto a ramp 522 which may guide the pod 300 into a waste bin 524 to collect certain number of used pods so that the collection of used pods may be discarded at a later time rather than individually removing the used pod each time a new pod needs to be brewed.

FIG. 10A illustrates a top view of a brewing chamber 600 in an open position configuration to work with a variety of pods 300 through 300F, discussed above, and to dispense the used pod into a waste bin located below the brewing chamber 600, as discussed in a manner described below. In this disclosure, a single-serve beverage pod that has been used to brew a beverage may be generally referred to as a "spent pod" or "used pod". The brewing chamber 600 may have an opening 602 having a first side 609 and a second side 611, generally represented as dotted-lines, formed on the top side of the brewing chamber 600 configured to receive a pod. The first side 609 of the opening 602 may be generally defined by a bracket 604 juxtaposed to one or more gates 606 forming a gap 608 therebetween. The bracket 604 may have a base 610 and a hook 612 protruding the base 610. The bracket 604 may have two columns 605 each having an L-shape configuration. Each of the gates 606 may be movably coupled to the bracket 604 juxtaposed to the corresponding column 605 along a bias member 607 to allow the gates to open and close in a manner discussed below. Once the opening receives the pod 300, the combination of the two columns 605 and the gates 606 may retain the extension 326 portion of the pod 300 as discussed in more detail below. The brewing chamber 600 may also include one or more clamps 614 adapted to support and/or engage with the second extension 330 and/or the sidewall 318 of the container 304. The brewing chamber 600 may also have a holder 616, juxtaposed to the second side 611 of the opening 602, adapted to support the base 316 of the container 304. The holder 616 may have a recess 618 therein to guide the base 316 of the pod 300 into the holder 616 as discussed in more detail below. The brewing chamber 600 may also include a cover 601 with an inlet piercing member 680 protruding therefrom.

Figure 11A:
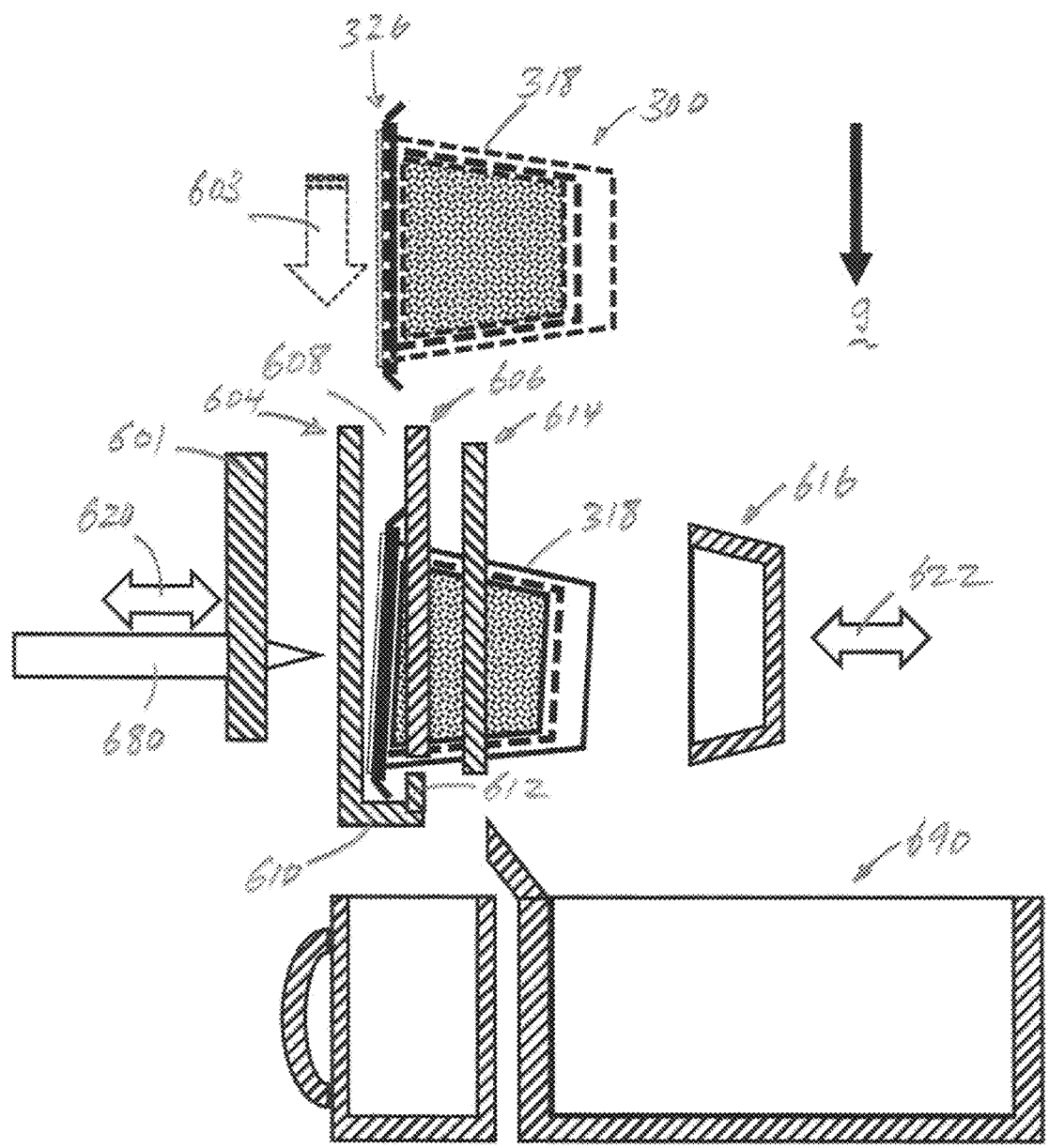
FIG. 11A shows a cross-sectional side view of the brewing chamber of FIG. 10C.

The opening 602 may have an outer configuration in the shape of an enlarged pod 300 to allow the pod to be inserted into the opening 602. In particular, the opening 602 may have a similar enlarged outer configuration as the pod 300 to visually aid the user to place the pod over the opening 602 in the proper orientation where the extension 326 of the pod may be aligned over the first side 609 as generally defined as the gap 608 which may be wide enough to receive the extension 326. For instance, once the pod 300 is released, the pod 300 may drop into the opening 602 where the bracket 604 and the gates 606 may guide the extension 326A to drop within the gap 608 until the extension 326 reaches the base 610 as illustrated in FIG. 11A below. The gates 606 may be coupled to a bias member 607 to allow the gates 606 to move between an open position and a closed position to allow the extension 326 of the pod 300 to move pass the gate 606 but not in the reverse direction through the gate 606. Moreover, the extension 326 and/or sidewall 318 of the pod 300 may be positioned between a pair of clamps 614 where the clamps can contract and expand as indicated by the double ended direction arrows 615 as described in more detail below. The cover 601 and the holder 616 may be mechanically linked to an actuator (not shown here) such that as the actuator closes and opens, either one or both of the cover 601 and/or the holder 616 may slide or move toward and away from each other, respectively, as indicated by the double ended direction arrows 620 and 622, as described in more detail below.

FIG. 10B shows front views of the various elements discussed above related to the cover 601 and the brewing chamber 600. The cover 601 may have the inlet piercing member 680 adapted to pierce through the lid 314 and inject water into the pod 300. The cover 601 may have a width W1. The bracket 604 may have a U-shape configuration with two columns 605 separated by a width W2 that is wider than W1 to allow the cover 601 to pass through the bracket 602 between the two columns 605. The gates 606 may be coupled to the bracket 604 along the bias members 607 juxtaposed to their respective columns 605. The hook 612 may protrude from the base 610, and the hook 612 may have a semi-circular cut out 613 to engage with the second extension 330 of the pod, once the pod is dropped into the opening 602.

The clamps 614 may have an outer side 617 having a convex shape and the inner side 619 having may have concave shape. As discussed in more detail below, as the brewing chamber 600 opens and closes, the clamps 614 may open and close as well such that as the clamps 614 closes upon the pod therein between, and the inner side 619 of the opposing clamps 614 may squeeze the second extension 330 and/or the sidewall 318 of the container such that the extension 326 of the filter may form an elliptical shape. The brewing chamber 600 may include a link 656 that engages with a lower portion of the outer side 617 of each of the clamp 614 at location 670 such that as the brewing chamber 600 closes, the links 656 may move vertically upwards or downwards to cause the clamps 617 to contract with respect to each other to partially squeeze the extension 326 and/or sidewall 318 of the pod. As discussed in more detail below, the bottom portion of the first extension 330 may first peel away or separate from the rim 320 of the container by the hook 612 to form a gap 420 as the cover 601 moves toward the clamps 614, and as the clamps 614 squeeze the extension 326 and/or the sidewall 308 of the container 304 near the rim 320, and the rim may form an oval like shape where the bottom portion of the extension 326 where the gap 420 is formed may form a hyperbolic paraboloid like shape to keep the gap open thereby maintaining the size of the gap 420 throughout the brewing process to provide a pathway for the beverage within the pod to drain smoothly. The holder 616 may also be provided having a base 621 with a sidewall 623 extending out thereby forming a recess 618 therein. As the brewing chamber 600 closes, the holder 616 may guide the base 316 of the pod into the recess 618 to guide the pod into a proper brewing orientation to allow the inlet piercing member 680 to pierce through the lid 314 in a consistent manner.

FIG. 10C shows a top view of the brewing chamber 600 with the pod 300 inside the opening 602. In particular, the extension 326 of the pod 300 may be orientated to drop into the gap 608 where the combination of the two columns 605 and the gates 606 may retain the extension 326 portion of the pod therein. In addition, the container 304 may drop in between the two clamps 614 adapted to support the extension 326 and/or sidewall 318 of the container 304, and the holder 616 to support the base 316 of the pod 300.

FIG. 10D shows another top view of the brewing chamber 600 with the cover 601 pushing the pod 300 partially through the bracket 604 as indicated by the direction arrow 622. In particular, as the second extension 330 engages with the gates 606, the bias members 607 may allow the gates 606 to open thereby allowing the pod 300 to pass therethrough. Moreover, the clamps 614 and the holder 616 may close upon the pod 300 as well as indicated by the direction arrows 615 and 620, respectively.

FIG. 10E shows another top view of the brewing chamber 600 in a fully closed position with the cover 601, clamps 614, and holder 616 fully engaged with the pod 300 to brew a beverage. In particular, once the cover 601 has fully pushed the pod 300 through the bracket 604 as indicated by the direction arrow 622, the second extension 330 may pass through gates 606 and the bias members 607 may return the gates 606 to their original position an indicated in FIG. 10E. In addition, the inlet piercing member 680 may have pierced through the lid 314 to inject heated water 416 into the pod 300 to brew a cup of beverage as discussed in more detail below.

FIG. 10F shows another top view of the brewing chamber 600 returning to the open position as illustrated in FIG. 10A after the brewing process has been completed with the pod 300. In particular, the clamps may return to the retracted position as indicated by the direction arrows 615 to release the pod 300. As the holder 616 returns to the open position, the pod 300 may dislodge from the holder 616 as the clamps 614 may prevent the second extension 330 of the pod 300 from passing through the gap between the two clamps 614. In addition, as illustrated in FIG. 10E, the second extension 330 may bend and straighten like a spring as the brewing chamber 600 closes; however, as the brewing chamber 600 opens, the second extension 330 may return to its original shape by pushing away from the clamps 614 thereby assisting in dislodging the pod 300 from the clamps 614.

FIG. 11A shows a cross-sectional side view of the brewing chamber 600 to further illustrate the manner in which the second extension 330 of the pod 300 may be separated or peeled from the rim 320 of the container 304 and dispense the spent pod into a waste bin 690. The side view of the brewing chamber 600 shows the bracket 604 juxtaposed to the gates 606 forming the gap 608 therebetween. The bracket 604 may have the base 610 with the hook 612 protruding from the base 610. The clamps 614 may be positioned to support the second extension 330 and/or the sidewall 318 of the pod adjacent to the rim 320 of the container 304. The holder 616 may have the recess 618 to guide the base 316 into the holder 616 and to support the base 316 of the pod 300 once the brewing chamber is in the closed position.

FIG. 11A also shows the brewing chamber 600 in an open position ready to receive a pod 300 to brew a beverage. For instance, a pod 300 may be placed over the opening 602 as described above in reference to FIG. 10A formed on top of the brewing chamber 600. Once the pod 300 is released, the pod 300 may drop into the opening 602 as indicated by the direction arrow 603 where the bracket 604 and the gates 606 may guide the extension 326 to drop within the gap 608 until the extension 326 reaches the base 610. The gates 606 may move between an open position and a closed position to allow the extension 326 of the pod to move in one direction through the gate 606 and towards the clamps 614 but not in the reverse direction. Moreover, the extension 326 and/or sidewall 318 of the pod 300 may be positioned between the pair of clamps 614 where the clamps can contract and expand as described above in reference to FIG. 10A. The cover 601 and the holder 616 may be mechanically linked to an actuator or handle, as discussed below, such that as the actuator closes and opens, either one or both of the cover 601 and the holder 616 may slide toward and away from each other, respectively, and vice versa as indicated by the double ended direction arrows 620 and 622.

Figure 11B:
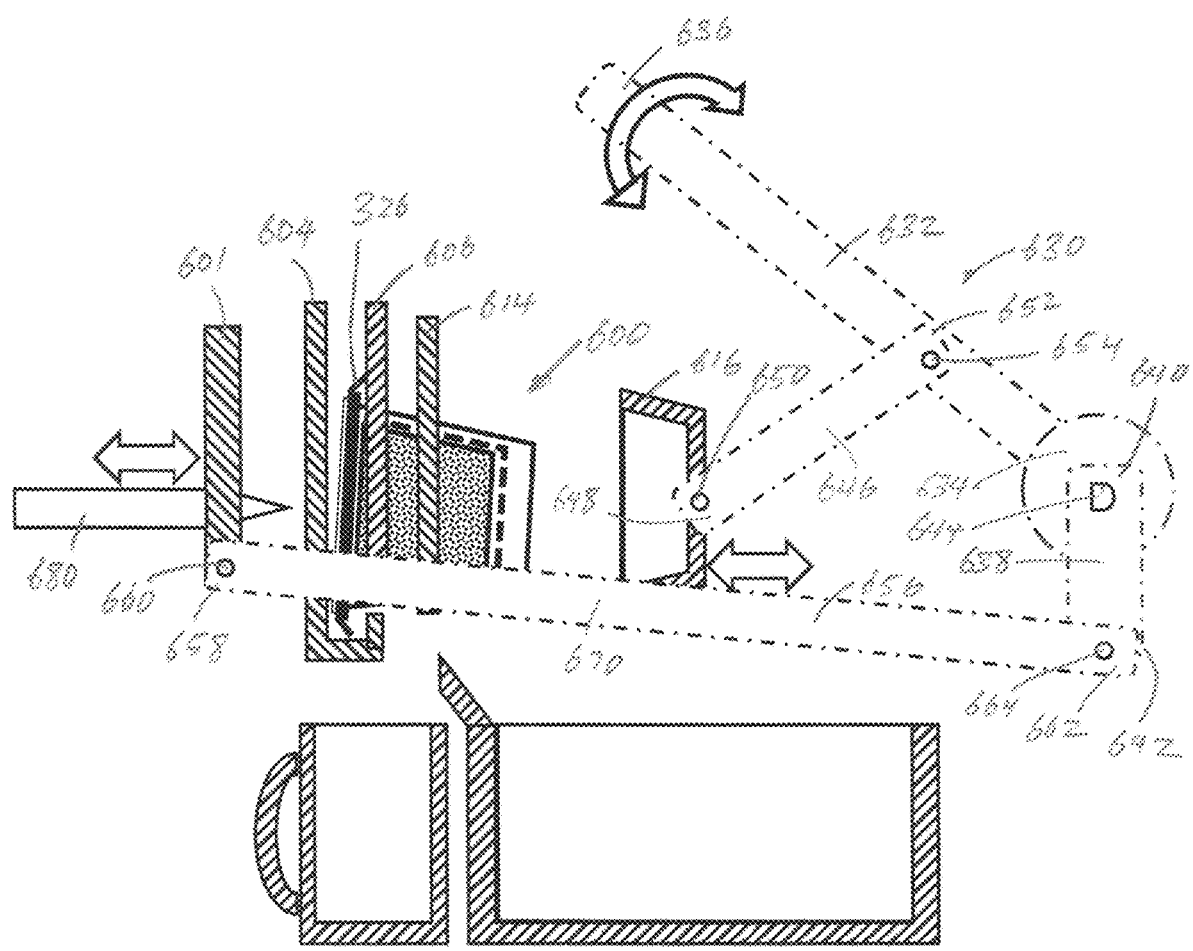
FIG. 11B illustrates an actuation mechanism of the brewing chamber.

FIG. 11B illustrates an actuation mechanism 630 represented as dotted-lines mechanically linked to the brewing chamber 600 and the cover 601 in an open position adapted to receive the pod 300 therein. The actuation mechanism 630 may include a handle 632 having a proximal end 634 and a distal end 636, and a leverage link 638 having a proximal end 640 and a distal end 642. The proximal ends 634 and 640 may be coupled together and adapted to rotate about a first axis 644 where rotation of the handle 632 may cause the leverage link 638 and the handle 632 to rotate about the first axis 636 in the same rotational direction. The actuation mechanism 630 may also include a second link 646 where a first end 648 may be pivotably coupled to the holder 616 about a second axis 650 and a second end 652 may be pivotably coupled to the handle about a third axis 654 located between the proximal end 634 and the distal end 636 of the handle 632. The actuation mechanism 630 may also include a third link 656 where a first end 658 may be pivotably coupled to the cover 601 about a fourth axis 660 and a second end 662 may be pivotably coupled to the distal end 642 of the leverage link 638 about a fifth axis 664. As discussed in more detail below, the bracket 604 may have an opening to allow the cover 601 to pass therethrough and the cover 601 may be sized to pass through the gate 606 to press the extension 326 against the clamps 614. Moreover, as discussed above in reference to FIG. 10B, the third links 656 may engage with the outer side 617 of the clamps 614 at location 670 such that the clamps 614 may contract and expand as the handle 632 closes and opens, respectively.

Figure 11C:
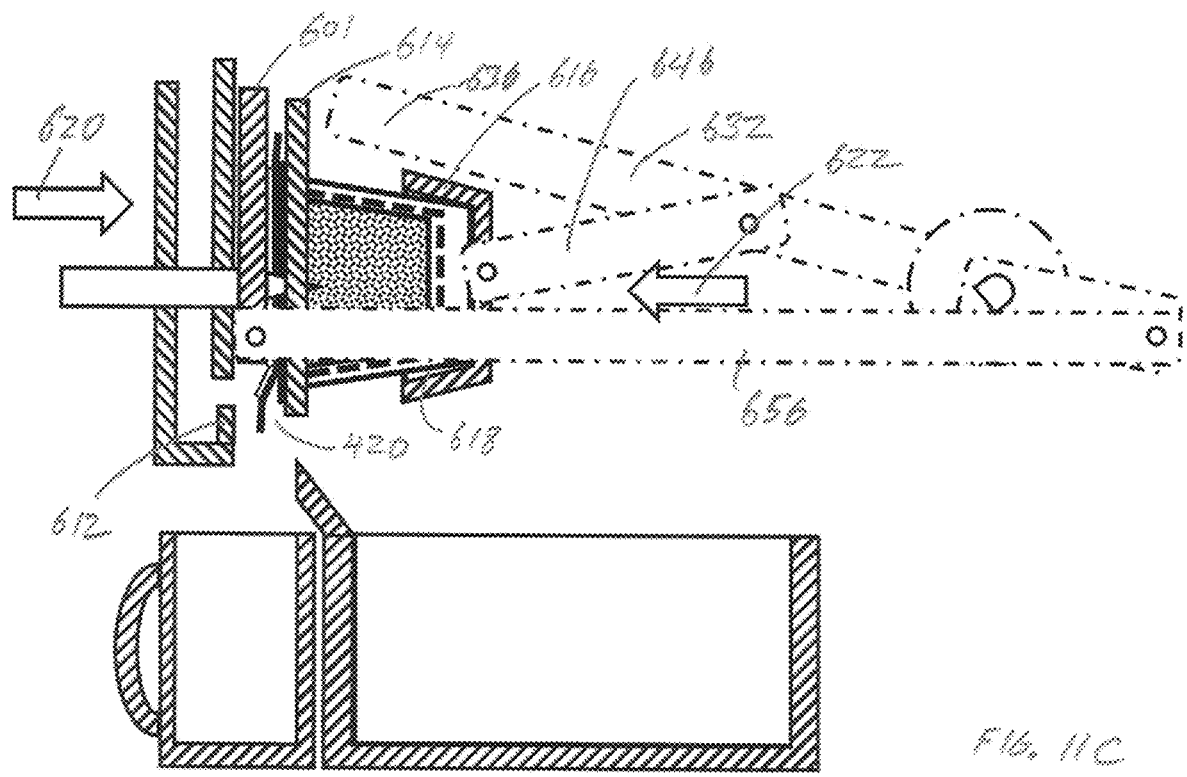
FIG. 11C illustrates the actuation mechanism in a closed position.

FIG. 11C illustrates the handle 632 in the closed position by rotating the handle in a counter-clockwise direction, which causes the second link 646 and the third link 656 to slide the holder 616 and the cover 601, respectively, toward each other as indicated by the direction arrows 620 and 622. In particular, as the cover 601 pushes the pod 300 towards the clamp 614, the bottom portion of the second extension 330 of the pod 300 may engage with the hook 612 such that as the extension 326 continues to move past the hook 612, the hook may peel or separate the bottom portion of the second extension 330 away from the rim 320 of the container 304. And as the second extension 330 further moves towards the clamp 614, the second extension 330 may bend and move over the hook 612 such that the second extension 330 may be displaced and located between the hook 612 and the clamp 614 to form the gap 420 between the first extension 328 and the rim 320 to drain the beverage formed within the pod. Moreover, as the handle 632 moves toward the closed position, the third link 656 may slide upwards relative to the clamps 614 causing the clamps 614 to contract thereby squeezing the second extension 330 and/or sidewall 318 of the pod 300 as illustrated below in reference to FIG. 10B. In addition, closing the handle 632 may cause the holder 616 to move towards the clamp 614 such that the recess 618 may engage with the sidewall 318 near the base 316 of the container 304 to properly align the pod 300 in a brewing orientation to allow the inlet piercing member 680 to pierce through the lid 314 in a consistent manner.

Figure 11D:
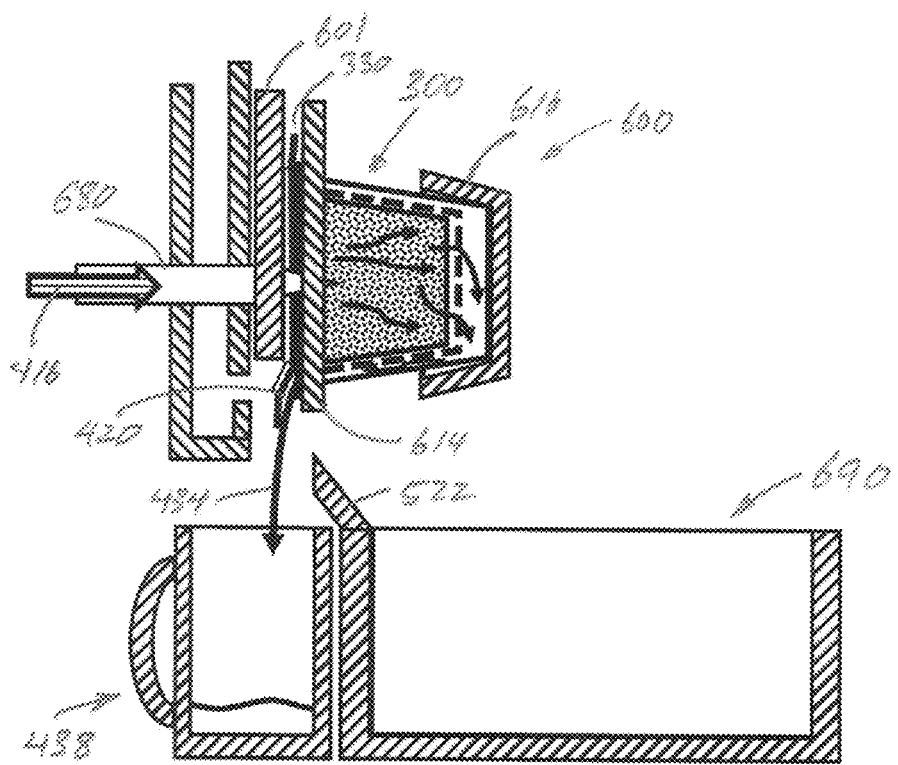
FIG. 11D shows brewing a beverage within the pod and draining the beverage formed within the pod into a mug without contaminating the beverage.

FIG. 11D shows the handle 632 and the brewing chamber 600 in the closed position without the actuation mechanism 630 to better illustrate brewing a beverage with the pod 300 without cross-contamination. As the handle 632 moves towards the closed position, the cover 601 and the holder 616 may move towards each other such that the holder 616 may align the pod 300 in the proper brewing orientation to allow the tip of the inlet piercing member 680 to pierce through the lid 314 in a straight manner to minimize the size of the pierced hole formed on the lid 314. And as the cover 601 further closes upon the pod 300, the second extension 330 and the rim 320 may abut against the clamp 614 to hold the pod 300 in its place along with the clamps 614.

Once the pod 300 is ready to brew a beverage within the brewing chamber 600, the inlet piercing member 680 may inject heated water 416 into the pod 300 and the beverage 434 may drain out of the gap 420 and pour into a mug 438 in a manner discussed above in reference to FIG. 8D. The waste bin 690 may have a ramp 522 adapted to engage with the pod 300 such that when the pod 300 is released by the brewing chamber 600, the ramp 522 may guide the pod 300 into the waste bin 690. The ramp 522 may be position underneath the brewing chamber 600 such that the ramp 522 may not interfere with the beverage 434 pouring into the mug 438 to prevent the waste bin 690 and the brewing chamber 600 from contaminating the beverage 434.

Figure 11E:
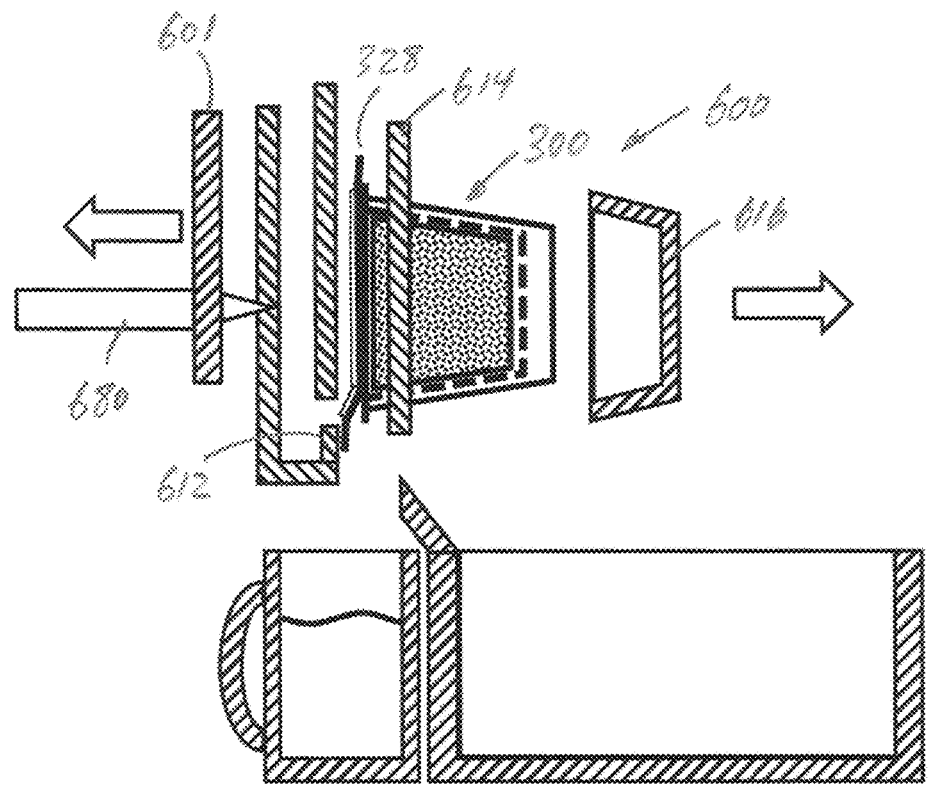
FIG. 11E shows the brewing chamber returning to the open position.
Figure 11F:
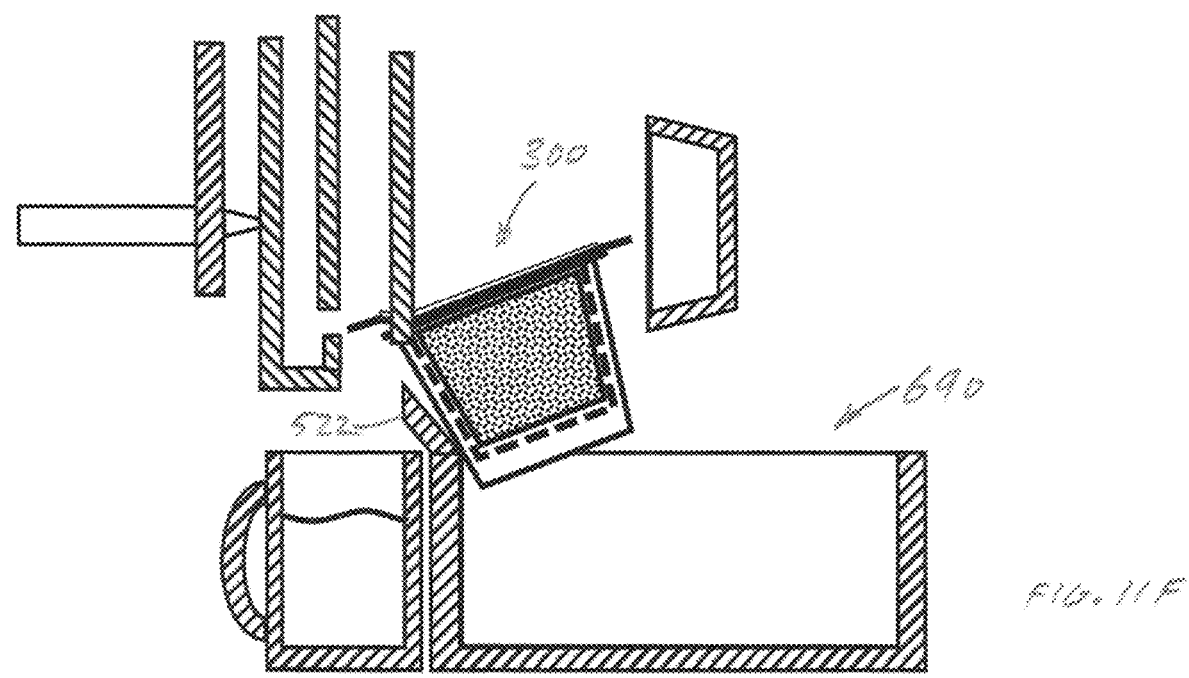
FIG. 11F shows the brewing chamber in the open position and releasing the pod.

FIG. 11E shows the brewing chamber 600 returning to the open position as illustrated in FIG. 10A after the brewing process has been completed with the pod 300 released from the clamp 614. As the holder 616 returns to the open position, in the event that the pod is engaged with the holder, the first extension may abut against the clamps 614 to dislodge the pod 300 from the holder 616. Moreover, as the cover 601 pushes the pod 300 against the clamps 614 as discussed above in reference to FIG. 11C, the second extension 330 may bend like a spring; however, after the brewing process is done and as the cover 601 and holder 616 move to the open position, the second extension 330 may return to its original shape by pushing away from the clamps 614 thereby assisting in dislodging the pod 300 from the clamp 614. In addition, the clamps 614 may release the pod 300 as the handle 632 moves to the open position; and as the cover 601 pulls away from the clamp 614, the tip of the inlet piercing member 680 may in some instances pull the pod 300 away from the clamp 614 as well. Under such circumstances, the bottom of the displaced second extension 330 may abut against the hook 612 and the rest of the extension 328 may push against the gate 606 to free the pod 300 thereby allowing the pod 300 to drop into the bin 690 guided by the slide 602 as illustrated in FIG. 11F.

Biodegadeable Pods:

The pods disclosed above may be able to drain the beverage via the gap formed between the lid and the rim rather than through a pierced hole on the base of the container. This may allow the pods to be more readily made from a biodegradable material compared to the traditional K-Cup pod for the following reasons. The traditional K-Cup pods need to meet several design criteria where some of the criteria are at odds with each other. For instance, the container needs to have a strong oxygen barrier to keep the ground coffee packed therein fresh. Moreover, the container needs to be rigid enough to be pierced by an outlet needle yet strong enough to withstand the pressure within the pod due to the heated water being injected into the pod during the brewing process. These design parameters may be at odds with each other where formulating a pod that is biodegradable may be challenging. For instance, some materials may be a good oxygen barrier but these same materials may not pierce or puncture consistently. That is, these materials may deform rather than puncture as the outlet needle is pressed thereupon the base of the container. Other material may pierce consistently but may not be sufficiently rigid to withstand the pressure during the brewing process.

As disclosed above, a pod may have a filter that has an extension that may peel away or separate from the rim of the container such the beverage may drain via a gap formed between the extension and the rim. That is, the design parameters of pod disclosed above may be less restrictive because the base of the container does not have to be pierced in order to drain the beverage. This less restrictive design requirement allows the pod to be more conducive to being formed from biodegradable materials. In general, biodegradable materials are made from plant-base materials like corn such that biodegradable material may be more malleable than the conventional multilayered material used to form the traditional K-Cup pod. These malleable materials may not pierce or puncture consistently and therefore may not be suitable for forming traditional K-Cup pods; however, for pods where there is no need for piercing, the container may be more readily formed from a biodegradable material such as with the pods 300 discussed above.

Brewing System:

FIG. 12A illustrates a single-serve brewing system 700 relative to the gravitational direction g configured to adjust the water temperature, brewing time, and beverage to water ratio to brew various beverages and provide the heated water at a relatively high pressure from about 7 to 15 bars to the brewing chamber 500 and 600 with a pod 300 therein, as discussed above in reference to FIGS. 9 and 10, respectively. The brewing system 700 may include a water tank 702 sized to hold water 704 therein, a pump 708 to provide the water from the water tank 702 to a heater 710 through a first tube 712 and a second tube 714. In addition, a flow meter 716 may be coupled to the first tube 712 to monitor the flow rate of water passing through the first tube when the pump 708 is activated to determine the amount of water that is provided from the water tank 702 to the heater 710 and a drain tube 756. The brewing system 700 may also include a first switch 730 coupled to the first tube 712 between the pump 708 and the heater 710 configured to route the flow of the water 704 from the water tank 702 to either the heater 710 or to a third tube 706 that bypasses the heater and directs the water 704 to a second switch 732. The second switch 732 may also be fluidly coupled to the second tube 714 and the third tube 706 to direct the flow of the fluid from either tube 714 or tube 706 to either the brewing chamber 600 or to the drain tube 756. Note a three-way valve may be provided to have the two tubes 714 and 706 to fluidly couple to one end and have the opposite end fluidly couple to the second switch 732. In particular, the first switch 730 may have a valve that directs the water 704 to either a first direction towards the heater 710 as indicated by the direction arrow 734 or a second direction towards the third tube 706 as indicated by the direction arrow 736; and the second switch 732 may have a valve that directs the water 704 from the tubes 706 and 714 to either a first direction towards the brewing chamber 600 as indicated by the direction arrow 738 or a second direction towards the drain tube 756 as indicated by the direction arrow 740.

The brewing system 700 may also include an air pump 722 fluidly coupled to the third tube 706 between the first and second switches 730 and 732 with a first one-way valve 711 between the air pump 722 and the third tube 706. In general, one-way valves generally allow the water to flow in one direction as indicated by the direction arrow but not in the opposite direction. Once the air pump 722 is activated, the air from the air pump 722 may purge the remaining beverage within the pod. With the air pump coupled to the third tube 706, the air pump 722 may avoid being subject to high pressure from the pump 708. When the first switch 730 is in the first position, the water may be directed to the heater 710 such that the air pump 722 may not be subject to the high pressure from the pump 708; as discussed in more detail below, when the first switch 730 is in the second position 736, the water bypasses the heater 710 and the second switch 732 may be in the second position 740 as well such that the room temperature water may be directed to the drain tube 756, which may be open to the atmosphere such that the high water pressure from the air pump 722 may be released to the atmosphere so that the air pump 722 may not be subject to the high pressure from the pump 708. The heater 710 may be one of a variety of heating system such as a tube heater where a electrical resistance member heats the water flowing through a coil tube or sealed boiler with a heating element inside. The brewing chamber 600 may also include the cover 601 with the inlet piercing member 680 protruding therefrom, the holder 616, and the hook 612 as discussed above in references to FIGS. 9 through 11. The second tube and the third tubes 714 and 706 may have a second one-way valve 713 and a third one-way valve 715, respectively, juxtaposed to the second switch 732.

The brewing system 700 may also include a tray 782 adapted to support a mug 438 underneath the brewing chamber 600 to receive the beverage pouring from the pod. The tray 782 may also collect the beverage droppings, if any, from the pod 300 after the mug 438 has been removed from the tray 782. The tray 782 may also have a heating mechanism 784 to heat the beverage within the mug 438. For instance, the heating mechanism 784 may be an induction heating mechanism configured to work with the mug 438 having an iron or stainless base 786. That is, the heating mechanism 784 may be an electromagnetic coil to generate fluctuating magnetic field that does not generate heat on the burner itself without the mug 438. Instead, once the mug 438 is placed over the tray 782, the magnetic field may induce electric currents in the iron base 786 where much of the electrical energy is converted to heat. Once the mug is removed from the tray 782, the burner may cool quickly. The mug 438 may have a first sensor 788 and the tray 782 may have a contact 790. The base 792 of the mug 438 may be configured such that once the mug 438 is placed on the tray 782, the first sensor 788 may electrically couple to the contact 790 to communicate the temperature data to the brewing system 700. The first sensor 788 may be a temperature sensor to determine the temperature of the beverage within the mug 438, and this information may be transmitted to the contact 790 so that the brewing system 700 may turn off the power to the heating mechanism once the beverage within the mug has reached a desired temperature. Note that a variety of temperature sensing mechanisms may be used to measure the temperature of the beverage such as resistance temperature detectors, thermocouples, thermistors, infrared sensors, or semiconductor sensors.

The pump 708 may be a high-pressure pump to provide the water from the water tank 702 to a heater 710 or the third tube 706 at a pressure from about 7 to 15 bars and up to 25 bars depending on the type of pump that is utilized. The heater 710 may be located between the first and second tubes 712 and 714. If the first switch 730 is routing the water 704 in the first direction 734, then as the pump 708 is activated, the room temperature water from the water tank 702 may first flow through the first tube 712 and pass through the flow meter 716, the pump 708, and then into the heater 710; and then the heated water from the heater 710 may exit through the second tube 714 and flow to the second switch 732. If the second switch 732 is routing the heated water to the first direction 738, then the heated water may be injected into the brewing chamber 600; on the other hand, if the second switch 732 is routing the heated water to the second direction 740, then the heated water may drain from the drain tube 756, and pour into the mug 438. If the first switch 730 is routing the room temperature water 704 in the second direction 736, then as the pump 708 is activated, the room temperature water may bypass the heater and flow through the third tube 706 and flow to the second switch 732; and in general, if the first switch is routing in the second direction 736, then the second switch 732 may route the room temperature water in the second direction 740 as well to drain the room temperature water from the drain tube 756, and pour into the mug 438.

In particular, the heater 710 may be a variety of different types of heaters such as a tube heater form from a coiled tube with a heating element encased within a aluminum block to minimize the space it occupies within the brewer. The heating element's capacity may be about 1,200 Watt to about 1,800 Watt capable of heating about 8 oz of water from the first tube heater 710 at room temperature of about 14° C. to about 25° C. (about 59° F. to about 77° F.) to an outlet temperature of about 88° C. to about 93° C. (190° F. to about 199° F.) passing through the tube heater 710 in about 20 to 55 seconds. The heater 710 may include a first temperature sensor 752 to monitor the temperature of the aluminum thermal block of the tube heater 710. The brewing system 700 may also include a second temperature sensor 753 coupled adjacent to the second tube 714 to measure the temperature of the water exiting the tube heater 710. As discussed in more detail below, the temperature of the heated water exiting the tube heater 710 may be controlled and adjusted based on the measured temperatures from the first and second temperature sensors 752 and 753. Along with the heaters discussed above, it is within the scope of the invention to utilize a variety of heating mechanisms known to one skilled in the art to provide heated water at the desired brewing temperature and time such as a glass tube heater.

The pump 708 may be a high-pressure pump such as an AC solenoid pump generally known to one skilled in the art to generate the necessary pressure to work with both high and low pressure pods as discussed above to brew high pressure beverages like espresso and low pressure beverages like American coffee. Note that AC pumps generally pump water at a substantially constant flow rate such that the amount of water being pumped by the AC pump may be estimated based on the period that the AC pump has been activated. That is, the amount of water being pumped into the pod may be estimated based on the duration of the time that the AC pump has been activated such that the flow meter 716 may not be necessary to keep track of the amount of water flowing through the first tube 712. However, if design parameters require an accurate determination of the flow rate of the water, then the brewing system 700 may utilize the flow meter 716.

The brewing system 700 may utilize an AC pump or a DC pump. If an AC pump is utilized then the temperature of the heated water may be adjusted by controlling the power provided by the tube heater 710 and the AC pump 708. For instance, the brewing system 700 may be initially predetermined to work with a low pressure pod to brew 6 oz of the coffee at a brewing temperature and time of 190° F. in about 60 seconds; and with the tube heater 710 and the AC pump 708 being powered on throughout the duration of the brewing time. This means that the standard flow rate of the AC pump 708 is about 6 oz÷60 seconds or 0.1 oz/second under the predetermined brewing conditions described above, and the heating element within the heater 710 may generate enough heat or energy measured in Joules to heat the room temperature water passing through the tube heater 710 at about 0.1 oz/second to the desired brewing temperature of 190° F. measured by the second temperature sensor 753. Note that a variety of heating mechanisms may be utilized in the brewing system 700 such as a boiler utilized in the Keurig Brewing System and a Thick Film Flow Through Heater model number FTH-mk2 by Ferro Techniek from the Netherlands, which is designed to heat water quickly and at high pressure. In addition, the high-pressure pump may be a DC pump that can vary the flow rate of the water at high pressure by Midea Electrical Heating Appliances Mfg. Co., Ltd., from Foshan, Guangdong, China.

The heating parameters discussed above may be used as a bench mark to adjust the brewing temperature and time to brew a variety of beverages having different brewing temperatures and time parameters. For example, to brew a single shot of espresso or about 1 oz of beverage, the brewing temperature and time parameters may be set at 190° F. and about 30 seconds, respectively; and under such parameters, the tube heater 710 and the pump 708 may be powered ON throughout the brewing time since the grind size and the density of the ingredient packed within the pod may resist the flow of the heated water through rate of about 0.33 oz/second so that about 1.0 oz of water will flow through the tube heater 710 in about 30 seconds, which allows the room temperature water to be heated to about 190° F. However, note that due to resistance to flow of water through the compact beverage ingredient and the holes 336B on the base 322B of the filter 306B, as discussed above in reference to FIG. 5D, the actual brewing time may vary. As another example, if the brewing temperature and time to brew a single shot of espresso is alternatively set at 190° F. and about 15 seconds, respectively, then the pump 708 may be initially power ON for about 2 second to pre-infuse about 0.2 oz of the heated water to the beverage ingredient and wait about 5 seconds before being power on again for another 8 seconds to pump the remaining 0.8 oz of heated water into the high pressure pod. Note that pre-infusion or pre-wetting the beverage ingredient with delay may allow the flavors to be extracted more evenly during the rest of the brewing process.

During the brewing process, the first and second temperature sensors 752 and 753 may monitor the temperatures of the heater 710 and the exit water temperature, respectively, and if the one or more of the measured temperatures is/are above the threshold temperatures or if the rate of measured temperature rise is/are above the threshold rate, then the power to the tube heater 710 may be turned off to maintain the water temperature measured by the second temperature sensor 753 within a desired temperature range. Moreover, the first and second temperature sensors 752 and 753 may continue to monitor the temperatures of the tube heater 710 and the exit water temperature, respectively, and if the one or more of the measured temperatures fall below the threshold temperatures or if the rate of measured temperatures fall below the threshold rate, then the power to the heater 710 may be turned ON to maintain the water temperature measured by the second temperature sensor 753 within a desired temperature range. In addition, the amount of water being pumped through the heater 710 may be varied to control the water temperature and the brewing time by turning the power to the pump 708 ON and OFF during the brewing process. For instance, the power to the pump 708 may cycle ON and OFF every 2 seconds such that the flow rate of the pump 708 may be reduced to 0.033 oz/second compared to the standard flow rate of 0.1 oz/second. The slower flow rate may allow the water passing through the heater 710 to absorb more energy thus allowing the water to get hotter, if desired, and extend the brewing time. Alternatively, the power to the heater 710 and the pump 708 may be powered ON and OFF independently or concurrently to adjust the water temperature exiting the tube heater 710 and the brewing time. Also, if a DC high pressure pump is used, then the flow rate of the water may be varied accordingly. This allows the brewing system 700 to provide water at high pressure to work with both low and high pressure pods to brew a variety of beverages by adjusting the brewing temperature and time appropriate for the beverage. Once the brewing process is finished, the air pump 722 may be turned ON to inject atmospheric air through the tube heater 710 such that the remaining water within the heater 710 may be purged along with the remaining beverage within the pod. In addition, the air pressure provided by the air pump may ensure that the pressure within the cavity 362B of the pod 300B is generally greater than the pressure within the first chamber 364B so that the water generally flows from the cavity 362B towards the first chamber 364B and substantially prevents the water to flow back into the cavity 362B to substantially prevent the tip 410 of the inlet piercing member 408 from being contaminated by the beverage formed within the first chamber 364B.

As another alternative, the brewing system 700 may utilize a low pressure pump to provide the water 704 from the water tank 702 to a heater 710 at a relatively low pressure of about 1 to 4 bars to work with the low pressure pods discussed above. In general, low pressure pumps are DC pumps where the speed of the pump may be varied to vary the flow rate of the water passing through the pump by varying the voltage supplied to the pump. Accordingly, the power to the tube heater 710 may be powered ON and OFF and the voltage to the DC pump may be varied to adjust the water temperature exiting the heater 710 and the brewing time. This allows the brewing system 700 to provide water at low pressure to work with low pressure pods to brew a variety of beverages by adjusting the brewing temperature and time appropriate for the beverage. That is, besides varying the temperature of the heated water, the brewing system may vary the brewing time by controlling the air pump 722 as discussed above. With the heater 710 being able to vary the brewing water temperatures and time, a variety of beverages may be brewed such as coffee, tea, iced beverages, and baby milk, as discussed above in reference to FIG. 8.

Table 2 below provides different brewing parameters that may be utilized depending on the type of pod and the type of beverage selected by the user.

TABLE 2

| OPTIONS | Low Pressure POD | | | High Pressure POD |
| --- | --- | --- | --- | --- |
| | Coffee | Tea | Milk | Espresso |
| Regular | 10 oz (size) | 8 oz | 3-5 oz | 1 oz |
| | 60 sec (time) | 60 sec | 30-60 sec | 30 sec |
| | 190 F. (temp) | 180 F. | 115 F. | 190 F. |
| Strong | 8 oz | 8 oz | | |
| | 90 sec | 90 sec | | |
| | 190 F. | 190 F. | | |
| Smooth | 10 oz | 8 oz | | |
| | 120 sec | 120 sec | | |
| | 160 F. | 160 F. | | |
| Reduced Caffeine | 8 oz | 8 oz | | |
| | 90 sec | 90 sec | | |
| | 140 F. | 140 F. | | |
| Iced | 6 oz | 6 oz | | |
| | 150 sec | 90 sec | | |
| | 130 F. | 130 F. | | |
| Cold Brew | 8 oz | 8 oz | | |
| | 480 sec | 480 sec | | |
| | 120 F. | 120 F. | | |

For instance, if the reader 516 detects that the pod received within the brewing chamber 500 is a low pressure pod 300 packed with coffee ingredient, in reference to FIG. 9, the brewing system 700 may provide on the control panel the following beverage options: regular, strong, smooth, reduced caffeine, iced, and cold brew as options to be selected by the user. If the user selects iced coffee as the desired beverage, then the brewing system 700 may provide about 6 oz of heated water to the inlet piercing member 680 at about 130° F. for about 150 seconds or 2.5 minutes of brewing time, as described in more detail below. As another example, if the reader 516 detects that the OID in the lid 314 of the pod 300 is packed with fine coffee grounds to brew espresso, then the brewing system 700 may provide about 1 oz of heated water to the inlet piercing member 680 at about 190° F. for about 30 seconds or about 0.5 minute of brewing time, and the heated water may be provided at the high pressure of between 7 bars and 19 bars.

Depending on the ingredient packed within the pods, the brewing system 700 may or may not request from the user the desired serving size of the beverage. For instance, there may be certain pods where the serving size may be predetermined based on the amount of ingredient contained therein such as baby milk; and for these pods, the brewing system 700 may proceed with brewing the beverage without querying the user for the serving size. That is, for pods containing milk powder, the amount of the powder contained therein may dictate the serving size in order to maintain a desired concentration of nutrients in the brewed beverage.

Figure 12C:
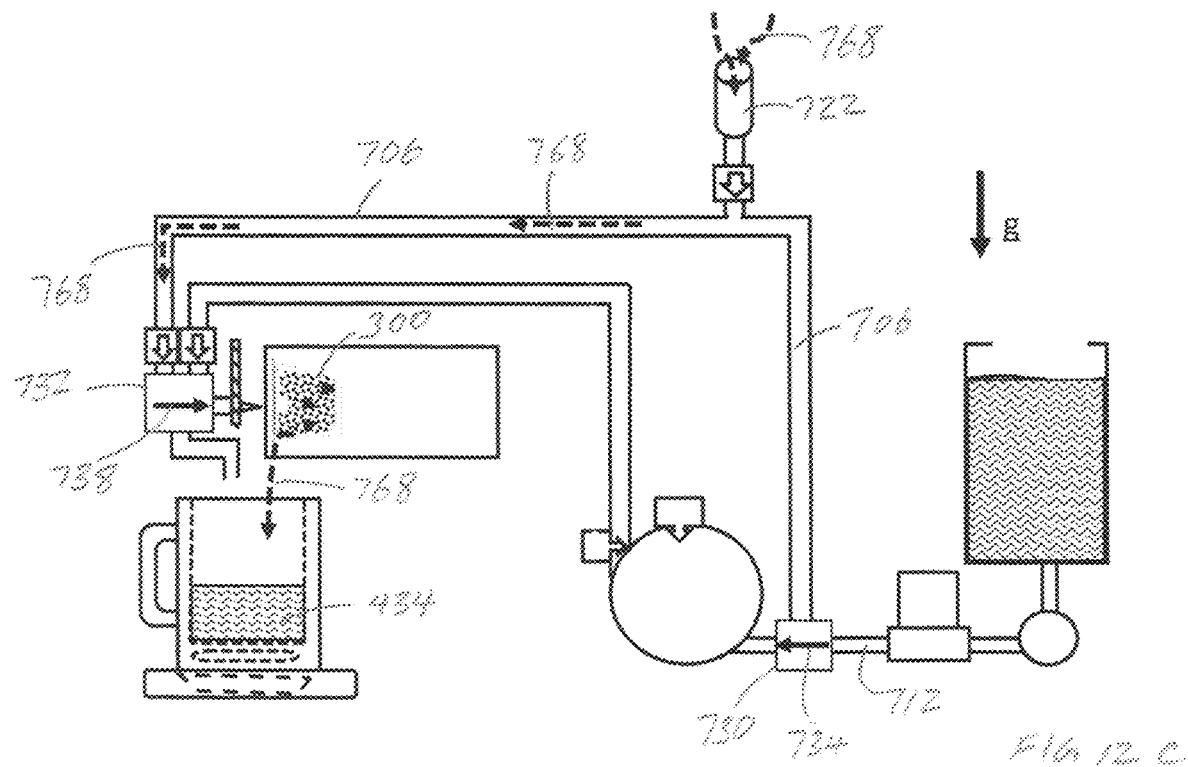
FIG. 12C illustrates purging the remaining beverage within the pod.
Figure 12D:
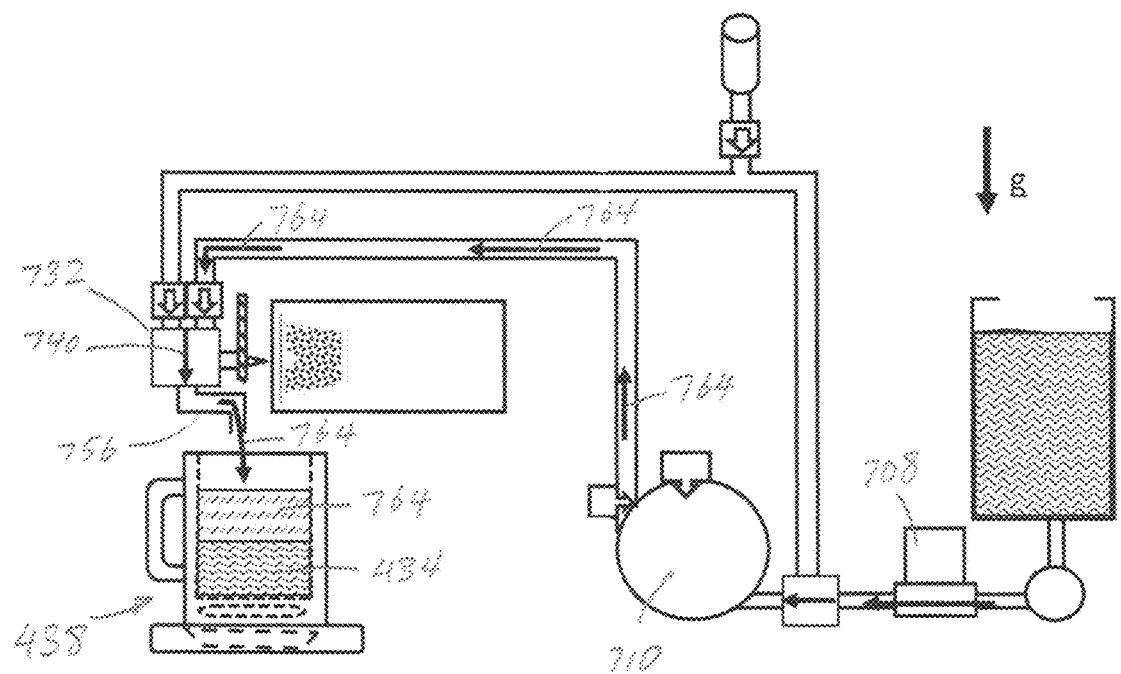
FIG. 12D illustrates bypassing the brewing chamber to direct heated water to the mug.

FIGS. 12B, 12C, and 12D illustrate the brewing system 700 utilizing the first and second switches 730 and 732 to brew a smoother tasting coffee. FIG. 12B shows that during the initial brewing process, the first and second switches 730 and 732 may be in the first positions 734 and 738, respectively. This allows the first switch 730 to direct the room temperature water 704 from the water tank 702 to the heater 710 to heat the water, and the heated water 764 flows to the second switch 732 which directs the heated water 764 to the brewing chamber 600 where it is injected into the pod 300 to brew a beverage 434 that pours into the mug 438. In reference to the discussion related to FIG. 2 and Table 1, the desirable flavors may be extracted within the first 4 oz, and some of the unpleasant flavors may be extracted thereafter. According to Table 1, the combined TDS from the first 4 oz of brewed coffee from a K-Cup may be about 1.32, which represents about 70% of the TDS in comparison to a 12 oz brewed coffee. Accordingly, the brewing system 700 may brew a predetermined amount of beverage to extract the desired flavors depending on the desired taste such as 4 oz and the pump 708 may stop.

FIG. 12C illustrates that after the predetermined amount of beverage has been brewed to extract the desired flavors, the pump 708 may be stopped; and thereafter, the air pump 722 may be activated to pump air 768 into the pod 300 to purge the remaining beverage within the pod 300. Note that the first switch 730 may be in the first direction 734 such that the air pumped into the third tube 706 may be blocked by the first switch 730 from flowing through the first tube 712. The purging process may provide higher pressure within the cavity 362B of the pod 300B which may be greater than the pressure within the first chamber 364B so that the remaining beverage within the pod 300 may be substantially prevented from flowing towards the cavity 362B thereby substantially preventing the inlet piercing member 408 from being contaminated by the beverage formed within the first chamber 364B.

FIG. 12D illustrates that after the purging process is completed, the second switch 732 may move to the second position 740 to direct the heated water 764 from the heater 710 towards the drain tube 756 and pour into the mug 438. That is, the pump 708 may be activated again, and the heated water 764 from the heater 710 may bypass the brewing chamber 600 and pour directly into the mug 438 such that the combined beverage within the mug 438 may be a ratio of the beverage 434 and heated water 764. The second portion of the heated water 764 may bypass the pod 300 so that the undesirable flavors such as bitterness and astringency may remain within the pod 300 rather than being extracted and poured into the mug 438 as part of the beverage 434. The ratio may be varied to brew a desired flavored beverage to satisfy the personal taste preferences.

Figure 12E:
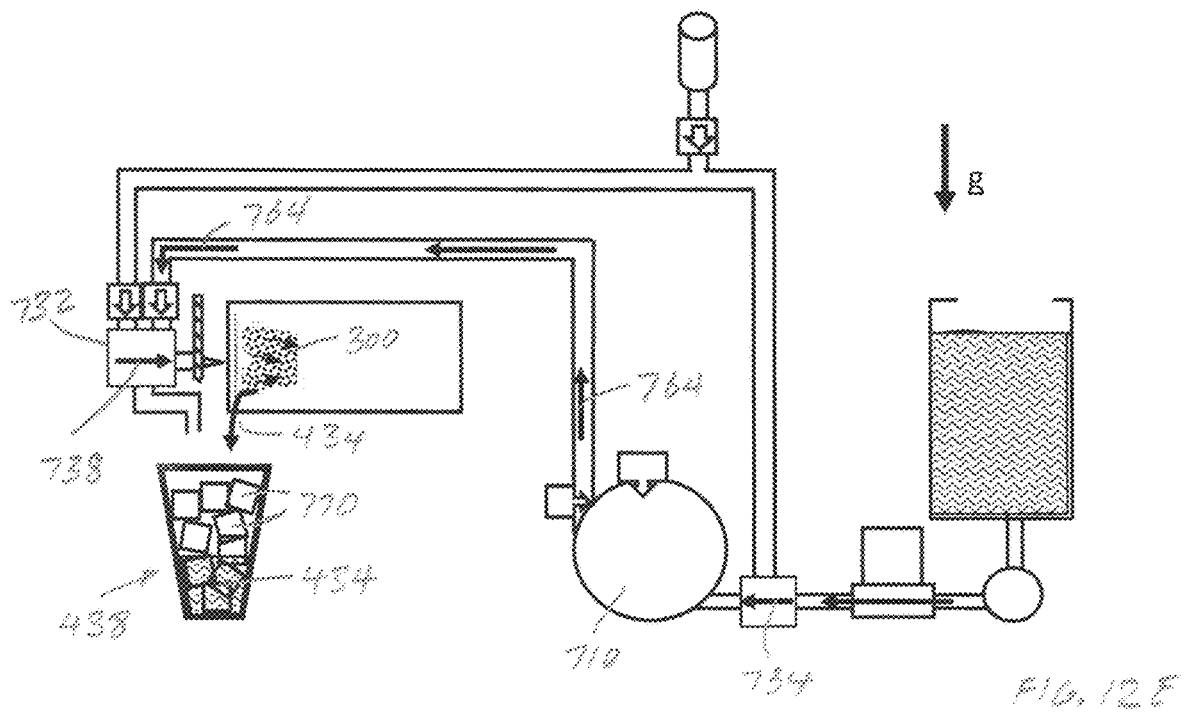
FIG. 12E illustrates the brewing system directing heated water to the brewing chamber to brew a beverage.
Figure 12F:
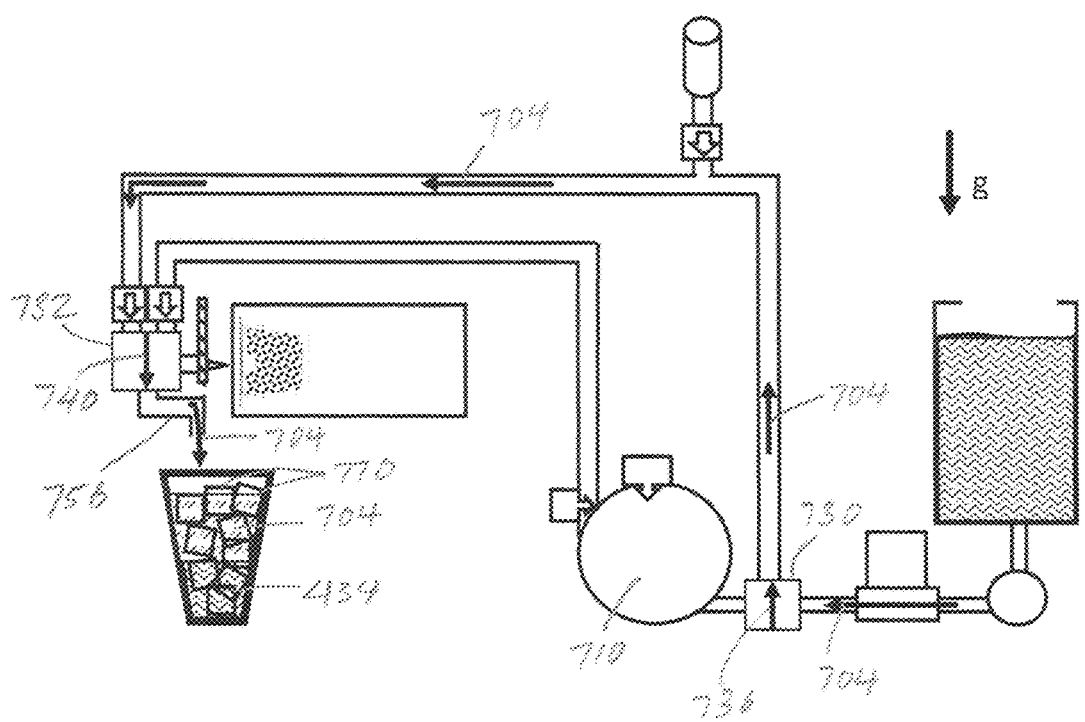
FIG. 12F illustrates directing water to bypass the heater and the brewing chamber and pour into the mug.

FIGS. 12E and 12F illustrate that a stronger iced beverage may be brewed by utilizing the first and second switches 730 and 732. In this example, the mug 438 may be placed underneath the brewing chamber 600 with the mug 438 filled with ice cubes 770 to brew a cold beverage. FIG. 12E shows that the brewing system 700 may be utilized to brew the initial beverage in a manner discussed above in reference to FIG. 12B such as brewing a predetermined amount of beverage to extract the desired flavors depending on the desired taste such as 4 oz of coffee followed by a purging process, as discussed above in reference to FIG. 12C. Brewing a small amount of beverage such as 4 oz may minimize melting the ice cubes 770 due to the hot beverage thereby minimizing diluting or weakening the strength of the beverage. Moreover, by minimizing the melting of the ice cubes, more ice cubes may be available to keep the beverage colder and for a longer period of time.

After the predetermined amount of beverage 434 has been poured into the mug 438, FIG. 12A shows that the first and second switches 730A and 732A may be in the second positions 736 and 740, respectively, such that the water 704 from the water tank 702 may bypass the heater 710 and flow towards the second switch 732, which directs the unheated water 764 towards the drain tube 756 and into the mug 438 bypassing the brewing chamber 600. The unheated water 764 may minimize melting of the ice cubes 770 compared to the heated water where melting ice cubes can weaken the taste of iced beverage.

Figure 12G:
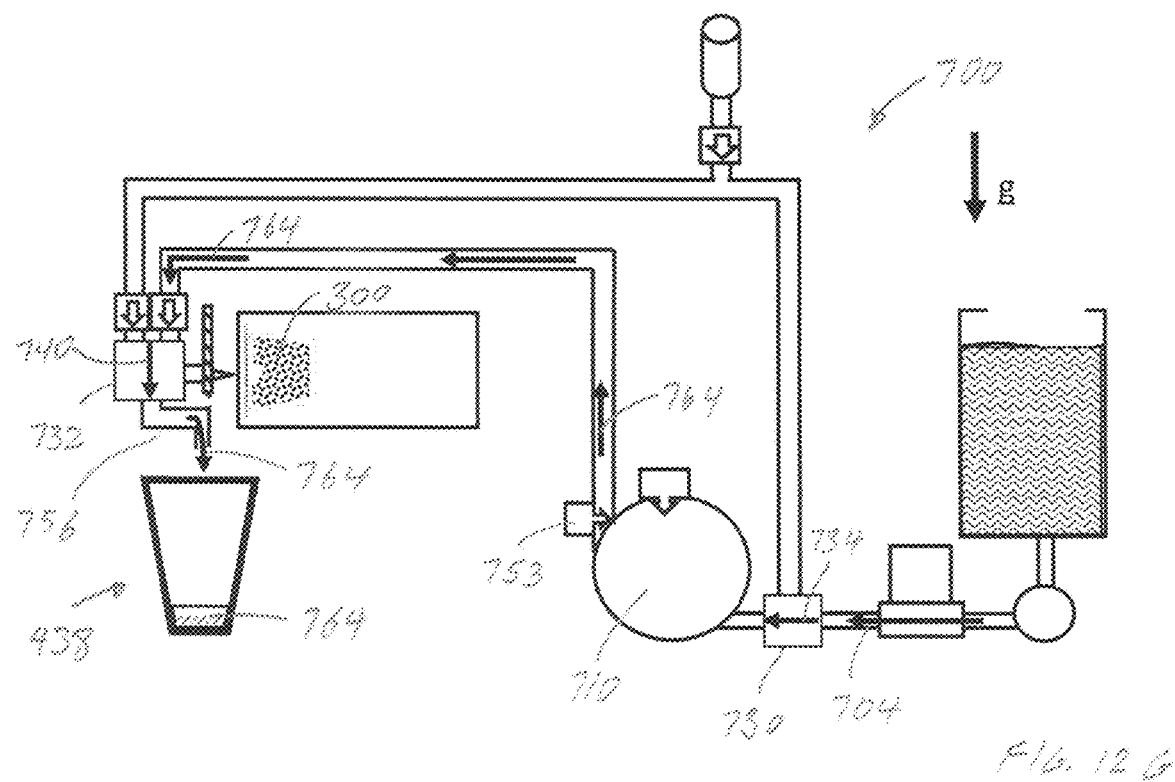
FIG. 12G illustrates cooling the heater and directing the heated water to bypass the brewing chamber and pour into a mug.
Figure 12H:
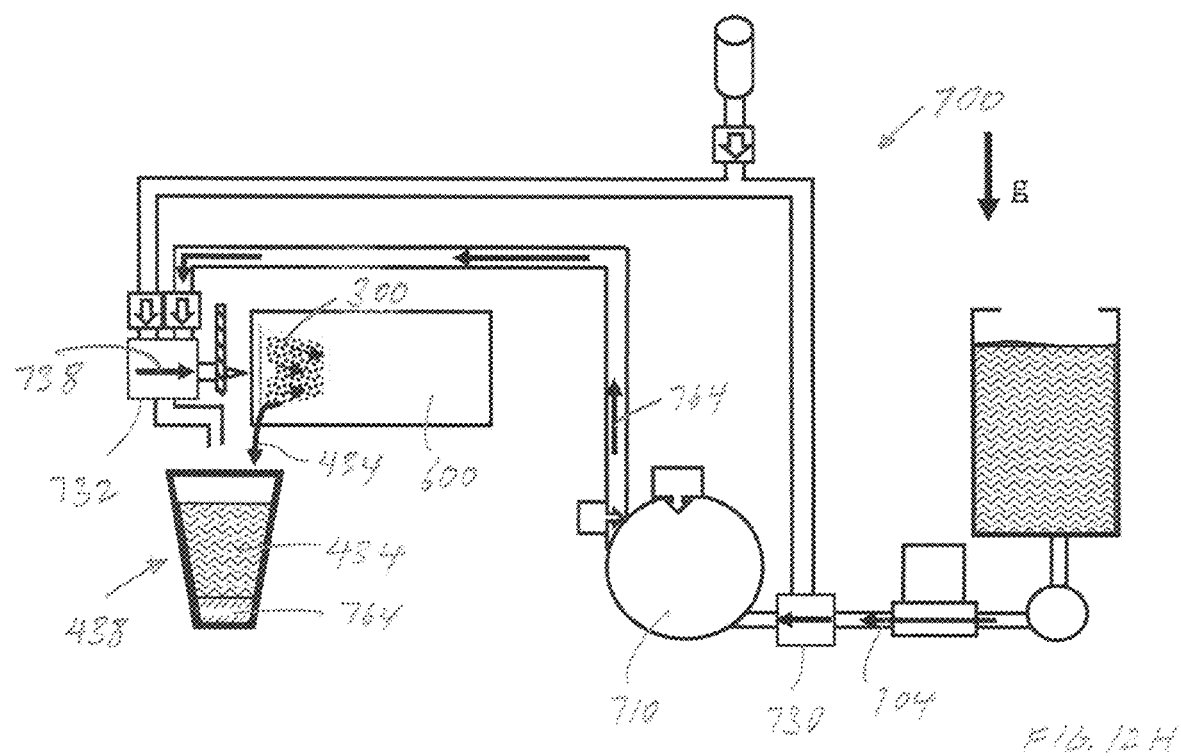
FIG. 12H illustrates directing warm water to the brewing chamber to brew low temperature beverage.

FIGS. 12G and 12H illustrate cooling the heater 710 to brew a lower temperature beverage such as baby milk and cold brew coffee. The brewing system 700 may be utilized to brew certain lower temperature beverages such as baby milk brewed at lower temperatures from about 100F to about 115F since babies may be sensitive to milk temperatures above 115F; and coffee beverages such as cold brew coffee may need to be brewed from about 120F to about 140F to extract the smoother flavors and not the bitter flavors from the coffee ingredient 310. And if the brewing system 700 needs to brew a lower temperature beverage shortly after brewing a hotter beverage at about 190 F or greater, then the heater 710 may be too hot even without the power provided to the heater 710 to heat the room temperature water within the desired lower temperature range or below 130F. Alternatively, the brewing system 700 will wait until the heater 710 is cooled down to brew the lower temperature beverage but it could take about 10 minutes or more to cool the heater 710 down before being able to brew a lower temperature beverage, which may be inconvenient for the user.

For instance, if cold brew beverage is desired by the user shortly after a hot beverage has been brewed by the brewing system 700, FIG. 12G illustrates that if the heater 710 is too hot, due to brewing a hot beverage recently, to pump the water 704 therethrough to heat the water 704 within the desired lower temperature range from about 100F to about 140F, then the first switch 730 may be in the first direction 734, and the second switch 732 may be in the second direction 740. This allows the first switch 730 to direct the room temperature water 704 to the heater 710 without powering ON the heater 710 so that the water 704 may cool the heater 710 faster until the temperature of the heated water 764 exiting the heater 710 is within the desired lower temperature range as measured by the second temperature sensor 753; and the second switch 732 may direct the heated water 764 to the drain tube 756 and pour into the mug 438 so that the hotter water may not extract the bitter flavors from the beverage ingredient packed within the pod 300. For example, about 2 oz of room temperature water may need to be directed into the hot heater 710 to cool the heater 710 sufficiently to heat the water 704 within the lower temperature range. This may depend on the efficiency of the heater 710.

FIG. 12H illustrates that once the heater 710 has cooled to heat the water 704 within the desired lower temperature range, then the second switch 732 may be in the first direction 738 and the heater 710 may be powered ON when necessary to maintain the desired lower temperature range, and the second switch 732 may direct the lower temperature water 764 to the pod 300 to brew the lower temperature beverage 434 and pour the beverage 434 into the mug 438. For cold brew, the brewing time may be about 8 minutes and the serving size may be about 8 oz such that the microcontroller (MCU) may control the pump 708 and the heater 710 to provide about 6 oz of the lower temperature water 764 to the pod 300 over the 8 minutes of brewing time assuming 2 oz of heated water 764 has been poured into the same mug 438 for the reasons discussed above in reference to FIG. 12G.

FIGS. 13A through 13F illustrates an alternative single-serve brewing system 700A relative to the gravitational direction g configured to adjust the water temperature, brewing time, and beverage to water ratio to brew various beverages. The brewing system 700A may be similar to the brewing system 700 where the same components have been labeled with the same reference numeral with the extension "A" to differentiate the two different brewing systems 700A from 700. In this embodiment, the distal end 707A of the second tube 706A may be fluidly coupled to the first tube 714A between the heater 710A and the second switch 732A; and the air pump 722A may be coupled to the first tube 714A between the second switch 732A and the brewing chamber 600 such that the air pump 722A may be juxtaposed to the brewing chamber 600. Having the air pump 722A be closer to the brewing chamber 600 may minimize the resistance posed by the brewing system 700A due to the length of the second tube 706, and the second switch 732 being in between the air pump 722 and the brewing chamber 600. With the air pump 722A located closer and in direct fluid communication with the brewing chamber 600 relative to the air pump 722 of FIG. 12A, the air pressure provided by the air pump 722A to the brewing chamber 600 may be maximized to more efficiently purge the remaining beverage within the pod 300.

Figure 13A:
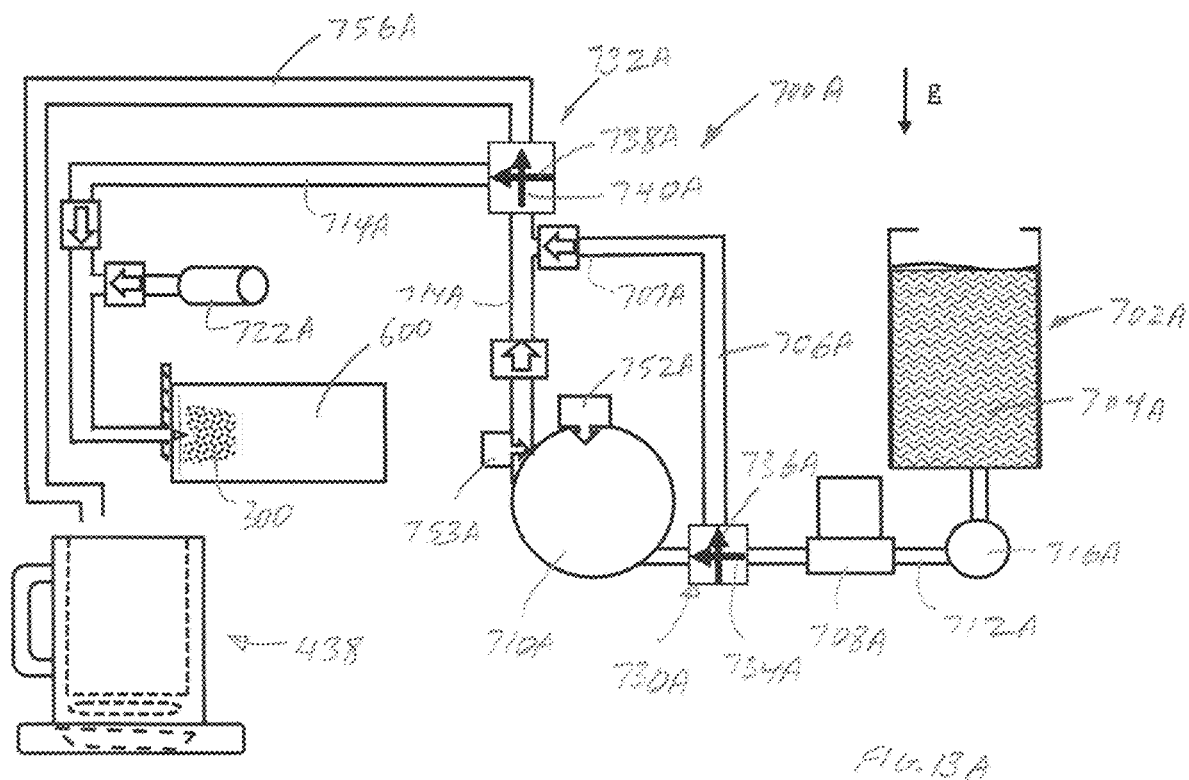
FIG. 13A illustrates another alternative embodiment of a brewing system.
Figure 13B:
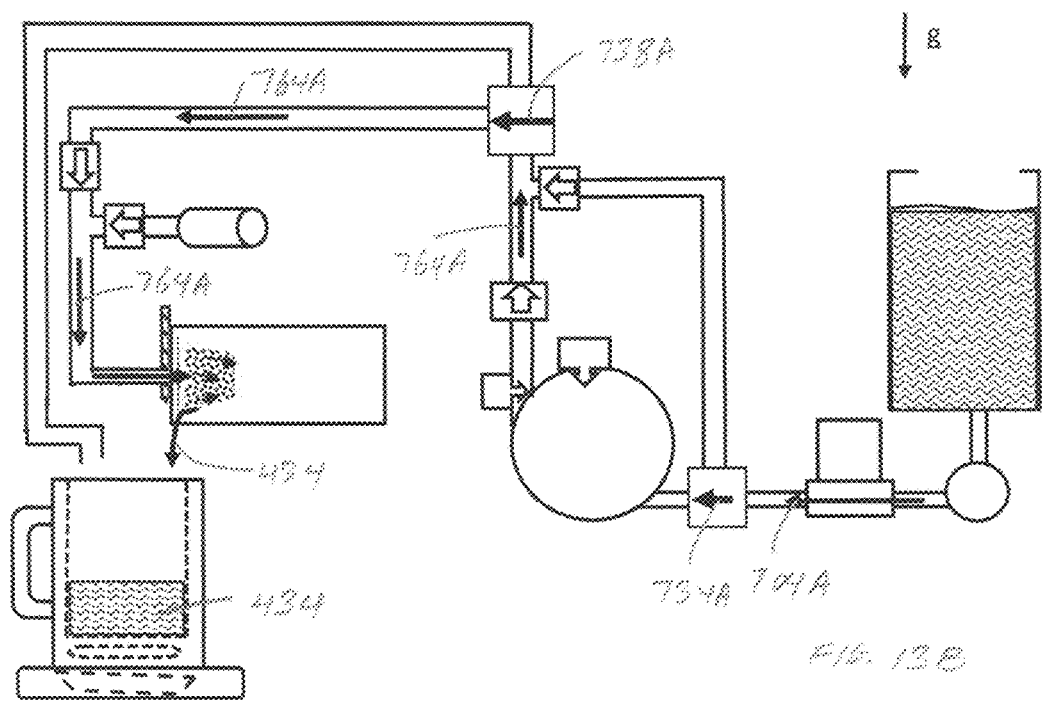
FIG. 13B illustrates directing the heated water to the brewing chamber to brew a beverage.

FIGS. 13B, 13, and 13D illustrate the brewing system 700A utilizing the first and second switches 730A and 732A to brew a smoother tasting coffee. FIG. 13B shows that during the initial brewing process, the first and second switches 730A and 732A may be in the first positions 734A and 738A, respectively. This allows the water 704A from the water tank 702A to flow through the heater 710A and via the second tube 714A the heated water 764A may flow into the pod 300 within the brewing chamber 600; and the beverage 434 may drain into the mug 438. FIG. 13C illustrates that after the predetermined amount of beverage has been brewed to extract the desired flavors, the pump 708A may be stopped; and thereafter, the air pump 722A may be activated to pump air 768A into the pod 300 to purge the remaining beverage within the pod 300. FIG. 13D illustrates that after the purging process is completed, the second switch 732A may be in the second position 740A to direct the heated water 764A from the second tube 714A to the drain tube 756A. The pump 708A may be activated again, and the heated water 764A from the heater 710A to flow through the drain tube 756A and bypass the brewing chamber 600 and pour directly into the mug 438 such that the combined beverage within the mug 438 may be a ratio of the beverage 434 and the heated water 764A. The ratio may be varied to brew a desired flavored beverage to satisfy the personal taste preferences.

Figure 13E:
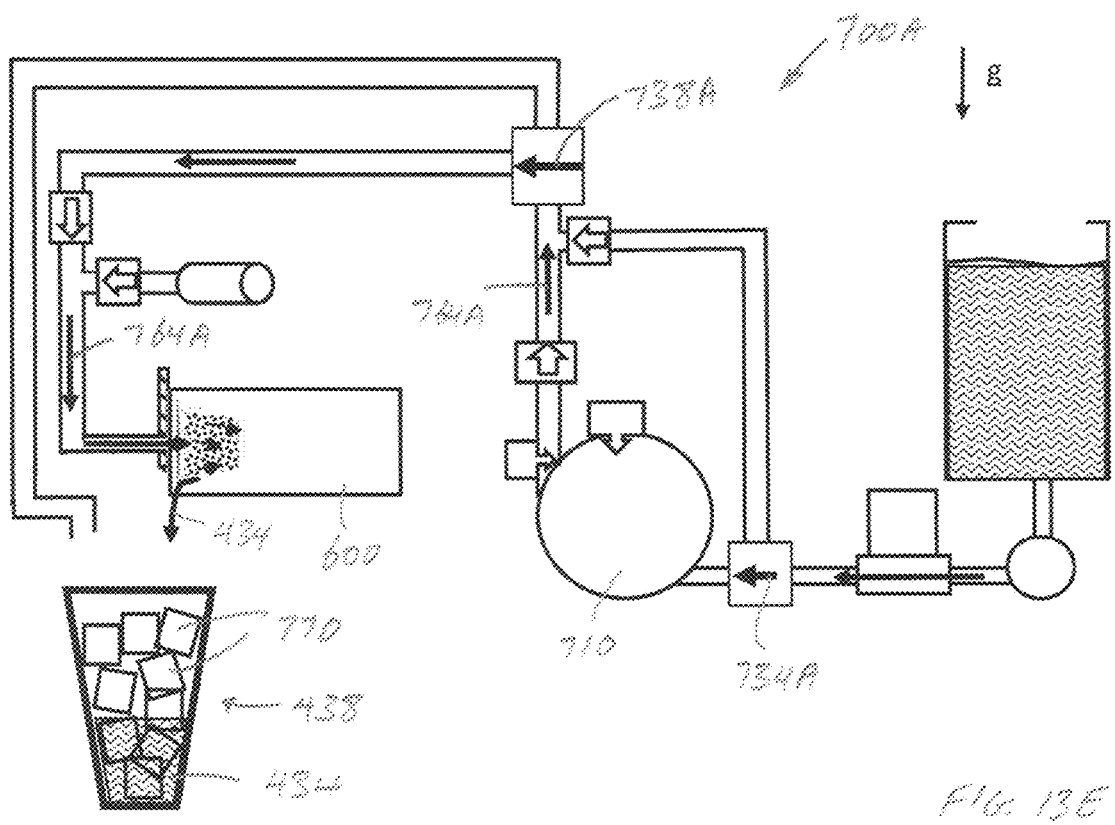
FIG. 13E illustrates directing the heated water to the brewing chamber to brew a beverage.
Figure 13F:
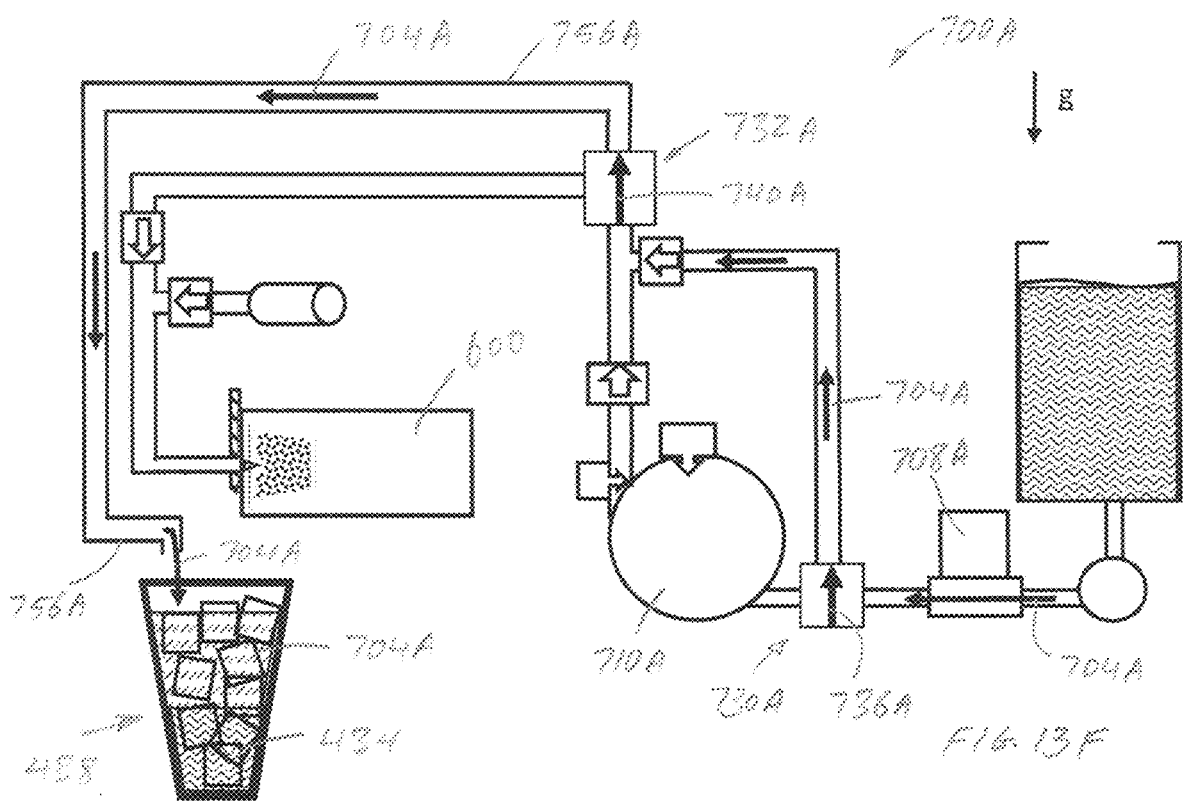
FIG. 13F illustrates directing water from the water tank to bypass the heater and bypass the brewing chamber and pour into a mug.

FIGS. 13E and 13F illustrate the brewing system 700A utilizing the first and second switches 730A and 732A to brew an iced beverage. FIG. 13E illustrates a mug 438 placed underneath the brewing chamber 600 with the mug 438 filled with ice cubes 770 to brew a cold beverage. The brewing system 700A may be utilized to brew the initial beverage in manner discussed above in reference to FIG. 13B such as brewing a predetermined amount of beverage 434 to extract the desired flavors depending on the desired taste such as 4 oz of coffee and the pump 710A may stop. Thereafter, FIG. 13F shows that the first and second switches 730A and 732A may be in the second positions 736A and 740A, respectively, such that the water 704A from the water tank 702A may be directed towards the drain tube 756A such that the unheated water 704A may pour directly into the mug 438 and bypassing the brewing chamber 600. The pump 708A, for example, may pour about 2 oz to about 4 oz of unheated water into the mug 438. The unheated water 704A may minimize melting of the ice cubes 770 compared to the heated water to minimize diluting the taste of the iced beverage due to ice cubes melting.

Control Panel to Personalize the Taste:

FIG. 14A shows a perspective exemplary exterior view of a brewing system 800 including a pod 300 adapted to work with a brewer 701 to brew a variety of beverages based on the user's taste preferences. The pod 300 may be described as discussed above in reference to FIGS. 3 through 8. The brewer 701 generally shows various elements discussed above, in reference to FIGS. 9 through 13, including: a water tank 702 adapted to store water 704; a handle or actuator 636 (see FIG. 11) adapted to pivot about a shaft 750 to move between a closed position (as shown in FIG. 14) and an open position (as shown in FIG. 11B) that may be mechanically linked to a cover 705 that may slide between a closed position (as shown in FIG. 14) and an open position, respectively, such that when the cover 705 is in the open position, a pod 300 may be inserted into the brewing chamber 600 located within the upper housing 709. In particular, the pod 300 may be positioned in a brewing orientation relative to the brewer 701 as generally illustrated in FIG. 14, where the extension may be facing the front side 717 of the brewer 701. The brewer 701 may have a tray 782 (see FIG. 12A) adapted to support a mug underneath the upper housing 709 to receive the beverage pouring from the pod 300. The brewer 701 may also have a control panel 802 to allow the user to select their taste preferences. FIG. 14 also shows an exploded view of the control panel 802 to show exemplary brewing options. The control panel 802 may be divided into several sections including a first section 810, a second section 820, and a third section 830, and a start and stop button 840 to start and stop the brewing process.

The first section 810 generally provides a feedback to the user the type of pod that the brewer 701 has received from the user with the beverage indicator icons including: espresso 812, coffee 814, tea 816, and infused beverages 818. The brewing system 800 may include a plurality of different types of pods packed with beverage ingredient to brew, espresso, coffee, tea, and infused beverages; and once the brewer 701 receives one of these pods within the brewing chamber 500 or 600, the reader 516 (see FIG. 9A) may detect the OID in the lid 314 of the pod 300 and communicate to the user type of pod that has been received. For example, if a coffee pod has been inserted into the brewer 701 by the user, then the coffee icon 814 may light up while other icons are not shown. The first section 810 may also include a hotter water icon 819 where pressing this icon by the user instructs the brewer 701 to pour hot water without any pod in the brewing chamber 600. Note that infused pods may be a coffee combined with vitamin, cannabis, functional ingredients to assist with memory and the like.

The second section 820 includes a plurality of different types of beverage format icons that the users may select therefrom based on their preferences including: hotter 821, acidity and caffeine 822, Americano 823, stronger 824, iced 825, and cold brew 826. For example, if the user inserts an espresso pod 300 into the brewer 701, the espresso icon 812 may light up in the first section 810 thereby providing a confirmation to the user of his/her selection. Thereafter, the user may select the start/stop icon 840 to brew a default cup of 1 oz espresso; alternatively, the user may select Americano icon 823 to brew a cup of Americano, in a manner described below, rather than the default cup of espresso. As another example, if the user inserts a coffee pod 300 into the brewer 701, the coffee icon 814 may light up in the first section 810 thereby providing a confirmation to the user of his/her selection. Thereafter, the user may select the start/stop icon 840 to brew a default cup of 10 oz coffee; alternatively, the user may select cold brew icon 826 to brew a cup of cold brew coffee, in a manner described below, rather than the default cup of espresso.

The third section 830 provides a plurality of cup sizes the user can select depending on the beverage. For instance, for espresso, the control panel 802 may allow the user to select between 1 oz shot of espresso or a double shot of 2 oz espresso; and for coffee, the user may select from 6 to 12 oz cup of coffee. The second section 820 may also provide acidity and caffeine icon 822 to allow the user to adjust the amount of acidity and caffeine in the beverage such as decreasing or increasing the amount of caffeine in coffee.

FIG. 14B illustrates an electrical block diagram 850 of the brewer 701 including a processor 852 communicably linked to a plurality of components discussed above in reference to FIGS. 9, 12, 13, and 14 in order to control the components in a manner discussed above. In general, the processor 850 may be the hub that is communicably linked to the flow meter 716, water pump 708, air pump 722, first and second temperature sensors 752 and 753, heater 710, control panel 802, a memory 854 as discussed in more detail below, reader 516, mug temperature sensor 790, and first and second switches 730 and 732. In particular, when the brewing chamber 600 receives a pod 300, the reader 516 may detect the OID embedded into the lid 314 and communicate the identifier of the pod 300 to the processor 852, which may then control the control panel 802 to light up the corresponding icon representing the pod such as the espresso 812, the coffee 814, the tea 816 or the infused icon 818 in the first section 810, as discussed above in reference to FIG. 14A. The processor 852 may then light up default serving size icons in the third section 830 along with available optional serving sizes where the user can press the start/stop icon 840 to brew the default beverage setting. The processor 852 may also provide optional beverage type icons in the second section 820 which is/are appropriate for the received pod. As discussed in more detail below, the memory 854 may be stored with a plurality of brewing parameters such as the water temperature, flow rate or brewing time, optional infusion and pulsation, and the ratio of beverage to water appropriate for the beverage options available from the control panel 802 and smart phone application. Once the user selects the desired beverage type from the available options from the control panel 802, the processor 852 may retrieve from the memory 854 the appropriate brewing parameters for the beverage type selected by the user.

FIG. 14C shows Tables 3A, 3B, and 3C with possible brewing parameters which may be stored in the memory 854 to brew different types of espresso-based beverages that may be brewed by the brewing system 800. Table 3A provides possible brewing parameters to brew 1 oz and 2 oz of espressos, which may be referred to as a "single" and "double" shot of espresso, respectively. The available serving sizes for espresso may be 1 oz and 2 oz with the brewing temperature of about 195 F with the variation in the flow rate between 1 oz/20 seconds for the 1 oz versus 2 oz/30 seconds for the 2 oz where the overall brewing time may be 20 sec and 30 sec, respectively, due to the difference in the flow rate. Moreover, the ratio of the beverage and water may be mostly beverage, if not all, without hot water for espresso. Note that the default beverage from each of the Tables may be denoted with the asterisk "*" footnote so that the default espresso beverage in Table 3A may be 1 oz as indicated "Espresso 1 oz*" therein. As such, if the user selects the default espresso beverage by pressing the Start/Stop icon 840, then processor 852 may retrieve the brewing parameters for the "Espresso 1 oz*", and control the first and second switches 730 and 732 to direct the heated water from the heater 710 to the brewing chamber 600, and control the water pump 710 to inject the room temperature water 704 to the heater 710 at the flow rate of 1 oz per 20 seconds, based on the feedback from the flow meter 716, to heat the water at 195 F (90.5 C), based on the feedback from the second temperature sensor 753, until 1 oz has been pumped into the heater 710 as measured by the flow meter 716. Thereafter, the processor may control the air pump 722 to purge the remaining beverage within the pod, as discussed above in reference to FIG. 12C.

Table 3B provides possible brewing parameters for brewing an Americano beverage which is a combination of espresso and hot water at about 195 F (90.5 c) or higher. Note that if the user selects the Hot Water icon 819, then the hot water temperature may be raised to 200 F (93.3) without impacting the taste of the Americano. With Americano, the water temperature and the flow rate may be similar for available cup sizes 8, 10, 12 oz, and the default Americano beverage may be a 10 oz cup size. However, the ratio of espresso to hot water may vary from 3:5, 3:7, and 3:9 for the available cup sizes 8, 10, and 12 oz, respectively. As such, for the default 10 oz cup Americano, the beverage may be a combination of 3 oz espresso and 7 oz of hot water, which may be brewed by the brewing system 700 as discussed above in reference to FIGS. 12C and 12D, and FIGS. 13C and 13D.

Table 3C provides possible brewing parameters for brewing espresso over ice beverage which is a combination of espresso and room temperature or unheated water 704 poured over ice. Note that the serving size for espresso over ice may be smaller than Americano, since espresso may be poured into a mug filled with ice cubes which will melt due to espresso being hot when poured over ice. To increase the overall volume of the beverage while minimizing diluting the beverage, unheated water 704 in the amount of 1 oz and 2 oz may be poured into the mug for serving sizes of 4 oz and 6 oz, respectively, such that the beverage to water ratio may be 3:1 and 4:2, respectively.

FIG. 14D shows Tables 4A through 4D with possible brewing parameters which may be stored in the memory 854 to brew different types of coffee-based beverages that may be brewed by the brewing system 800. As indicated above in references to FIG. 2 and Table 1, with traditional single-serve pods such as a K-Cup pod, about 70% of the TDS level is extracted from the coffee ground packed within the pod after injecting 4 oz of heated water through the pod with the brewing time of about 16 seconds, and the additional heated water injected into the pod may extract more of the bitter and astringent flavors from the coffee ground. In this regard, Table 4A provides possible brewing parameters to extract the smooth tasting flavors from the coffee ingredient while leaving the bitter and astringent flavors within the pod. This may be accomplished for example by extracting about 4 oz to 5 oz of coffee beverage from the pod with the balance being hot water as discussed above in reference to FIGS. 12B, 12C, and 12D; and FIGS. 13B, 13C, and 13D. For instance, Table 4A indicates that the default setting for the coffee icon 814 may be 10 oz where the beverage may be a combination of 5 oz coffee and 5 oz hot water or a ratio of 5:5. Moreover, if the user also selects the Stronger icon 824 option, then the brewing parameter may also include an infusion step where 1 oz of heated water may be injected into the pod, and paused for about 5 to 10 seconds to allow the heated water to soak the coffee ingredient before injecting the remaining heated water into the pod to extract the desired flavors from the pod, and then by passing the pod and adding the hot water into the mug. Note that adding the infusion step to brew stronger tasting coffee extends the brewing time by about 5 seconds compared to the standard brewing time for coffee.

Table 4B shows a brewing parameter which may be stored in the memory 854 to brew smoother tasting coffee with less acidity yet with higher concentration of caffeine. Many consumers may desire the caffeine in the coffee to keep them alert but may resist drinking coffee due to their sensitivity to the acid in coffee; and for those consumers, they may select the Acidity & Caffeine icon 822 to brew a cup of coffee with less acidity yet with a higher concentration of caffeine. A number of factors can determine the acidity level in the coffee ground including the region the coffee is grown such as the altitude, the roast level where lighter roast may have a higher concentration of acid compared to a darker roast coffee, and the brewing method; and in particular, the amount of acid extracted from the coffee ground may be determined by the brewing temperature and time. In this regard, the brewing parameters of Table 4B indicates that lowering the brewing temperature to about 130 F (54 C) and extending the brewing time to about 360 seconds (6 minutes) with the beverage to hot water ratio of 6:0, 6:2, 6:4, 6:6 for serving sizes of 6, 8, 10, and 12 oz, respectively, may brew smoother tasting coffee with less acidity yet with higher concentration of caffeine while increasing the strength of the coffee, as discussed in more detail below.

Moreover, the brewing parameter of Table 4B also describes a pulsation process where the water pump 708 may be turned ON and OFF to pump 0.5 oz of heated water at 130 F every 30 seconds to extend the brewing time to about 360 seconds. Note that if the coffee drinker desires to drink the coffee as a cold beverage, then room temperature water may be added rather than hot water.

Table 4C provides possible brewing parameters for brewing coffee over ice beverage which is a combination of coffee and room temperature or unheated water 704 poured over ice. Note that the serving size for coffee over ice may be smaller than the coffee beverage described in Table 4A, since coffee may be poured into a mug filled with ice cubes which will melt due to hot coffee. To increase the overall volume of the beverage while minimizing diluting the beverage, unheated water 704 in the amount of 2 oz may be poured into the mug for the default serving size; and for those who may want a stronger iced coffee beverage, 4 oz of coffee may be poured over ice without the unheated water.

Table 4D shows a brewing parameter which may be stored in the memory 854 to brew cold brew coffee for a smoother taste with minimal bitterness and astringency. In this regard, the brewing parameters of Table 4D describes lowering the brewing temperature to about 120 F (49 C) and extending the brewing time to about 480 seconds (8 minutes) with the beverage to room temperature water ratio of 6:0, 6:2, 6:4, 6:6 for serving sizes of 6, 8, 10, and 12 oz, respectively, to brew smoother tasting coffee with less bitterness and astringency, as discussed in more detail below. Moreover, the brewing parameter of Table 4C also describes a pulsation process to extend the brewing time to about 480 seconds. Note that if the coffee drinker desires to drink the cold brew as a hot beverage, then heated water may be added rather than room temperature water.

FIG. 14E shows Tables 5A and 5B with possible brewing parameters which may be stored in the memory 854 to brew tea and infused beverages that may be brewed by the brewing system 800. Table 5A provides possible brewing parameters to brew tea and infused drinks where lower brewing temperature and additional brewing time may be needed, relative to coffee, to extract the desired flavors from the tea and infused ingredient. This may be accomplished, for example, by extending the brewing time by slowing the flow rate to about 1 oz/10 seconds, and tea and infused drinks may be served in smaller portions such as from 2 oz to 8 oz. Moreover, tea and infused drinks may be brewed at a lower temperature than coffee such as at about 180 F (82 C). Moreover, if the user also selects the Stronger icon 824 option, then the brewing parameter may also include an infusion step where 1 oz of heated water may be injected into the pod, and pause for about 5 to 10 seconds to allow the heated water to soak the tea or infused ingredient. Note that the brewing parameters proscribed in the Tables 3 through 4 are for illustrative purposes and they should not be viewed as limiting sense; rather, the brewing parameters may be changed based on the beverage ingredient being brewed and the desired flavor by the user.

Independent Test Results of Beverage Samples:

FIG. 15A shows Table 6A with test results of 14 Samples of coffees brewed under various brewing parameters in a manner described in reference to Tables 3 and 4; and the test results for two coffee Samples 15 and 16 were purchased coffee from Starbucks, where Sample 15 was pure cold brew coffee poured from the draft tab without being diluted with water or ice, and Sample 16 was a ready to drink (RTD) bottle of cold brew coffee. These tests were conducted to objectively measure the impact on the taste of the brewed beverage when brewed under different brewing parameters such as strength (TDS), acidity (pH), caffeine, sourness, bitterness, and astringency. To prepare the coffee Samples, Kirkland's® K-Cup® pods packed with dark roast coffee (hereinafter referred to as "KK") and Starbucks' ® Pike Place® K-Cup® pods packed with medium roast coffee (hereinafter referred to as "SB") were purchased and were weighed, and sorted so that the two brands of pods contained 11.5±0.1 g and 12.7±0.1 g, respectively, to minimize the variance in the test results due to the difference in the amount of coffee packed within the pod. In reference to Table 6A, Keurig's K-Elite® Brewer was used to brew 8 oz cup of coffees for Samples 1, 4, 6, and 9 as the brewing parameters described in Table 6A such as the coffee to water ratio. For example, full 8 oz coffee Samples 1 and 6 were brewed to establish baseline reference measurements for KK and SB, respectively; and Samples 4 and 9 were brewed with KK and SB, respectively, with the coffee to water ratio of 4:4 to compare the impact on the flavor of the coffee relative to Samples 1 and 6.

For the low pressure (hereinafter "LP") Samples 2, 3, 5, 7, and 8, a manual brewing mechanism jig that can vary the water temperature and brewing time was used to brew the samples as descroned in Table 6A. For the extended brewing time intervals of 360 seconds (6 min) and 600 seconds (10 min), the heated water was injected into the pods periodically with intervening periods where no heated water was injected into the pods. This was done to ensure that 6 oz of heated water could be injected into the pods to brew 6 oz of coffee beverage over the entire extended brewing time.

As noted in the comment column of Table 6A, in the first group of Samples 1-5, Sample 1 was brewed with a KK pod using Keurig's brewer with 8:0 ratio in a way that a K-Cup pod would be normally brewed for an 8 oz cup of coffee to establish a baseline test result to compare with Samples 2-5 brewed under different brewing parameters. In addition, in Sample 2, the brewing parameter as noted in Table 6A was tested to determine the impact on the coffee with respect to caffeine; in Sample 3, tests were performed to determine whether cold brew taste can be simulated in reference to Samples 15 and 16; in Sample 4, a test was performed to determine whether smooth tasting coffee can be brewed; and in Sample 5, a test was performed to determine how increasing the water temperature by about 10° F. would impact the flavor of the coffee. In the second group of Samples 6-10, similar brewing parameters in their respective order were tested as in the first group of Samples 1-5 except that SB pods were used rather than the KK pods.

For the high pressure (hereinafter "HP") Samples 11 through 14, Nescafe's® Dolce Gusto Esperta 2 coffee machine that brews under HP was used to brew the Samples. In particular, a re-usable pod specifically designed to work with the Dolce Gusto brewer was used to brew the samples. Note that the re-usable pod has a mesh bottom to allow the pressure within the beverage grind to release the pressure therein, where these samples simulated the brewing parameters discussed above in reference to FIG. 8D with coarse coffee ingredient is packed into a filter 306B with the holes 336B discussed above in reference to FIG. 5C. For each of the HP Samples, the designated pod was peeled open and the coffee ground contained therein was poured into the re-usable pod, and the cover was sealed and placed into the Dolce Gusto brewer to brew the Samples as described in Table 6A. These tests were conducted to determine how brewing under a HP condition would then impact the flavors relative to the LP brewing conditions such as the first and second group of Samples.

Figure 15B:
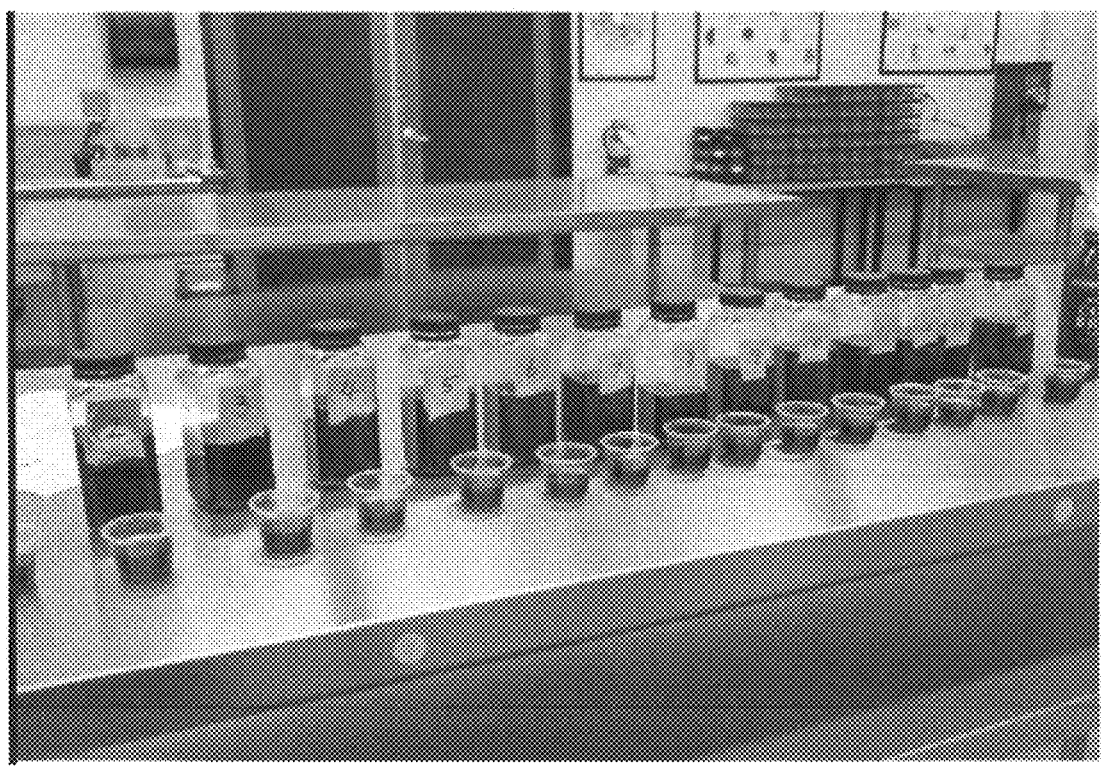
FIG. 15B shows a photo of the brewed samples prepared and bottled, and labeled.
Figure 15C:
FIG. 15C shows a photo of an electronic testing equipment.

In a manner described above, the Samples 1-14 were prepared and bottled, and labeled, as shown in FIG. 15B photo, and the Samples were delivered to Coffee Intelligence, LLC, a lab located in Pasadena, Calif. (hereinafter "LAB") for independently testing the strength (TDS), acidity (pH), caffeine, sourness, bitterness, and astringency in each of the Samples. To more objectively measure the sourness, bitterness, and astringency, the LAB used an electronic taste sensing system TS-5000Z by Insent (hereinafter "Electronic Tongue"), as seen in FIG. 15C, which utilizes taste sensing mechanisms to simulate that of a human tongue to convert the taste of various substances such as food and drugs into numerical data as tabulated in Table 6A. A brochure of the Electronic Tongue by Insent with technical information of the system is attached hereto as Exhibit A. There may be varying definitions of sourness, bitterness, and astringency as some consumers may confuse astringency for bitterness and vice versa, and sourness for acidity and vice versa. For the purpose of this discussion, the definitions provided by the International Coffee Organization (hereinafter "ICO"), accessed online at http://www.ico.org/projects/good-hygiene-practices/cnt/cnt_en/res_cent/glossary.html on Oct. 11, 2019, may be adapted as general guidelines to distinguish among the flavors but not as strict limiting sense of these terms. According to ICO, sourness may be generally characterized as, "an excessively sharp, biting and unpleasant flavour (such as vinegar or acetic acid). It is sometimes associated with the aroma of fermented coffee. Tasters should be cautious not to confuse this term with acidity, which is generally considered a pleasant and desirable taste in coffee." By way of analogy, sourness may be also characterized as a strong lemony taste. In order to distinguish sourness from acidity, ICO generally characterizes acidity as "[a basic taste characterised by the solution of an organic acid. The sharp lively quality characteristic of high-grown coffee, tasted mainly at the tip of the tongue. A desirable sharp and pleasing taste, particularly strong with certain origins, as opposed to an over-fermented sour taste. Not the same as bitter or sour and nothing to do with pH factors. Coffees are low in acidity, between 5 and 6 on the pH scale." Note that although ICO's definition indicates that acidity is tasted mainly at the tip of the tongue, however, one of ordinary skilled in the art may also understand that acidity may be detected on the sides of the tongue. According to ICO, bitterness may be generally characterized as, "[a] primary taste characterised by the solution of caffeine, quinine and certain alkaloids. Similar to acidity but lacking smoothness. This taste is considered desirable up to a certain level, and is affected by the degree of roast and brewing procedures." By way of analogy, bitterness may be also characterized as biting into an aspirin pill. And ICO generally characterize astringency as "an after-taste sensation consistent with a dry feeling in the mouth, undesirable in coffee." By way of analogy, astringency may be also characterized as taste of certain green tea, for example, where it can make the tea drinker pucker up in the mouth.

FIG. 15D shows Graph 1A presenting the data for Samples 1-16 from Table 6A in a graphical format in terms of their respective values with the measurements of sourness along the X-axis, and the measurements of the bitterness along the Y-axis, and the measurement of astringency generally represented as the overall size of the shape representing a certain category of Samples where a larger size shape represents a greater level of astringency relative to a smaller size shape. Moreover, Samples 1-5 brewed under LP and with KK pods are presented as a first group of Samples and represented as pentagon shapes and numerically labeled accordingly; Samples 6-10 brewed under LP and with SB pods are presented as a second group of Samples and represented as hexagonal shapes and numerically labeled accordingly; Samples 11 and 12 brewed under HP and with KK coffee ground are presented as a third group of Samples and represented as octagonal shapes numerically labeled accordingly; Samples 13 and 14 brewed under HP and with SB coffee ground are presented as a fourth group of Samples and represented as heptagonal shapes and numerically labeled accordingly; and Samples 15 and 16 were purchased from Starbucks with the Sample 15 being cold brew coffee poured from the store, and Sample 16 being a ready to drink (RTD) bottled cold brew coffee, and the two samples are presented as a fifth group of Samples and represented as elliptical shapes and numerically labeled accordingly. Note that the numerical numbers for the Samples 1, 6, 11, and 13 are marked with an asterisk "*" indicating that these Samples establish the baseline values for sourness, bitterness, and astringency to which they can be compared with the rest of the Samples in their respective group. In addition, Samples are indicted with their respective measured TDS, pH, and Caffeine levels in the format (TDS, pH, Caffeine) as noted in Graph 1A.

Note that the numerical values tabulated in Table 6A for sourness, bitterness, and astringency as measured by the Electronic Tongue are provided in terms of their relative values where if the difference in the measurement between two Samples is one scale deviation "a" apart, then an average consumer should be able to taste the difference between the two Samples. And, as indicated in Graph 1A, one delta "Δ" deviation is scaled to be 1 (one) for both sourness and bitterness, meaning if the first Sample has a sourness measurement of −29 along the X-axis and the second Sample has a sourness measurement of −30 where the absolute difference is 1, then ordinary consumers should be able to taste a noticeable difference in the sour taste between the two beverages; however, if the difference is less than 1, the consumers may not be able to taste the difference. Likewise, if the first Sample has a bitterness measurement of 11 along the Y-axis and the second Sample has a bitterness measurement of 10 where the absolute difference is 1, then ordinary consumers should be able to taste a noticeable difference in the bitter taste between the two beverages; however, if the difference is less than 1, then the consumers may not be able to do so. Moreover, the greater the difference in the measurements, it is more likely that the consumer can taste the difference in the flavor. In addition, astringency is also scaled to have 1 as one Δ deviation. Note that the sourness scale along the X-axis is scaled in the negative ("−") value and further away from zero (0) or more left in Graph 1A, less sour the Sample is on Graph 1A. For example, Sample 2 with the sourness scale of −31.81 is less sour than Sample 1 with the sourness scale of −29.95 since Sample 2 is further away from zero.

By way of background, ordinary consumers are able to taste the difference in flavors when there is about 20% or more difference in the concentration of the flavor between the two beverages. Based on this principle, the Electronic Tongue may utilize 1.2 as a base scale where a scale of 1 or one Δ deviation a difference in concentration is about a 20% difference or 1.2 times ($=1.2^1$); or a scale of 4 (4 σ) difference in concentration is about a 200% difference or 2 times ($=1.2^4$). In order to determine the differences in the concentration values in terms of percentages (%), FIG. 15E shows Table 6B with the scaled values of sourness, bitterness, and astringent flavors from Table 6A reproduced under the headings: "Sourness Scale", "Bitterness Scale", and "Astringent Scale". Table 6B then converts the scaled values to their corresponding concentration values under the headings: "Sourness Concentration", "Bitterness Concentration", and "Astringent Concentration", accordingly. For example, Sample 1 has a bitterness scale value of 11.62 which is converted to the corresponding concentration value of 8.32 (=$1.2^{11.62}$); and for Sample 2, the bitterness scale value is 10.17 which is converted to the corresponding concentration value of 6.39 (=$1.2^{10.17}$). Accordingly, the percentage difference in the bitterness taste between the baseline Samples 1 and sample 2 is calculated and listed as about 23% for Sample 2 under the headline "ΔBitterness %". Given that the bitterness taste in Sample 2 is about 23% less relative to the baseline Sample 1, according to the measurements taken by the Electronic Tongue, and since the percentage difference is at least 20% less relative to the baseline Sample 1, ordinary consumers should be able to taste that Sample 2 is noticeably less bitter compared to the baseline Sample 1. In a manner calculated above, the measured scale values were converted to the corresponding concentration values for sourness, bitterness, astringent flavors, and the percentage differences were calculated relative to their respective baseline Samples, and listed under the headings of "ΔSourness %", "ΔBitterness %", and "ΔAstringent %", accordingly in Table 6B. Note that in terms of the sourness concentration, further away from zero (0), less sour the Sample is in Table 6B meaning Sample 2 with Sourness Concentration of −330.18 is less sour than Sample 1 with Sourness Concentration of −235.22.

By way of background, coffee is a chemically complex mixture of beverage containing a number of different chemical compounds contributing to the sourness, bitterness, and astringency, as discussed herein, where over-extraction of one or more of these flavors can make the coffee taste unbalanced and undesirable. However, there are other desirable flavors in coffee such as sweetness, acidity, and cocoa such that when extracted in proper proportions, including bitterness and sourness, the coffee can taste well balanced and full bodied, and provide positive after taste that lingers after the coffee has been consumed. While sourness, bitterness, and astringency are prominent flavors, along with others, consumers generally do not taste these flavors in isolation; rather they taste the combination of such flavors where over-extraction of one more such flavors may be detected by the consumers. For example, Graph 1A shows a right triangle formed from Sample 8 to Sample 16 by the base ΔS (difference in the sourness scale value), opposite side ΔB (difference in the bitterness scale value), and the hypotenuse or Radius (R) can be calculated using the Pythagorean equation where $R=\sqrt{\Delta S^2 + B^2}$ to take into consideration the contribution of the sourness and bitterness flavors that consumers may taste, which may be more realistic, rather than taste each of these two flavors in isolation.

In reference to Graph 1A, while having some portion of bitter and sour flavors in the coffee may add to the complexity and body to the taste of coffee; in general, having less bitterness and sourness may be considered desirable in coffee. This seems to be supported by the measurement taken by the Electronic Tongue where Sample 16, which is the RTD cold brew coffee purchased from Starbucks where "cold brew" coffee is generally noted for having smooth taste without much bitterness and sourness, is positioned in the bottom left corner of Graph 1 indicating that Sample 16 has the least amount of sourness and bitterness. Using Sample 16 as a baseline for coffee that has a smooth taste, distance R may be calculated relative to other Samples 1-15 where the shorter distance R may indicate smoother tasting coffee relative to Sample 16. In this regard, FIG. 15F shows Table 6C that lists the distance R for Samples 1-15 relative to Sample 16 under the heading "Radius vs Sample 16, Scale". Moreover, FIG. 15G shows Table 6D reorganizing the Sample 1-15 in an ascending order from top to bottom based on the R value, which indicates that Sample 8 may taste more like Sample 16 than Sample 15, which is the cold brew coffee poured from the draft purchased from Starbucks.

Based on the above discussions relating to Graph 1A and Tables 6A-6D, a number of observations and findings may be drawn. One of the first observations and findings that may be drawn is that brewing parameters such as brewing temperature and time, and beverage to water ratio may be varied using the same pod by the brewing system 800 to personalize the taste profile of the coffee. In this regard, FIG. 15H shows Graph 1B with the first group of Samples 910 Samples 910 in relation to the second group of Samples 920 Samples 920 with their relevant measurements including the brewing temperature, brewing time, and beverage to water ratio in the following format (Temp(F), Time(s), Ratio). With the first group of Samples 910, the $2^{nd}$, $3^{rd}$, and $5^{th}$, which is collectively referred to as Samples 912, are generally clustered around each other such that σ<1 or the flavor difference among the Samples 912 is less than 20% where ordinary consumers may not be able to detect a noticeable taste difference among the Samples 912. However, the Samples 912 is shifted left and down relative to the baseline Sample 1 by σ>1; and as indicated in Table 6B, Δ% for all three measured flavors are greater than 20% such that consumers should be able to notice less sourness, bitterness, and astringency between the Samples 912 and the baseline Sample 1. Note that the proscribed water temperatures, brewing times, and beverage to water ratios may be varied for the Samples 912 to brew a beverage that is noticeably less sour, bitter, and astringent relative to the baseline Sample 1. For example, for Sample 2, the proscribed brewing temperature may be from 120° F. to about 140° F.; the brewing time may be from 240 sec (4 min) to 480 sec (8 min); and beverage to water ratio from 4:4 to 8:0). For Sample 3, the proscribed brewing temperature may be from 110° F. to about 130° F.; the brewing time may be from 480 sec (8 min) to 900 sec (15 min); and beverage to water ratio from 4:4 to 8:0). For Sample 5, the proscribed brewing temperature may be up to 210° F.; the brewing time may be up to 60 sec (1 min); and beverage to water ratio from 3:5 to 6:2). Note that these ranges may also apply to the second group of Samples 920. With regard to Sample 4, Table 6B indicates that Δ % is greater than 20% for bitterness and astringency relative to Sample 1, but 7% more sour, although consumers may not be able to notice the difference in the sourn taste between two Samples since the difference is less than 20%. For Sample 4, the proscribed brewing temperature may be up to 195° F.; the brewing time may be up to 40 sec; and beverage to water ratio from 3:5 to 5:3).

Again, taste is subjective and the way consumers may want their coffee, such as hot or cold, may change throughout the day and seasons. For instance, for those who have grown accustomed to drinking coffee from a single-serve brewing system like the Keurig Brewing System, and would desire more bitter tasting coffee such as in Sample 1, then the brewing system 700 as discussed above in reference to FIGS. 12 and 13 may use a pod to brew the coffee as described in the brewing parameters of Sample 1 in Table 6A. On the other hand, for those who may want a smoother tasting coffee, which is less bitter, and less sour and astringent, the brewing system 700 may use the same pod 300 to brew different tasting coffee in a different format as indicated for Sample 2-5 in Graph 1B. For example, while three strength, format of the beverage served such as hot or cold, and concentration of caffeine and acidity, for the first group of Samples 1-5 using Sample 1 as the reference baseline relative to Samples 2-5.

TABLE 6E

| Samples: | Sourness | Bitterness | Astringency | Cold Brew | Strength | Hot or Cold | Caffeine | Acidity |
|---|---|---|---|---|---|---|---|---|
| 1 | High | High | High | No | Medium | Hot | Medium | Medium |
| 2 | Less | Less | Less | No | More | Cold | More | Less |
| 3 | Less | Less | Less | Yes | More | Cold | More | Less |
| 4 | More | Less | Medium | No | Less | Hot | Less | Medium |
| 5 | Less | Less | Less | No | Less | Hot | Less | Medium |

Samples of 912 may be clustered around each other, each of the Samples 912 offer a unique taste profile. For instance, Sample 2 is brewed at a lower temperature of 130° F. so that it may be more suitable to be served in a cold beverage format, and it may taste smoother without sacrificing on the strength of the coffee and with about 5% more TDS compared to Sample 1, and with about 7% more caffeine. With regard to Sample 3, Table 6D indicates that the R value of Sample 3 is 4.16, which ranks as third in terms of all the samples tested simulating the cold brew taste relative to Sample 16, which is RTD cold brew coffee from Starbucks; and among the KK pods, which is a dark roasted coffee, Sample 3 simulates most like a cold brew coffee relative to Samples 2 and 5. In addition, Sample 3 is brewed at a lower temperature of 120° F., and this may allow Sample 3 to be served cold with ice, which is a common way to serve cold brew coffee, without substantially diluting the strength of the coffee. Furthermore, Sample 3 has a TDS of 1.03 which is about 7% stronger than Sample 1 to provide a stronger tasting coffee. With regard to Sample 5, it is brewed at a higher brewing temperature of 200° F., and for those who may want their coffee served hot rather than cold and without tasting bitter, a pod may be brewed in accordance with the brewing parameters described for Sample 5. Sample 5 also has a relatively low TDS level of 0.86, which is about 10% lower than Sample 1, however, a lower TDS may be compensated by packing more coffee ground into the pod, as discussed above in reference to pod 300.

With regard to Sample 4, Table 6B indicates that Sample 4 is about 27% less bitter than the baseline Sample 1 but it is more sour than Sample 5 by about 36% ([−297.59−(−218.68)]÷−218.68) such that consumers should be able to taste that Sample 4 is noticeably less bitter than the baseline Sample 1 but more sour than the Samples 912, which includes Sample 5. As such, for those who might like sourness in their coffee but smoother, i.e. less bitter, relative to the baseline Sample 1, the brewing system 700 may brew the coffee with the brewing parameters described in Sample 5. Moreover, Sample 4 has the least amount of caffeine at 93 mg, which is about 22% less caffeine compared to Sample 1; and for those who may want less caffeine in the afternoon, brewing coffee under the brewing parameters for Sample 4 may be a good option.

The brewing system 800, as discussed above in reference to FIGS. 14A and 14B, may alternatively provide the control panel 802 or a smart phone application that can brew the beverage ingredient 310 according to the user's taste preferences using the same pod by varying the brewing parameters such as the brewing temperature, brewing time, and the beverage to water ratio. Table 6E below summarizes the flavor profiles (sourness, bitterness, astringency, cold brew), Based on the varying coffee characteristics summarized in Table 6E brewed under different brewing parameters for the first group of Samples, as discussed above, the brewing system 800 may allow the user to select the desired coffee characteristics from the control panel 802 or from a smart phone app, as discussed above in reference to FIGS. 14A and 14B, to brew the beverage ingredient 310 using the same pod that most approximates the desired coffee characteristics. For instance, if the user desires coffee with a bitter, sour, and astringent taste similar to coffee brewed from the traditional Keurig Brewing System, then the brewing system 800 may brew the pod using the brewing parameters as described for Sample 1. And, if the user desires coffee with less bitterness but with similar sourness as Sample 1, then the brewing parameters as described for Sample 4 may be used. On the other hand, if the user desires coffee with less bitterness, sourness, and astringency then the brewing parameters as described then Samples 2, 3, and 5 may be used; but within this group of samples, if the user further desires the beverage format to be cold, then the brewing parameters of Samples 2 and 3 may be used; and still further, if the user desires the beverage to taste more like cold brew coffee, then the brewing parameters of Sample 3 may be used. Moreover, within the three Samples 912, if the user desires to brew the coffee in a short amount of time, such as under a minute, then the brewing parameters described in Sample 5 may be used with a brewing time of 30 seconds compared to the brewing time of more than 5 minutes for Samples 2 and 3. Still further, if the user desires less caffeine in the coffee, then the brewing parameters described in Sample 4 may be used with the caffeine amount of 92 mg, which is the least amount caffeine compared with caffeine levels from the first group of Samples 910, with about 22% less caffeine compared to Sample 1.

A second observation and findings that may be drawn from Graph 1A and Tables 6A-6D is that beverage characteristics brewed under different brewing parameters with the brewing system 800, as discussed above, may be predictable based on the roasting profile of the coffee ground being brewed. In this regard, FIG. 15I shows Graph 1C, which is a simplified version of Graph 1A showing the relative relationship between the first group Samples 910 and the second group of Samples 920 in relation to their respective sourness and bitterness axes. In general, Graph 1C shows the first group of Samples 910 arranged in a capital "G" like configuration when connecting the dots from the $1^{st}$ to $5^{th}$ Samples as indicated by the first dotted lines 902 in the direction following the direction arrows 904A. Similarly, the second group of Samples 920 appears to be arranged in a "G" like configuration when connecting the dots from the $6^{th}$, $8^{th}$, $9^{th}$, and $10^{th}$ Samples as indicated by the second dotted lines 906 following the direction arrows 908A with the exception of Sample 7. The test results of Sample 7 may be an anomaly due to improperly preparing this Sample or an error in the measurement, however, given that the brewing parameters of Samples 7 and 8 are similar with the exception of the brewing times of 360 seconds and 600 seconds, respectively, and with their respective TDS and pH levels being similar (1.13 TDS vs. 1.15 TDS; and 5.35 pH vs. 5.33 pH, respectively), it is more likely that there was an error in the measurement.

As discussed above, the first and second group of Samples 910 and 920 were brewed under similar brewing parameters, as noted in Table 6A, in their respective order other than using KK pods packed with about 11.5 g of dark roasted coffee in the first group of Samples 910, and using SB pods packed with about 12.7 g of medium roasted coffee in the KK pods, which is about 10% more coffee compared to the dark roasted coffee in the KK pods. Based on the configuration of the first and second dotted lines 902 and 906 as illustrated in Graph 1C, with the exception of Sample 7 as discussed above, a general pattern of the relative sourness, bitterness, and astringency with respect to the second group of Samples 920 appears to follow a similar pattern as the first ground of Samples 910. In particular, adjusting the brewing parameters as described from Sample 1 to Sample 2, as indicated by the slope of the direction arrow 904A reduces the sourness, bitterness, and astringency by 40%, 23%, and 32%, respectively, which are all greater than 20% so that consumers should be able taste a noticeable difference between the two Samples 1 and 2. Note that the slope of the direction arrow 904A may be calculated as bitterness (along the vertical axis) over sourness (along the horizontal axis) or 23%÷40%, which is about 0.575. Next, Samples 2, 3, and 5 for the first group of Samples 910, and Samples 8 and 10 for the second group of Samples 920 are generally clustered together. However, as listed in Table 6B, adjusting the brewing parameters as described from Sample 3 to Sample 4, as indicated by the slope of the direction arrow 904B, increases the sourness concentration from −324.81 to −218.68 or by about 32%; increases the bitterness concentration from 5.86 to 6.09 or by about 4%; and increases the astringency concentration from 1.84 to 2.20 or by about 20%. And adjusting the brewing parameters as described from Sample 4 to Sample 5, as indicated by the slope of the direction arrow 904C, decreases the sourness concentration from −218.68 to −297.59 or by about 36%; increases the bitterness concentration from 6.09 to 6.21 or by about 2%; and decreases the astringency concentration from 2.20 to 1.92 or by about 13%.

As indicated in Graph 1C, the second dotted lines 906 appears to have shifted to the right and lower relative to the first dotted lines 902 indicating that the second ground of Samples 920 are more sour but less bitter relative to the first group of Sample 910, as indicated in Table 6B. The relative shift in the sourness and bitterness from the first group of Samples 910 relative to the second group of Samples 920 may be largely attributed to the difference in the roast of the coffee from the dark roast packed in the KK pods used in the first group of Samples 910 to the medium roast coffee packed in the SB pods used in the second group of Samples 920 since the differences in the roast level between the two group of Samples 910 and 920 is the variable that was tested other than that SB pods have about 10% more coffee compared to the KK pods. Note that the shift in the flavor profile from the first group of Samples 910 versus the second group of Samples 920 is not inconsistent with the different characteristics between the darker and medium roast coffees where the darker the coffee is roasted, more of its oil is lost which tends to make the coffee taste more bitter and less sour. However, the second group of Samples 920 packed with about 10% more coffee resulted in higher TDS, acidity, and caffeine relative to their counterparts and relative to the first group of Samples 910. The lighter roasted coffee and more coffee packed in the Samples 920 did not appear to change the configuration of the dotted lines 906 relative the dotted lines 902 of the Samples as the slopes of the corresponding direction arrows 904A and 908A; 904B and 908B; and 904C and 908C are generally aligned with respect to each other. This seems to indicate that the general relationships in terms of the sourness, bitterness, and astringency may be predictably controlled based on the brewing parameters with adjustments made for the difference in the roast level of the coffee. For instance, for a lighter roasted coffee relative to a medium roasted coffee packed in the SB pod, flavor profiles of the sourness, bitterness, and astringency may be predicted by shifting the overall taste profile to the right and lower relative to the second dotted lines 904. That is, dotted circles may represent a third group of Samples 930 connected by the dotted lines 932 as indicated by the direction arrows 934A, 934B, and 934C corresponding to the direction arrows 908A, 908B, and 908C, respectively, where the circular dotted lines 936 may represent a pod packed with lighter roasted coffee brewed under the brewing parameters described in Sample 6; the circular dotted lines 938 may represent a pod packed with lighter roasted coffee brewed under the brewing parameters described in Sample 8; the circular dotted lines 940 may represent a pod packed with lighter roasted coffee brewed under the brewing parameters described in Sample 9; and the circular dotted lines 942 may represent a pod packed with lighter roasted coffee brewed under the brewing parameters proscribed in Sample 10. Note that the projected taste profile of the pod 938 with the lighter roast may have a similar bitterness concentration as the RTD cold brew sample 16 but with more sourness. However, the projected taste profile of the pod 938 would be predicted to have less bitterness and sourness than the poured cold brew coffee Sample 15.

A third observation and findings that may be drawn from Graph 1A and Tables 6A-6D is that beverage characteristics brewed under HP and lower brewing temperature may lessen the sourness, bitterness, and astringency relative to the beverage characteristics brewed under LP with similar brewing parameters with the brewing system 800. In this regard, FIG. 15J shows Graph 1D, which is a simplified version of Graph 1A showing the relative relationship among the first group of Samples 910 relative to the third group of Samples 950 encircled in dotted lines 952; and the second group of Samples 920 relative to the fourth group of Samples 960 encircled in dotted lines 962 in relation to their respective sourness and bitterness axes. In particular, lowering the brewing temperature by 10° F. from 190° F. in Sample 1 to 180° F. in Sample 11, and brewing under HP rather than LP, lessens the sourness and bitterness thereby shifting the Samples 11 and 12 to the left and slightly lower relative to their respective Samples 1 and 4. Moreover, Sample 11 shifted left and lower along the dotted lines 902 following the direction arrow 904A, and Sample 12 shifted left and lower along the dotted line 902 following in the opposite direction as the direction arrow 904B. However, in reference to Table 6B, while Sample 11 is less sour, bitter, and astringent relative to Sample 1 by about 15%, 6%, and 6%, respectively, consumers may not be able to notice the difference in the taste profile since the differences are all under 20%. Accordingly, for those who may have gotten accustomed to the more bitter taste in their coffee brewed from a traditional single-serve coffee maker like Keurig Brewing System, the brewing system 700 may brew the pod 300 under HP with the brewing parameters as described in Sample 11 to simulate such taste. Likewise, while Sample 12 is less sour, bitter, and astringent relative to Sample 4 consumers may not be able to notice the difference in the taste profile since the differences are all under 20%.

Graph 1D also shows that similar shifting in the flavor profile occurs with Samples 13 and 14 compared to Samples 6 and 9, respectively, except that the difference in the sourness between Samples 14 and 9 is just below 20%. Accordingly, consumers may not be able to notice the difference in the taste profile between Samples 6 and 13, and Samples 9 and 14 since the differences are under 20%, except for the difference in the sourness between Samples 9 and 14, which is just below 20%; and based on the shifting of tasting profiles of the third and fourth group of samples 950 and 960, as discussed above, due to lowering the brewing temperature by 10° F. and brewing under HP, the brewing system 700 may adjust the brewing parameters in a predictable manner. For instance, FIG. 15K shows Graph 1E with Samples 1 and 4 projected over the third group of Samples 11 and 12, respectively, to predict how the taste profiles of the Samples 2, 3, and 5 might shift in relation to their respective sourness and bitterness axes. Accordingly, by brewing the first Samples 910 under HP and lowering the brewing temperature by about 10° F., the taste profiles of the sourness and bitterness of such beverages may be predicted in a manner shown in Graph 1E. Likewise, Samples 6 and 9 of the second group of Samples 920 have been projected over the fourth group of Samples 13 and 14, respectively, to predict how the taste profiles of the Samples 8 and 10 might shift in relation to their respective sourness and bitterness axes. Accordingly, by brewing the second Samples 920 under HP and lowering the brewing temperature by about 10° F., the taste profiles of the sourness and bitterness of such beverages may be predicted in a manner shown in Graph 1E.

FIG. 15L shows Graph 1F to illustrate another predictable example of adjusting the taste profiles of a beverage by adjusting the brewing parameters. Graph 1F is similar to Graph 1C where using light roasted coffee may predictably shift the third group of Samples 930, as discussed above, to the right and lower compared to the second group of Samples 920 along the sourness and bitterness axes. In addition, Graph 1F may predict that the third group of Samples 930 Samples 930 may further be shifted to the left and lower as indicated by the direction arrow 944 by brewing the light roasted coffee under HP and lower the brewing temperature by about 10° F., as discussed above in reference to Graph 1E. Graph 1F also shows a dotted line 946 generally indicating a line between the two cold brew Samples 15 and 16 such that a brewed sample that is in close approximation to the dotted line 946 and Sample 16 may most closely simulate the cold brew taste of Sample 16, which has the least amount of sourness, bitterness, and astringency as indicted by Table 6A. Note that the predicted dotted lines 932 of the third group of Samples 930 between the Samples 936 and 938 as represented by the direction arrow 934A may be juxtaposed to the line 946, and the slope of the direction arrow 934A may be similar to the slope of the line 946. Accordingly, the brewing system 700 may use a pod packed with light roasted coffee and may adjust the brewing parameters to brew under a HP condition in a manner discussed above, to brew a beverage that simulates a cold brew coffee along the dotted line 932. Note that based on the predicted taste profiles of the third group of Samples 930, the Sample 938 may taste most like the Sample 16.

As discussed above, a number of factors can determine the taste profile of coffee including the region the coffee is grown such as the altitude, the roast level, where lighter roast coffees may have a higher concentration of acidity compared to a darker roast coffee, grind size, brewing pressure, brewing temperature, and brewing time such that testing plethora of possible combinations of coffee characteristics which can be packed into the pods to measure taste profiles such as sourness, bitterness, and astringency along with TDS, acidity, and caffeine may be time consuming and cost prohibitive. Accordingly, machine learning or artificial intelligence algorithms and/or software may be utilized to predict the taste profiles of beverage brewed under different brewing conditions based on a predetermined number of baseline measurements taken from brewed coffee samples in a manner discussed above.

Concerning specific aspects related to the present invention, U.S. Pat. Nos. 10,370,183 and 10,143,329 are hereby incorporated by reference.

While various embodiments of the invention have been described, it will be apparent to those of ordinary skill in the art that many more embodiments and implementations are possible within the scope of this invention. Moreover, various features and functionalities described in this application and Figures may be combined individually and/or a plurality of features and functionalities with others. Accordingly, the invention is not to be restricted except in light of the attached claims and their equivalents.

What is claimed is:

1. A beverage pod comprising:
   a container having a rim on a proximal end that is open, a distal end that is closed, and a sidewall between the proximal end and the distal end;
   a filter disposed within the container, the filter having an extension on a proximal end that is open, a distal end with holes, and a sidewall between the proximal and distal ends of the filter,
   where the extension is peelably coupled to the rim;
   a beverage ingredient disposed within the filter;
   a lid enclosing the beverage ingredient within the filter, and the lid adapted to be pierced to inject water into the filter; and
   a fluid flow path formed when the lid is pierced and a gap is formed between the extension and the rim, the fluid flow path along the lid, the beverage ingredient, the holes at the distal end of the filter, a space between sidewalls of the filter and the container, and the gap, wherein the extension includes a first section and a second section, the first section extending outwardly a predetermined distance that overlaps the rim of the container, and the second section extending farther thereof relative to the first section.

2. A beverage pod as defined in claim 1, further including a distributor having apertures on a distributor surface disposed in between the lid and the beverage ingredient, the fluid flow path further formed along apertures on the distributor surface.

3. A beverage pod as defined in claim 1, where the filter has a base at the distal end of the filter and extending upwardly towards the extension to form the sidewall of the filter, and extending outwardly to form the extension.

4. A beverage pod as defined in claim 1, where the second section extends at least partially in the direction of the distal end of the filter.

5. A beverage pod as defined in claim 1, where the filter has a base that extends upwards to form the sidewall, and the sidewall includes a plurality of holes.

6. A beverage pod as defined in claim 1, where the holes have a predetermined size and number to control the flow of a beverage through the holes to provide a desired pressure within the filter.

7. A beverage pod as defined in claim 1, where the filter has a chamber adapted to pack the beverage ingredient therein and the filter is formed from a substantially rigid material to substantially maintain its shape under at least 8 bars of internal pressure within the chamber.

8. A beverage pod as defined in claim 1, where the distal end of the filter is in close approximation with the distal end of the container.

9. A beverage pod as defined in claim 2, where the distributor includes a base and an outer distributor flap, the distributor flap in engagement with an inner side of a sidewall of the filter.

10. A beverage pod as defined in claim 9, where the distributor base includes a protrusion extending toward the distal end of the filter, the protrusion forming a cavity sized to receive an inlet liquid injection member for injecting water into the filter.

11. A beverage pod as defined in claim 2, where the apertures in the distributor are smaller than an average size of the beverage ingredient and are adapted to prevent the beverage ingredient from exiting the filter through the distributor apertures.

12. A beverage pod as defined in claim 2, where the apertures are funnel-shaped, with a wider opening of the funnels at the proximal surface of the distributor and a narrow opening at the distal surface of the distributor.

13. A beverage pod as defined in claim 1, where the sidewall of the filter has at least one stiffener to stiffen the sidewall.

14. A beverage pod as defined in claim 13, where the at least one stiffener is an outwardly-extending rib that is juxtaposed to the sidewall of the container.

15. A beverage pod as defined in claim 1, where the holes have a predetermined size that is less than the average grind size of the beverage ingredient.

16. A beverage pod having a proximal end and a distal end, the pod comprising:
a container having a rim defining an opening juxtaposed to the proximal end, a base on the distal end, and a sidewall between the rim and base;
a filter within the container, the filter having an extension defining an opening juxtaposed to the proximal end, a base with holes juxtaposed to the distal end, and a sidewall between the extension and the base of the filter, where the extension is peelably coupled to the rim, the extension includes a first section and a second section, the first section extending outwardly from the sidewall of the filter, and the second section extending farther at least partially in the direction of the distal end of the filter;
a beverage ingredient disposed within the filter;
a lid enclosing the beverage ingredient within the filter on the proximal end, and the lid adapted to be pierced to inject water into the filter; and
a beverage pathway when a gap is formed between the extension and the rim, the beverage pathway along the beverage ingredient from the proximal end to the distal end, the holes juxtaposed to the distal end, a space between the sidewall of the filter and the sidewall of the container from the distal end towards the proximal end, and the gap juxtaposed to the proximal end.

17. A beverage pod as defined in claim 16, further including a distributor having apertures on a distributor surface disposed in between the lid and the beverage ingredient, the fluid flow path further formed along apertures on the distributor surface.

18. A beverage pod as defined in claim 16, where the holes have a predetermined size and number to control the flow of a beverage through the holes to provide a desired pressure within the filter.

19. A beverage pod as defined in claim 16, where the filter is formed from a substantially rigid material to substantially maintain its shape under at least 8 bars of internal pressure within the chamber.

20. A beverage pod comprising:
a container having a base that bends at a first corner to form a first sidewall, and the first sidewall bends at a second corner to form a rim that defines an opening;
a filter having a second sidewall that bends at a corner to form an extension and defining an opening around the corner, and the extension peelably coupled to the rim of the container and at least a portion of the extension overlaps the rim such that an application of sufficient force upon the overlapping portion of the extension causes at least a portion of the extension to peel from the rim to form a gap between the extension and the rim of the container, the extension includes a first section and a second section, the first section extending outwardly from the sidewall of the filter, and the second section extending farther at least partially in the direction of the distal end of the filter, and the filter having a first chamber therein adapted to receive beverage ingredient, and the container having a second chamber between the filter and the container;
a lid enclosing the opening of the filter such that the lid and the container hermetically seal the beverage ingredient within the container, and during a brewing process, the beverage within the first chamber drains to the second chamber and the gap formed between the first section and the rim of the container.

21. The beverage pod as defined in claim 20, where a pathway is formed between the first sidewall and second sidewall.

22. The beverage pod as defined in claim 20, further including a distributor having a cavity adapted to receive heated water and distribute the heater water into the first chamber.

23. A beverage pod adapted to receive heated water at a high pressure to brew a low pressure beverage, the pod comprising:
a container having a first base that bends at a first container corner to form a first sidewall, and
the first sidewall bends at a second container corner to form a rim that defines a first opening;
a filter having:
a second base that bends at a first filter corner to form a second sidewall that bends at a second filter corner to form an extension and defining a second opening around the second filter corner to define a pocket adapted to receive a beverage ingredient to brew a beverage, the extension peelably coupled to the rim, the extension includes a first section and a second section, the first section extending outwardly from the sidewall of the filter, and the second section extending farther at least partially in the direction of the distal end of the filter, where an application of sufficient force upon the extension causes at least a portion of the extension to separate from the rim to form a gap between the extension and the rim, the base having a plurality of holes where the size of the holes is predetermined to release the high pressure within the filter but substantially prevent the beverage ingredient from passing through the holes to allow beverage to be extracted from the beverage ingredient below 4 bars; and a lid enclosing the first second opening of the filter to hermitically seal the beverage ingredient within the container, and during a brewing process, the beverage within the container drains via the gap between the extension and the rim.

24. The beverage pod as defined in claim 23, further including beverage ingredient where an average size of the beverage ingredient is from 400 to 700 microns.

25. The beverage pod as defined in claim 23, where the beverage extracted is coffee.

26. A beverage pod adapted to receive heated water at a high pressure to brew a beverage, the beverage pod comprising:

a container having a first base that bends at a first container corner to form a first sidewall, and the first sidewall bends at a second container corner to form a rim that defines a first opening;

a filter having:

a second base that bends at a first filter corner to form a second sidewall that bends at a second filter corner to form an extension and defining a second opening around the second filter corner to define a pocket adapted to receive beverage ingredient to brew a beverage, the extension peelably coupled to the rim such that an application of sufficient force upon the extension causes at least a portion of the extension to separate from the rim to form a gap between the extension and the rim, the extension includes a first section and a second section, the first section extending outwardly from the sidewall of the filter, and the second section extending farther at least partially in the direction of the distal end of the filter, the second base having a plurality of holes where the size of the holes is predetermined to brew either a low pressure beverage or a high pressure beverage, where the size of the holes is sufficiently large to release the high pressure injected into the filter to allow beverage to be extracted below 4 bars from the beverage ingredient to brew the low pressure beverage, or the size of the holes is sufficiently small to substantially maintain the high pressure injected into the filter to allow beverage to be extracted above 7 bars from the beverage ingredient to brew the high pressure beverage; and a lid enclosing the second opening of the filter to hermitically seal the beverage ingredient within the container, and during a brewing process, the beverage within the container drains through the gap between the extension and the rim.

27. The beverage pod as defined in claim 26, where the second sidewall is within the first sidewall, and the second sidewall has a plurality of ribs protruding outwardly therefrom to strengthen the second sidewall and to provide a pathway between the first and second sidewalls.

28. The beverage pod as defined in claim 27, further including a distributor within the second opening of the filter, the distributor having apertures on a distributor surface to allow the fluid flow through the apertures and toward the beverage ingredient there underneath.

* * * * *